United States Patent
Bar-Or et al.

(10) Patent No.: US 10,268,753 B2
(45) Date of Patent: Apr. 23, 2019

(54) SYSTEM AND METHOD FOR OPTIMIZED QUERY EXECUTION IN COMPUTERIZED DATA MODELING AND ANALYSIS

(71) Applicant: Opera Solutions USA, LLC, Jersey City, NJ (US)

(72) Inventors: Amir Bar-Or, Newton, MA (US); Yuansong Liao, Bellevue, WA (US)

(73) Assignee: Opera Solutions USA, LLC, Jersey City, NJ (US)

( * ) Notice: Subject to any disclaimer, the term of this patent is extended or adjusted under 35 U.S.C. 154(b) by 0 days.

(21) Appl. No.: 15/629,328

(22) Filed: Jun. 21, 2017

(65) Prior Publication Data

US 2017/0286526 A1  Oct. 5, 2017

Related U.S. Application Data

(63) Continuation-in-part of application No. 15/388,388, filed on Dec. 22, 2016.
(Continued)

(51) Int. Cl.
*G06F 9/44* (2018.01)
*G06F 17/30* (2006.01)
(Continued)

(52) U.S. Cl.
CPC ......... *G06F 17/30604* (2013.01); *G06F 8/34* (2013.01); *G06F 8/35* (2013.01);
(Continued)

(58) Field of Classification Search
CPC ................................................ G06F 17/30604
(Continued)

(56) References Cited

U.S. PATENT DOCUMENTS 5,933,145 A     8/1999   Meek
5,999,735 A * 12/1999   Radigan .................... G06F 8/41
                                                                                                        717/142
(Continued)

FOREIGN PATENT DOCUMENTS

WO          99/62006 A1     12/1999

OTHER PUBLICATIONS

Kanemitsu et al, "A Visualization Method of Program Dependency Graph for Identifying Extract Method Opportunity", ACM, pp. 8-14, 2011.*

(Continued)

*Primary Examiner* — Anil Khatri
(74) *Attorney, Agent, or Firm* — Nutter McClennen & Fish LLP

(57) ABSTRACT

A sequence of queries is divided into stages, where each stage involves one pass over the data, such that the sequence of queries can be executed using the minimum number of passes over the data. The sequence of queries may be processed into a functional dependency graph that represents the relationships between query parameters (signals) and query operations, and the functional dependency graph then may be processed to divide the queries into a number of successive stages such that each stage includes queries that can be executed based on data that exists prior to execution of that stage. A sequence of queries may, and often does, require that one or more intermediate values or datasets be generated using an aggregate function.

24 Claims, 77 Drawing Sheets

Related U.S. Application Data

(60) Provisional application No. 62/271,041, filed on Dec. 22, 2015.

(51) Int. Cl.
    *G06F 8/34*         (2018.01)
    *G06F 8/35*         (2018.01)
    *G06F 8/36*         (2018.01)

(52) U.S. Cl.
    CPC .......... *G06F 8/36* (2013.01); *G06F 17/30477* (2013.01); *G06F 17/30539* (2013.01); *G06F 17/30554* (2013.01)

(58) Field of Classification Search
    USPC .................... 717/144, 101–107, 121–122
    See application file for complete search history.

(56) References Cited

U.S. PATENT DOCUMENTS

| | | | |
|---|---|---|---|
| 6,002,879 A * | 12/1999 | Radigan .................. | G06F 8/443 715/209 |
| 6,640,221 B1 | 10/2003 | Levine et al. | |
| 6,850,933 B2 * | 2/2005 | Larson .............. | G06F 17/30451 |
| 6,997,934 B2 * | 2/2006 | Snow ............... | A61B 17/32075 606/159 |
| 7,536,396 B2 * | 5/2009 | Johnson ................ | H04L 43/022 |
| 7,886,269 B2 * | 2/2011 | Williams .................. | G06F 8/00 717/121 |
| 7,926,046 B2 * | 4/2011 | Halambi ............... | G06F 8/4452 717/106 |
| 8,099,725 B2 * | 1/2012 | Jin .................... | G06F 17/30421 717/106 |
| 8,271,935 B2 * | 9/2012 | Lewis ....................... | G06F 8/10 717/104 |
| 8,898,624 B2 * | 11/2014 | Bouillet ............ | G06F 17/30893 717/106 |
| 9,014,982 B2 * | 4/2015 | Da Costa Paiva ..... | G01V 1/362 702/13 |
| 9,130,832 B1 * | 9/2015 | Boe ................... | G06F 17/30386 |
| 9,218,427 B1 * | 12/2015 | Thompson .......... | G06F 17/3087 |
| 2003/0200532 A1 | 10/2003 | Gensel | |
| 2003/0204487 A1 | 10/2003 | Sssv et al. | |
| 2007/0156430 A1 | 7/2007 | Kaetker et al. | |
| 2012/0185913 A1 | 7/2012 | Martinez et al. | |
| 2013/0091170 A1 | 4/2013 | Zhang et al. | |
| 2016/0070455 A1 | 3/2016 | Dawson et al. | |
| 2017/0177309 A1 | 6/2017 | Bar-Or et al. | |

OTHER PUBLICATIONS

Naumann et al, "Optimal Vertex Elimination in Single-Expression-Use Graphs", ACM Transactions on Mathematical Software, vol. 35, No. 1, article 2, pp. 1-20, 2008.*

Khan et al, "Towards Indexing Functions: Answering Scalar Product Queries", ACM, pp. 241-252, 2014 (Year: 2014).*

Naumann et al, "Optimal Vertex Elimination in Single-Expression-Use Graphs", ACM Transactions on Mathematical Software, vol. 35, No. 1, Article 2, pp. 1-20, 2008 (Year: 2008).*

Guillanne-Bert et al, "Classification of Time Sequences using Graphs of Temporal Constraints", ACM, pp. 1-34, 2017 (Year: 2017).*

Neff et al, " Methods for Exploring Expressive Stance", ACM, pp. 49-58, 2004 (Year: 2004).*

European Patent Office: Invitation to Pay Additional Fees and, Where Applicable, Protest Fees—International Application No. PCT/US2018/038307, dated Sep. 28, 2018, 15 pages.

Efficient Pattern Matching over Event Streams *, https://peopie.cs.umass.edu/~yanlei/publications/sase-sigmod08.pdf, Department of Computer Science, University of Massachusetts Amherst, Amherst, MA, USA, published in SIGMOD'08 in Vancouver, BC, Canada, 13 pages, Jun. 9-12, 2008.

*Signal Hubs: The Next Generation of Machine-Learning*, CITO Research—Advancing the Craft of Technology Leadership, https://citoresearch.com/data-science/signal-hubs-next-generation-machine-learning, 2 pages, published by Evolved Media, 2012.

*Bulk Insert, Update and Delete in Hadoop Data Lake / Mawazo*, https://pkghosh.wordpress.com/2015/04/26/bulk-insert-update-and-delete-in-hadoop-data-lake/ , Posted in: Analytics, Big Data, ETL Hadoop, Hadoop, Hive, How-To, 9 pages, Apr. 26, 2015.

*Mastering Apache Spark 2, RDD Lineage—Logical Execution Plan*, https://jaceklaskowski.gitbooks.io/mastering-apache-spark/content/spark-rdd-lineage.html , GitBook, pp. 1121-1123, Undated.

*Mobiuss Front Offices*, the Wayback Machine, https://web.archive.org/web/20140625153512/http://www.operasolutions.com/industries-functional-areas/global-markets/mobiuss-front-office, 2 pages, Jun. 25, 2014.

*Science at the Core*, the Wayback Machine, https://web.archive.org/web/20140614085758/http://www.operasolutions.com/science-technology/signal-science/science-at-the-core, 2 pages, Jun. 14, 2014.

*Signal Products*, the Wayback Machine, https://web.archive.org/web/20140703105320/http://www.operasolutions.com/signal-hubtm-products/signal-products-2, 1 page, Jul. 3, 2014.

*Signal Products*, the Wayback Machine, https://web.archive. org/web/20140728034219/http://www.operasolutions.com/signal-hubtm- products/signal-products-2, 1 page, Jul. 28, 2014.

*Invest in alpha.*, the Wayback Machine, https://web.archive.org/web/20140703123144/http://www.operasolutions.com/industries-functional-areas/global-markets, 2 pages, Jul. 3, 2014.

*Signalytics*™, the Wayback Machine, https://web.archive.org/web/20140703125812/http://www.operasolutions.com/industries-functional-areas/sourcing-supply-chain , 2 pages, Jul. 3, 2014.

*You're covered*, the Wayback Machine, https://web.archive.org/web/20140703125219/http://www.operasolutions.comlindustries-functional-areas/insurance, 2 pages, Jul. 3, 2014.

*Your customers are calling*, the Wayback Machine, https://web:archive. org/web/20140703151943/http://www.operasolutions.com/industries-functional-areas/marketing/, 2 pages, Jul. 3, 2014.

*Signal Hubs*, the Wayback Machine, https://web.archive.org/web/20140718141801/http://www.operasolutions.com/signal-hubtm-products/signal-hubs-2 , 2 pages, Jul. 18, 2014.

*Signal Science*, the Wayback Machine, https://web.archive.org/web/20140727184917/http://www.operasolutions.com/science-technology/signal-science , 2 pages, Jul. 27, 2014.

*Technology Platforms*, the Wayback Machine, https://web.archive.org/web/20140727190605/http://www.operasolutions.com/science-technology/technology-platforms/, 2 pages, Jul. 27, 2014.

*Big Data science with extraordinary results*, the Wayback Machine, https://web.archive.org/web/20140728033307/http://www.operasolutions.com/, 2 pages, Jul. 28, 2014.

*Consumer Signal Hub*, the Wayback Machine, https://web.archive.org/web/20140808230047/http:// www.operasolutions.com/industries-functional-areas/marketing/customer-signal-hub, 2 pages, Aug. 8, 2014.

*Marketing Solutions*, the Wayback Machine, https://web.archive.org/web/20140811185709/http://www.operasolutions.comilibrary-archives/marketing-solutions, 3 pages, Aug. 11, 2014.

*SignalScope*™ *Web Intelligence*, Wayback Machine, https://web.archive.org/web/20140811190042/http://www.operasolutions.com/signalscope-web-intelligence, 2 pages, Aug. 11, 2014.

*Mobiuss Portfolio*, the Wayback Machine, https://web.archive.org/web/20140812133159/http://www.operasolutions.com/industries-functional-areas/global-markets/mobiuss-portfolio, 2 pages, Aug. 12, 2014.

*Provider Solutions*, the Wayback Machine, https://web.archive.org/web/20140812132639/http:// www.operasolutions.com/provider-solutions, 2 pages, Aug. 12, 2014.

*SignalSensor*™, the Wayback Machine, https://web.archive.org/web/20140812155459/http://www.operasolutions.com/industries-functional-areas/opera-solutions-government-services/signalsensor, 2 pages, Aug. 12, 2014.

*What Are Signals?*, the Wayback Machine, https://web.archive.org/web/20140831115726/http://www.operasolutions.com/science-technology/signal-science/what-are-signals , 1 page, Aug. 31, 2014.

(56) References Cited

OTHER PUBLICATIONS

*Opera Solutions' Signal Hub*, Opera Solutions, LLC, Twitter and LinkedIn, 3 pages, undated.
*Product Signal Hub*, Opera Solutions, LLC, Twitter and LinkedIn, 3 pages, 2015.
*Opera Solutions' Signal Hub Executive Brief*, 4 pages, 2014.
*Delivering Big Data Success With the Signal Hub™ Platform*, 9 pages, 2015.
*Signal Hub: Unlocking Valuable Intelligence and Insights from BIG DATA*, 12 pages, 2015.
*Introduction to Opera Solutions*, 47 pages, Jun. 2015.
*Introduction to Opera Solutions Signal Hub Demo screenshots*, 19 pages, Jul. 2015.
*Four Steps Strategy for Incremental Updates in Apache Hive on Hadoop*, https://hortonworks.com/blog/four-step-strategy-incremental-updates-hive/, Hortonworks, 16 pages, Jul. 15, 2014.
*Efficient Computation of Queries on Feature Streams*, ACM Transactions on Multimedia Computing, Communications and Applications, vol. 7, No. 4, Article 38, pp. 1-38, Nov. 2011.
*Integrated Querying of XML Data in RDBMSs*, SAC '03 Proceedings of the 2003 ACM Symposium on Applied Computing in Melbourne, FL, pp. 509-514, Mar. 9-12, 2003.
*Talend Activity Monitoring Console—User Guide 6.0.1*, Talend, Inc., 40 pages, Sep. 10, 2015.
*How to delete and update a record in Hive*, https://stackoverflow.com/questions/17810537/how-to-delete-and-update-a-record-in-hive, 5 pages, Jul. 23, 2013.
Event Series Pattern Matching, https://my.vertica.com/docs/7.1.x/HTML/Content/Authoring/AnalyzingData/EventSeriesPatternMatching.htm, Hewlett-Packard Development Company, L.P., 3 pages, 2015.
Data lineage, https://en.wikipedia.org/wiki/Data_lineage#Lineage_Capture, 13 pages, Oct. 30, 2017.
International Search Report—International Application No. PCT/US2016/068296, dated Mar. 10, 2017, together with the Written Opinion of the International Searching Authority, 12 pages.
Office Action—U.S. Appl. No. 15/629,316, dated Jul. 30, 2018, 17 pages.

* cited by examiner

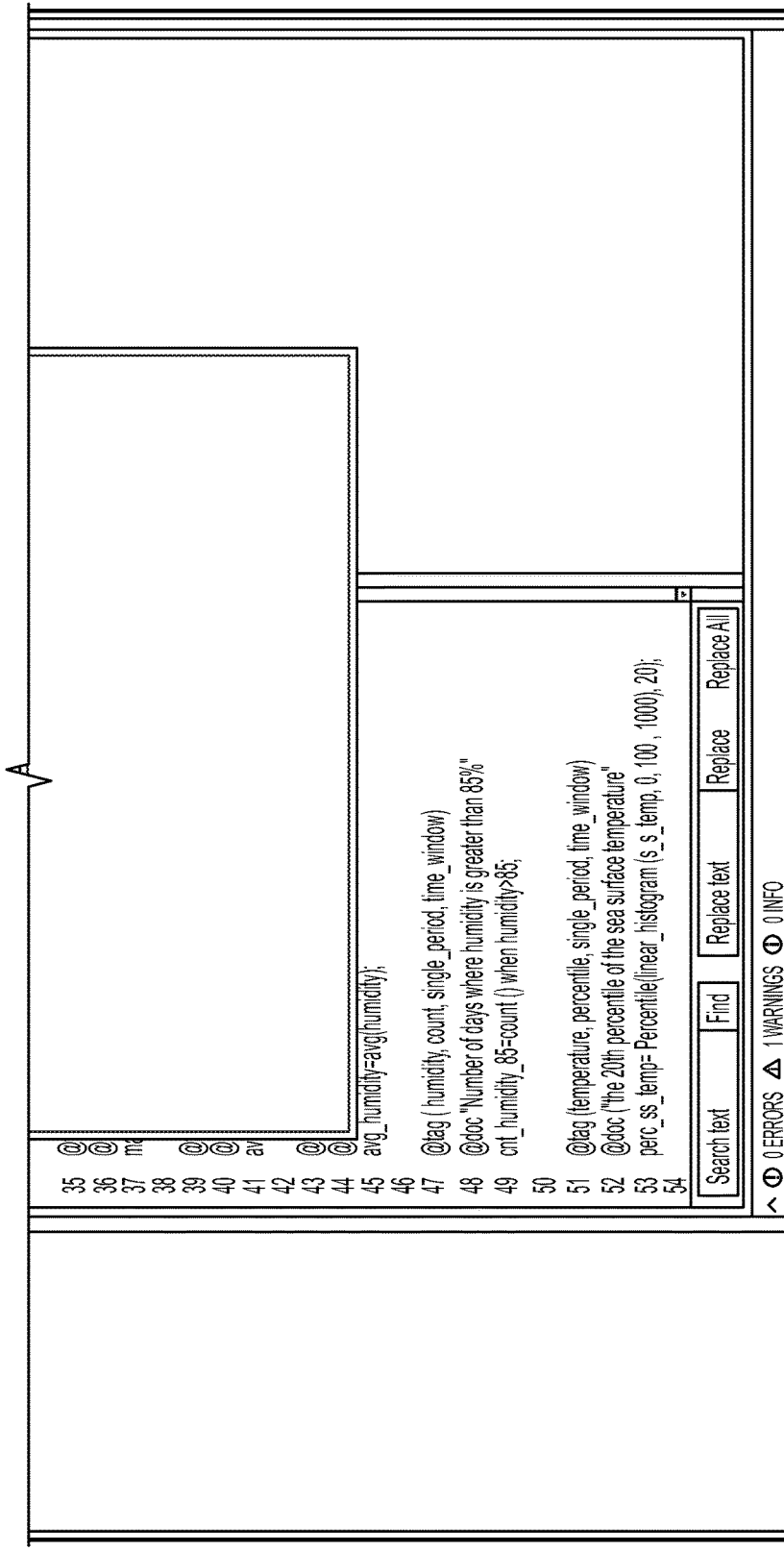

| Signal | Description | Tags | Signal Set | Type | Function |
|---|---|---|---|---|---|
| bkg_avg_pax_2y_per_cm | customer \| avg # of passengers per trip customer travelled with \| last 2 years | average, count, flight, single_period, time_window | party_level.signal | Common:Real | day2y_ago = data 04... See More |
| bkg_avg_price_paid_2y_per_cm | customer \| avg flight price per trip across all trips\| last 2 years | average, flight, single_period, spend, time_window | party_level.signal | Common:Real | day2y_ago = data 04... See More |
| bkg_avg_rev_nett_per_cm | customer \| avg net revenue per trip across all trips \| last 3 years | average, flight, net_revenue, single_period, time_window | party_level.signal | Common:Real | bkg_avg_rev_net_avg(bkg_sum_rev |
| bkg_cnt_africa_trip_1y_per_cm | customer \| # of trips to Africa \| last 1 year | count, flight, single_period, time_window | party_level.signal | Common:Long | day1y_ago = data 04... See More |
| bkg_cnt_autumn_leis_holid_per_cm | customer \| # of leisure trips to fly drive holiday | business_leisure, count, destination_theme, flight, route, season, | party_level.signal | Common:Long | bkg_cnt_autumn whe... See More |

Showing 1 to 100 of 100 entries

FIG. 20A

SIGNAL HUB™ KNOWLEDGE CENTER — Yasaman

Airline > Search Signal > Search Customer

Search Customer Signals

Search Signals: Customer Product Campaign Customer Product

| | | Description | Type | Update Time | Frequency | Comments | Tags | Signal Creation |
|---|---|---|---|---|---|---|---|---|
| | ⊞ | distribution of Females of the CUST_ID | Real | 05/26/2016 3:30 pm | weekly | No comments | April, parking, ranking | code.data |
| | ⊞ | distribution of Females of the CUST_ID | Real | 05/26/2016 2:48 pm | weekly | No comments | April, parking, ranking | code.data |
| | ⊠ | email available indicator of the customer | Real | 04/12/2016 11:30 am | weekly | No comments | April, parking, ranking | code.data |
| | ⊞ | distance to nearest client store | Real | 04/08/2016 1:30 pm | weekly | No comments | April, parking, ranking | code.data |
| | ⊠ | phone available indicator of the customer | Real | 03/18/2016 8:30 pm | weekly | No comments | April, parking, ranking | code.data |
| | ⊞ | phone number of the customer | Real | 09/20/2016 4:30 am | Monthly | No comments | April, parking, ranking | code.data |
| | ⊞ | propensity for customer to buy deodorants | Real | 10/21/2016 1:30 am | weekly | No comments | April, parking, ranking | code.data |
| | ⊞ | distribution of Females of the CUST_ID | Long | 05/26/2016 3:30 pm | weekly | No comments | April, parking, ranking | code.data |
| | ⊞ | distribution of Females of the CUST_ID | Long | 05/26/2016 2:48 pm | weekly | No comments | April, parking, ranking | code.data |
| | ⊞ | email available indicator of the customer | Long | 04/12/2016 11:30 am | daily | No comments | April, parking, ranking | code.data |
| | ⊞ | distance to nearest client store | Long | 04/08/2016 1:30 pm | daily | No comments | April, parking, ranking | code.data |
| | ⊞ | phone available indicator of the customer | Long | 03/18/2016 8:30 pm | daily | No comments | April, parking, ranking | code.data |
| | ⊞ | phone number of the customer | Long | 09/20/2016 4:30 am | daily | No comments | April, parking, ranking | code.data |

FILTER SIGNALS — CLEAR ALL
USER DEFINED: 234
- Long Haul: 12
- Redemption: 34
- Upgrade: 24
- Another Type: 35
- Another Type: 123
- Another Type: 74
- Another Type: 23
- Another Type: 300
- Another Type: 120
- Another Type: 80
- Another Type: 100
- Another Type: 23
- ▶ Show Less RELATIONSHIP: 40
- Average: 23
- Ranking: 12

WINDOW: 5
- Last Year: 2
- Last Two Years: 3

Showing result for "Customer", "Average", "Last Two Years"  Loaded 100 of 2851 signals

FIG. 20B

| Data | | | | |
|---|---|---|---|---|
| Select columns ▼ | | | | |
| matched_party_id (Common:Long) | bkg_rto_hl_price_per_cm (Common:Real) | bkg_avg_lead_time_per_cm (Common:Long) | bkg_cnt_ski_holid_1y_per_cm (Common:Long) | bkg_hotel_propensity_per_cm (Common:String) |
| | <1 | <30 | >2 | >.3 |
| 100253 | 0.750973706 | 21 | 3 | 0.58 |
| 100062 | 0.522374189 | 26 | 5 | 0.93 |
| 100714 | 0.18909389 | 24 | 3 | 0.72 |
| 100453 | 0.757394988 | 25 | 5 | 0.35 |
| 100130 | 0.045191626 | 25 | 5 | 0.68 |
| 100813 | 0.629726104 | 23 | 4 | 0.64 |
| 100115 | 0.819639554 | 22 | 5 | 0.73 |
| 100111 | 0.345812852 | 24 | 3 | 0.33 |
| 100557 | 0.566720688 | 15 | 3 | 0.81 |
| 100547 | 0.924192237 | 21 | 3 | 0.70 |
| 100070 | 0.401939498 | 25 | 3 | 0.34 |
| 100268 | 0.295609933 | 25 | 3 | 0.53 |
| 100962 | 0.24747266 | 23 | 4 | 0.56 |
| 100856 | 0.576131 | 22 | 3 | 0.51 |
| 100058 | 0.345892826 | 24 | 3 | 0.33 |
| 100248 | 0.400312978 | 26 | 5 | 0.93 |
| 100402 | 0.103623572 | 24 | 3 | 0.72 |

Solutions > Generic Airline Signal Hub V0.31 > Inputs

| | Input Name | Description | Tags | | Rate |
|---|---|---|---|---|---|
| | Booking Fact | Booking table holds the detailed booking Information of airline company marketing/operating flight | Fact, Line of flight, PNR Trip, Segment. Source Ingestion Layer | 26 | Daily |
| | Booking Raw | Daily delta table file of Booking. | Line of flight, PNR Trip, Segment. Source Ingestion Layer | 14 | Daily |
| | Check-in Fact | Check-in table holds the detailed check-in information of merely airline company operating flights | Fact, Line of flight, PNR Trip, Segment Source Ingestion Layer | 19 | Daily |
| | Check-in Raw | Daily delta table file of Check-in | Line of flight, PNR Trip, Segment Source Ingestion Layer | 8 | Daily |
| | Customer mapping Raw | Customer_mapping table is used to track Customer_ID changing history. | Customer, Dimension, Source Ingestion Layer | 12 | Daily |
| | Customer Raw | Daily delta table file of Customer. | Customer, Dimension, Source Ingestion Layer | 8 | Daily |
| | Frequent Flyer Program history Raw | Ffp_member_hist table holds the enrollment history of each frequent flyer, such as enroll time, enroll source, CEO indicator, infinite level etc. | Customer, Dimension, Source Ingestion Layer | 5 | Daily |
| | Frequent Flyer Program Raw | FFP_member holds the current status of each frequent flyer with real-time update, including current elite level, active indicator, etc. | Customer, Dimension, Source Ingestion Layer | 7 | Daily |
| | PNR customer Raw | PNR_Customer tables is a mapping table between PNR and Customer_id. | Customer, Dimension, PNR Trip, Source Ingestion Layer | | |

Generic Airline Signal Hub V0.31 — Solution Info

| Inputs | 26 |
|---|---|
| Signal Sets | 11 |
| Models | 1 |
| Outputs | 2 |
| Reports | 5 |
| Workflows | 5 |
| Views | 72 |
| Reference Data | 0 |

```
fileSearchPaths:
- code libraryOutputPaths:
- import: hdfs://172.30.255.255:8020/projects/StoreSales/import
- etl: hdfs://172.30.255.255:8020/projects/StoreSales/etl dataOutputPath : gen/default
ontologyPath: ./ontology.yaml parameters:
  dataDir: ./data
  importVersion: 1.1
  etlVersion: 1.4
```

FIG. 29C

```
inherit: env_project.yaml
parameters:
  etlversion: 1.5 # still testing with data from 4/16/2015
```

FIG. 29D libraryOutputPaths:
  import: hdfs://172.30.255.255:8020/projects/StoreSales/import
  etl: hdfs://172.30.255.255:8020/projects/StoreSales/etl

FIG. 29E libraryOutputPaths:
  import.customers:
hdfs://172.30.255.255:8020/projects/StoreSales/import_customers
  import.stores: hdfs://172.30.255.255:8020/projects/StoreSales/import_stores
  etl: hdfs://172.30.255.255:8020/projects/StoreSales/etl

FIG. 29F libraryOutputPaths:
  import.customers:
hdfs://172.30.255.255:8020/projects/StoreSales/import_customers
  import.stores: hdfs://172.30.255.255:8020/projects/StoreSales/import_stores
  etl: hdfs://172.30.255.255:8020/projects/StoreSales/etl

FIG. 29G

```
libraryOutputPaths:
  import.customers:
    hdfs://172.30.255.255:8020/projects/StoreSales/import_customers
  import.stores: hdfs://172.30.255.255:8020/projects/StoreSales/import_stores
  etl.makeMaster:
    hdfs://172.30.255.255:8020/projects/StoreSales/etl_makeMaster
  etl.dataQuality:
    hdfs://172.30.255.255:8020/projects/StoreSales/etl_dataQuality
```

FIG. 29H

```
libraryOutputPaths:
  import.customers.addresses:
    hdfs://172.30.255.255:8020/projects/StoreSales/import_customers.addresses
  import.stores: hdfs://172.30.255.255:8020/projects/StoreSales/import_stores
  etl.makeMaster:
    hdfs://172.30.255.255:8020/projects/StoreSales/etl_makeMaster
  etl.dataQuality:
    hdfs://172.30.255.255:8020/projects/StoreSales/etl_dataQuality
```

FIG. 29I

```
- name: myView
  transformations:
    ::
    ::
    persist:
      label: ${myView_LatestVersion}
```

SYSTEM AND METHOD FOR OPTIMIZED QUERY EXECUTION IN COMPUTERIZED DATA MODELING AND ANALYSIS

CROSS-REFERENCE TO RELATED APPLICATIONS

This application is a continuation-in-part of, and therefore claims priority from, U.S. patent application Ser. No. 15/388,388 entitled SYSTEM AND METHOD FOR RAPID DEVELOPMENT AND DEPLOYMENT OF REUSABLE ANALYTIC CODE FOR USE IN COMPUTERIZED DATA MODELING AND ANALYSIS filed on Dec. 22, 2016, which claims the benefit of U.S. Provisional Application No. 62/271,041 filed on Dec. 22, 2015; each of these patent applications is hereby incorporated herein by reference in its entirety.

This application also may be related to one or more of the following commonly-owned patent applications filed on even date herewith, each of which is hereby incorporated herein by reference in its entirety:

U.S. patent application Ser. No. 15/629,316 entitled SYSTEM AND METHOD FOR INTERACTIVE REPORTING IN COMPUTERIZED DATA MODELING AND ANALYSIS; and U.S. patent application Ser. No. 15/629,342 entitled SYSTEM AND METHOD FOR CODE AND DATA VERSIONING IN COMPUTERIZED DATA MODELING AND ANALYSIS.

FIELD OF THE DISCLOSURE

The present disclosure relates generally to computer-based tools for developing and deploying analytic computer code. More specifically, the present disclosure relates to a system and method for rapid development and deployment of reusable analytic code for use in computerized data modeling and analysis.

BACKGROUND

In today's information technology world, there is an increased interest in processing "big" data to develop insights (e.g., better analytical insight, better customer understanding, etc.) and business advantages (e.g., in enterprise analytics, data management processes, etc.). Customers leave an audit trail or digital log of the interactions, purchases, inquiries, and preferences through online interactions with an organization. Discovering and interpreting audit trails within big data provides a significant advantage to companies looking to realize greater value from the data they capture and manage every day. Structured, semi-structured, and unstructured data points are being generated and captured at an ever-increasing pace, thereby forming big data, which is typically defined in terms of velocity, variety, and volume. Big data is fast-flowing, ever-growing, heterogeneous, and has exceedingly noisy input, and as a result transforming data into signals is critical. As more companies (e.g., airlines, telecommunications companies, financial institutions, etc.) focus on real-world use cases, the demand for continually refreshed signals will continue to increase.

Due to the depth and breadth of available data, data science (and data scientists) is required to transform complex data into simple digestible formats for quick interpretation and understanding. Thus, data science, and in particular, the field of data analytics, focuses on transforming big data into business value (e.g., helping companies anticipate customer behaviors and responses). The current analytic approach to capitalize on big data starts with raw data and ends with intelligence, which is then used to solve a particular business need so that data is ultimately translated into value.

However, a data scientist tasked with a well-defined problem (e.g., rank customers by probability of attrition in the next 90 days) is required to expend a significant amount of effort on tedious manual processes (e.g., aggregating, analyzing, cleansing, preparing, and transforming raw data) in order to begin conducting analytics. In such an approach, significant effort is spent on data preparation (e.g., cleaning, linking, processing), and less is spent on analytics (e.g., business intelligence, visualization, machine learning, model building).

Further, usually the intelligence gathered from the data is not shared across the enterprise (e.g., across use cases, business units, etc.) and is specific to solving a particular use case or business scenario. In this approach, whenever a new use case is presented, an entirely new analytics solution needs to be developed, such that there is no reuse of intelligence across different use cases. Each piece of intelligence that is derived from the data is developed from scratch for each use case that requires it, which often means that it's being recreated multiple times for the same enterprise. There are no natural economies of scale in the process, and there are not enough data scientists to tackle the growing number of business opportunities while relying on such techniques. This can result in inefficiencies and waste, including lengthy use case execution and missed business opportunities.

Currently, to conduct analytics on "big" data, data scientists are often required to develop large quantities of software code. Often, such code is expensive to develop, is highly customized, and is not easily adopted for other uses in the analytics field. Minimizing redundant costs and shortening development cycles requires significantly reducing the amount of time that data scientists spend managing and coordinating raw data. Further, optimizing this work can allow data scientists to improve their effectiveness by honing signals and ultimately improving the foundation that drives faster results and business responsiveness. Thus, there is a need for a system to rapidly develop and deploy analytic code for rapid development and deployment of reusable analytic code for use in computerized data modeling and analysis.

SUMMARY

The present disclosure relates to a system and method for rapid development and deployment of reusable analytic code for use in computerized data modeling and analysis. The system includes a centralized, continually updated environment to capture pre-processing steps used in analyzing big data, such that the complex transformations and calculations become continually fresh and accessible to those investigating business opportunities. This centralized, continually refreshed system provides a data-centric competitive advantage for users (e.g., to serve customers better, reduce costs, etc.), as it provides the foresight to anticipate future problems and reuses development efforts. The system incorporates deep domain expertise as well as ongoing expertise in data science, big data architecture, and data management processes. In particular, the system allows for rapid development and deployment of analytic code that can easily be re-used in various data analytics applications, and on multiple computer systems.

Benefits of the system include a faster time to value as data scientists can now assemble pre-existing ETL (extract, transform, and load) processes as well as signal generation components to tackle new use cases more quickly. The present disclosure is a technological solution for coding and developing software to extract information for "big data" problems. The system design allows for increased modularity by integrating with various other platforms seamlessly. The system design also incorporates a new technological solution for creating "signals" which allows a user to extract information from "big data" by focusing on high-level issues in obtaining the data the user desires and not having to focus on the low-level minutia of coding big data software as was required by previous systems. The present disclosure allows for reduced software development complexity, quicker software development lifecycle, and reusability of software code.

In accordance with one embodiment of the invention, a computer-implemented method, system, and computer program product for converting scalar expressions to relational database queries applied to a dataset perform processes including producing a functional dependency graph representing the scalar expressions and any interdependencies between the scalar expressions; assigning each scalar expression to one of a plurality of successive execution stages identifiable as stages 1 through n based on the functional dependency graph such that each execution stage includes at least one of the scalar expressions, wherein the at least one scalar expression associated with any given stage does not require results from a subsequent stage of the plurality of successive stages; and converting the scalar expressions at each stage into one or more relational database queries to create a sequence of relational database queries, wherein each execution stage involves at most one pass through the dataset.

In various alternative embodiments, at least one stage may involve generation of a temporary data set used in at least one subsequent stage. Each stage may include the maximum number of possible expressions that can be executed at that stage. Producing the functional dependency graph may involve, for each scalar expression, identifying an output parameter and a set of input parameters associated with the scalar expression; creating a node for the output parameter in the functional dependency graph if the node for the output parameter does not exist in the functional dependency graph; creating, for each input parameter in the set of input parameters, a distinct node in the functional dependency graph if the distinct node for the input parameter does not exist in the functional dependency graph; and establishing, in the functional dependency graph, an association between the output parameter node and each of distinct input parameter nodes. Such association may include an operator node when the output parameter node is dependent on a combination of two or more distinct input parameter nodes, the operator node representing an operator to be performed on the two or more distinct input parameters. Assigning each scalar expression to one of the plurality of successive stages based on the functional dependency graph may involve traversing the functional dependency graph using a breadth first traversal configured to exclude, from each given execution stage, any aggregate expression at a lower-level of the functional dependency graph; and assigning each expression to a given stage based on the breadth first traversal. Converting the nodes at each stage into one or more relational database queries to create a sequence of relational database queries may involve generating a sequence of structured query language commands. Assigning each scalar expression to one of the plurality of successive execution stages based on the functional dependency graph may ensure the minimum number of passes through the dataset for execution of the scalar expressions.

Additional embodiments may be disclosed and claimed.

BRIEF DESCRIPTION OF THE DRAWINGS

The foregoing features of the disclosure will be apparent from the following Detailed Description, taken in connection with the accompanying drawings, in which:

FIG. 20A is a screenshot illustrating a user interface screen generated by the system for finding a signal using the Knowledge Center generated by the system;

FIG. 20B is a screenshot illustrating a user interface screen generated by the system for finding a signal using the Knowledge Center 600 generated by the system;

FIGS. 21A-F are screenshots illustrating user interface screens generated by the system for selecting entries with particular signal values using the Knowledge Center generated by the system;

FIGS. 29C-29J are screenshots illustrating environment files for enhancing collaboration;

FIGS. 30A-32 are screenshots illustrating the Signal Hub manager generated by the system.

DETAILED DESCRIPTION

Figure 1:
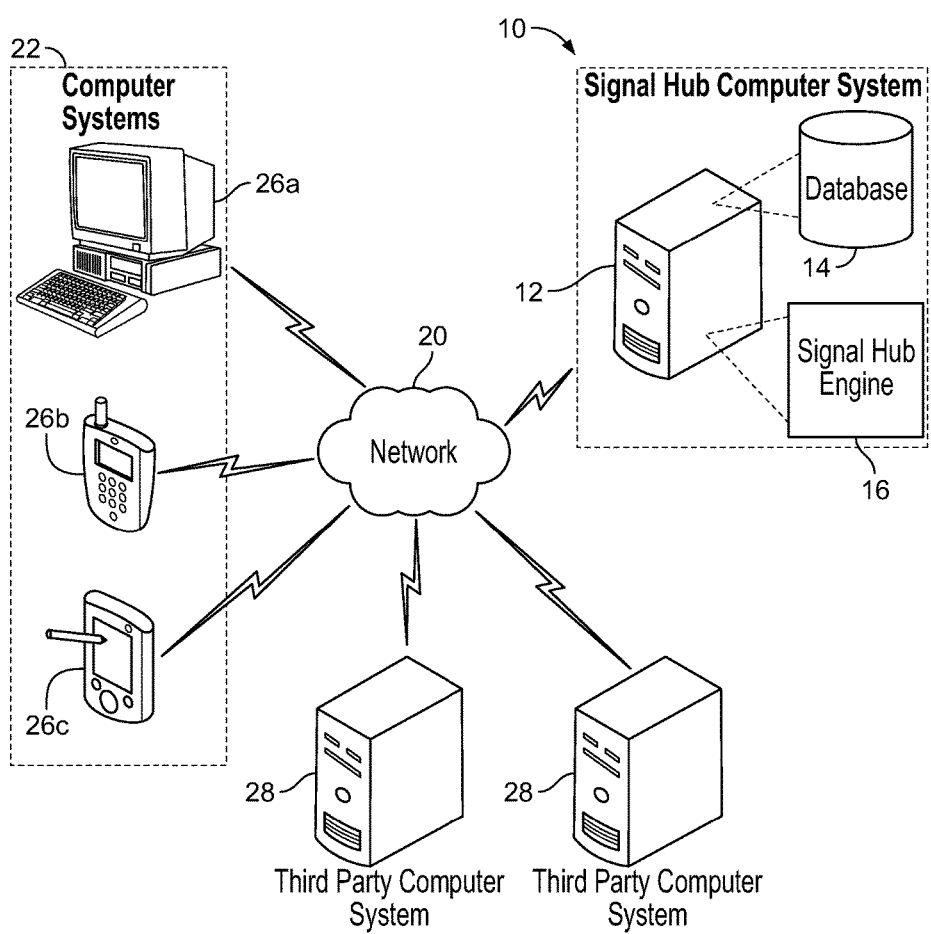
FIG. 1 is a diagram illustrating hardware and software components of the system.

Disclosed herein is a system and method for rapid development and deployment of reusable analytic code for use in computerized data modeling and analysis, as discussed in detail below in connection with FIGS. 1-46.

As used herein, the terms "signal" and "signals" refers to the data elements, patterns, and calculations that have, through scientific experimentation, been proven valuable in predicting a particular outcome. Signals can be generated by the system using analytic code that can be rapidly developed, deployed, and reused. Signals carry useful information about behaviors, events, customers, systems, interactions, attributes, and can be used to predict future outcomes. In effect, signals capture underlying drivers and patterns to create useful, accurate inputs that are capable of being processed by a machine into algorithms. High-quality signals are necessary to distill the relationships among all the entities surrounding a problem and across all the attributes (including their time dimension) associated with these entities. For many problems, high-quality signals are as important in generating an accurate prediction as the underlying machine-learning algorithm that acts upon these signals in creating the prescriptive action.

The system of the present disclosure is referred to herein as "Signal Hub." Signal Hub enables transforming data into intelligence as analytic code and then maintaining the intelligence as signals in a computer-based production environment that allows an entire organization to access and exploit the signals for value creation. In a given domain, many signals can be similar and reusable across different use cases and models. This signal-based approach enables data scientists to "write once and reuse everywhere," as opposed to the traditional approach of "write once and reuse never." The system provides signals (and the accompanying analytic code) in the fastest, most cost-effective method available, thereby accelerating the development of data science applications and lowering the cost of internal development cycles. Signal Hub allows ongoing data management tasks to be performed by systems engineers, shifting more mundane tasks away from scarce data scientists.

Signal Hub integrates data from a variety of sources, which enables the process of signal creation and utilization by business users and systems. Signal Hub provides a layer of maintained and refreshed intelligence (e.g., Signals) on top of the raw data that serves as a repository for scientists (e.g., data scientists) and developers (e.g., application developers) to execute analytics. This prevents users from having to go back to the raw data for each new use case, and can instead benefit from existing signals stored in Signal Hub. Signal Hub continually extracts, stores, refreshes, and delivers the signals needed for specific applications, such that application developers and data scientists can work directly with signals rather than raw data. As the number of signals grows, the model development time shrinks. In this "bow tie" architecture, model developers concentrate on creating the best predictive models with expedited time to value for analytics. Signal Hub is highly scalable in terms of processing large amounts of data as well as supporting the implementation of a myriad of use cases. Signal Hub could be enterprise-grade, which means that in addition to supporting industry-standard scalability and security features, it is easy to integrate with existing systems and workflows. Signal Hub can also have a data flow engine that is flexible to allow processing of different computing environments, languages, and frameworks. A multi target system data flow compiler can generate code to deploy on different target data flow engines utilizing different computer environments, languages, and frameworks. For applications with hard return on investment (ROI) metrics (e.g., churn reduction), faster time to value can equate to millions of dollars earned. Additionally, the system could lower development costs as data science project timelines potentially shrink, such as from 1 year to 3 months (e.g., a 75% improvement). Shorter development cycles and lower development costs could result in increased accessibility of data science to more parts of the business. Further, the system could reduce the total costs of ownership (TCO) for big data analytics.

FIG. 1 is a diagram illustrating hardware and software components of the system. The system 10 includes a computer system 12 (e.g., a server) having a database 14 stored therein and a Signal Hub engine 16. The computer system 12 could be any suitable computer server or cluster of servers (e.g., a server with an INTEL microprocessor, multiple processors, multiple processing cores, etc.) running any suitable operating system (e.g., Windows by Microsoft, Linux, Hadoop, etc.). The database 14 could be stored on the computer system 12, or located externally therefrom (e.g., in a separate database server in communication with the system 10).

The system 10 could be web-based and remotely accessible such that the system 10 communicates through a network 20 with one or more of a variety of computer systems 22 (e.g., personal computer system 26a, a smart cellular telephone 26b, a tablet computer 26c, or other devices). Network communication could be over the Internet using standard TCP/IP communications protocols (e.g., hypertext transfer protocol (HTTP), secure HTTP (HTTPS), file transfer protocol (FTP), electronic data interchange (EDI), etc.), through a private network connection (e.g., wide-area network (WAN) connection, emails, electronic data interchange (EDI) messages, extensible markup language (XML) messages, file transfer protocol (FTP) file transfers, etc.), or any other suitable wired or wireless electronic communications format. Further, the system 10 could be in communication through a network 20 with one or more third party servers 28. These servers 28 could be disparate "compute" servers on which analytics could be performed (e.g., Hadoop, etc.). The Hadoop system can manage resources (e.g., split workload and/or automatically optimize how and where computation is performed). For example, the system could be fully or partially executed on Hadoop, a cloud-based implementation, or a stand-alone implementation on a single computer. More specifically, for example, system development could be executed on a laptop, and production could be on Hadoop, where Hadoop could be hosted in a data center.

Figure 2:
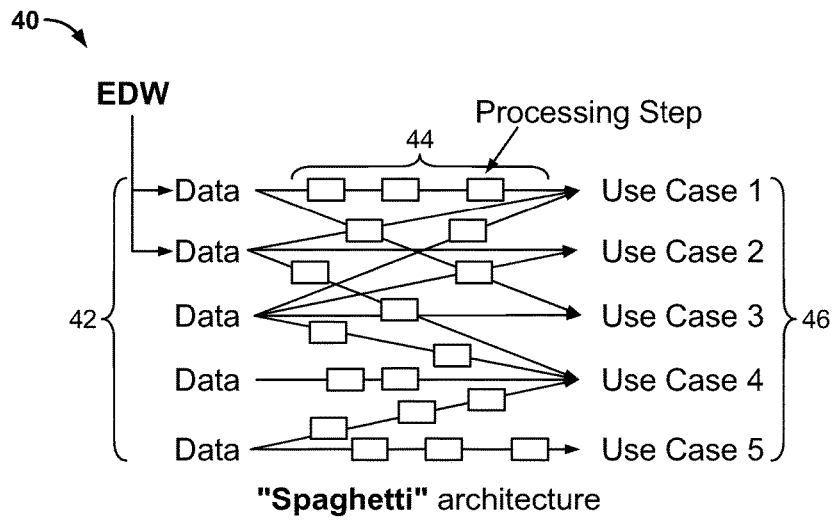
FIG. 2 is a diagram of a traditional data signal architecture.
Figure 3:
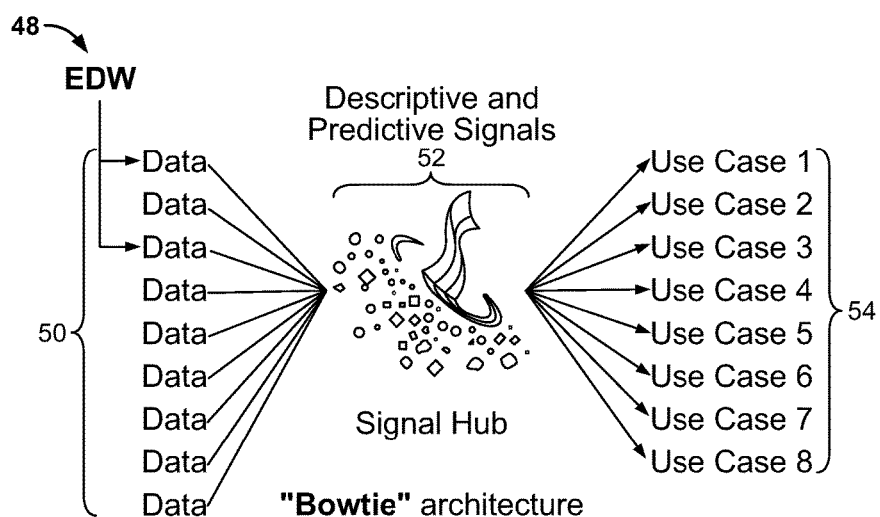
FIG. 3 is a diagram of a new data signal architecture provided by the system.

FIGS. 2-3 are diagrams comparing traditional signal architecture 40 and new data signal architecture 48 provided by the system. As shown, in the traditional signal architecture 40 (e.g., the spaghetti architecture), for every new use case 46, raw data 42 is transformed through processing steps 44, even if that raw data 42 had been previously transformed for a different use case 46. More specifically, a data element 42 must be processed for use in a first use case 46, and that same data element must be processed again for use in a second use case 46. In particular, the analytic code written to perform the processing steps 44 cannot be easily re-used. Comparatively, in the new data signal architecture 48 (e.g., the bowtie architecture) of the present disclosure, raw data 50 is transformed into descriptive and predictive signals 52 only once. Advantageously, the analytic code generated by the system for each signal 52 can be rapidly developed, deployed, and re-used with many of the use cases 54.

Signals are key ingredients to solving an array of problems, including classification, regression, clustering (segmentation), forecasting, natural language processing, intelligent data design, simulation, incomplete data, anomaly detection, collaborative filtering, optimization, etc. Signals can be descriptive, predictive, or a combination thereof. For instance, Signal Hub can identify high-yield customers who have a high propensity to buy a discounted ticket to destinations that are increasing in popularity. Descriptive signals are those which use data to evaluate past behavior. Predictive signals are those which use data to predict future behavior. Signals become more powerful when the same data is examined over a (larger) period of time, rather than just an instance.

Descriptive signals could include purchase history, usage patterns, service disruptions, browsing history, time-series analysis, etc. As an example, an airline trying to improve customer satisfaction may want to know about the flying experiences of its customers, and it may be important to find out if a specific customer had his/her last flight cancelled. This is a descriptive signal that relies on flight information as it relates to customers. In this example, a new signal can be created to look at the total number of flight cancelations a given customer experienced over the previous twelve months. Signals can measure levels of satisfaction by taking into account how many times a customer was, for instance, delayed or upgraded in the last twelve months.

Descriptive signals can also look across different data domains to find information that can be used to create attractive business deals and/or to link events over time. For example, a signal may identify a partner hotel a customer tends to stay with so that a combined discounted deal (e.g., including the airline and the same hotel brand) can be offered to encourage the customer to continue flying with the same airline. This also allows for airlines to benefit from and leverage the customer's satisfaction level with the specific hotel partner. In this way, raw input data is consolidated across industries to create a specific relationship with a particular customer. Further, a flight cancelation followed by a hotel stay could indicate that the customer got to the destination but with a different airline or a different mode of transportation.

Predictive signals allow for an enterprise to determine what a customer will do next or how a customer will respond to a given event and then plan appropriately. Predictive signals could include customer fading, cross-sell/up-sell, propensity to buy, price sensitivity, offer personalization, etc. A predictive signal is usually created with a use case in mind. For example, a predictive signal could cluster customers that tend to fly on red-eye flights, or compute the propensity level a customer has for buying a business class upgrade.

Signals can be categorized into classes including sentiment signals, behavior signals, event/anomaly signals, membership/cluster signals, and correlation signals. Sentiment signals capture the collective prevailing attitude about an entity (e.g., consumer, company, market, country, etc.) given a context. Typically, sentiment signals have discrete states, such as positive, neutral, or negative (e.g., current sentiment on X corporate bonds is positive.). Behavior signals capture an underlying fundamental behavioral pattern for a given entity or a given dataset (e.g., aggregate money flow into ETFs, number of "30 days past due" in last year for a credit card account, propensity to buy a given product, etc.). These signals are most often a time series and depend on the type of behavior being tracked and assessed. Event/Anomaly signals are discrete in nature and are used to trigger certain actions or alerts when a certain threshold condition is met (e.g., ATM withdrawal that exceeds three times the daily average, bond rating downgrade by a rating agency), etc. Membership/Cluster signals designate where an entity belongs, given a dimension. For example, gaming establishments create clusters of their customers based on spending (e.g., high rollers, casual gamers, etc.), or wealth management firms can create clusters of their customers based on monthly portfolio turnover (e.g., frequent traders, buy and hold, etc.). Correlation signals continuously measure the correlation of various entities and their attributes throughout a time series of values between 0 and 1 (e.g., correlation of stock prices within a sector, unemployment and retail sales, interest rates and GDP, home prices and interest rates, etc.).

Signals have attributes based on their representation in time or frequency domains. In a time domain, a Signal can be continuous (e.g., output from a blood pressure monitor) or discrete (e.g., daily market close values of the Dow Jones Index). Within the frequency domain, signals can be defined as high or low frequency (e.g., asset allocation trends of a brokerage account can be measured every 15 minutes, daily, and monthly). Depending on the frequency of measurement, a signal derived from the underlying data can be fast-moving or slow-moving.

Signals are organized into signal sets that describe (e.g., relate to) specific business domains (e.g. customer management). Signal sets are industry-specific and cover domains including customer management, operations, fraud and risk management, maintenance, network optimization, digital marketing, etc. Signal Sets could be dynamic (e.g., continually updated as source data is refreshed), flexible (e.g., adaptable for expanding parameters and targets), and scalable (e.g., repeatable across multiple use cases and applications).

Figure 4A:
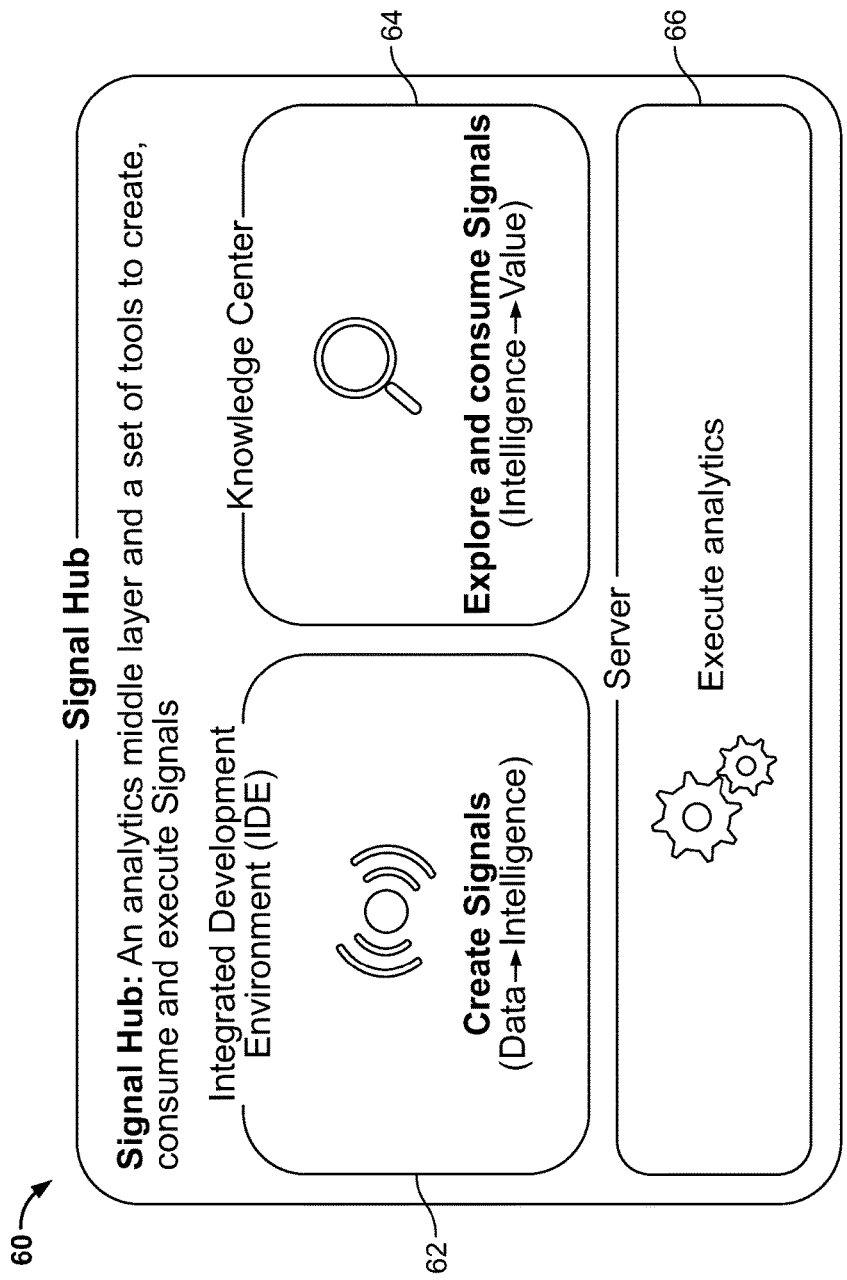
FIGS. 4A-4C are diagrams illustrating the system in greater detail.
Figure 4B:
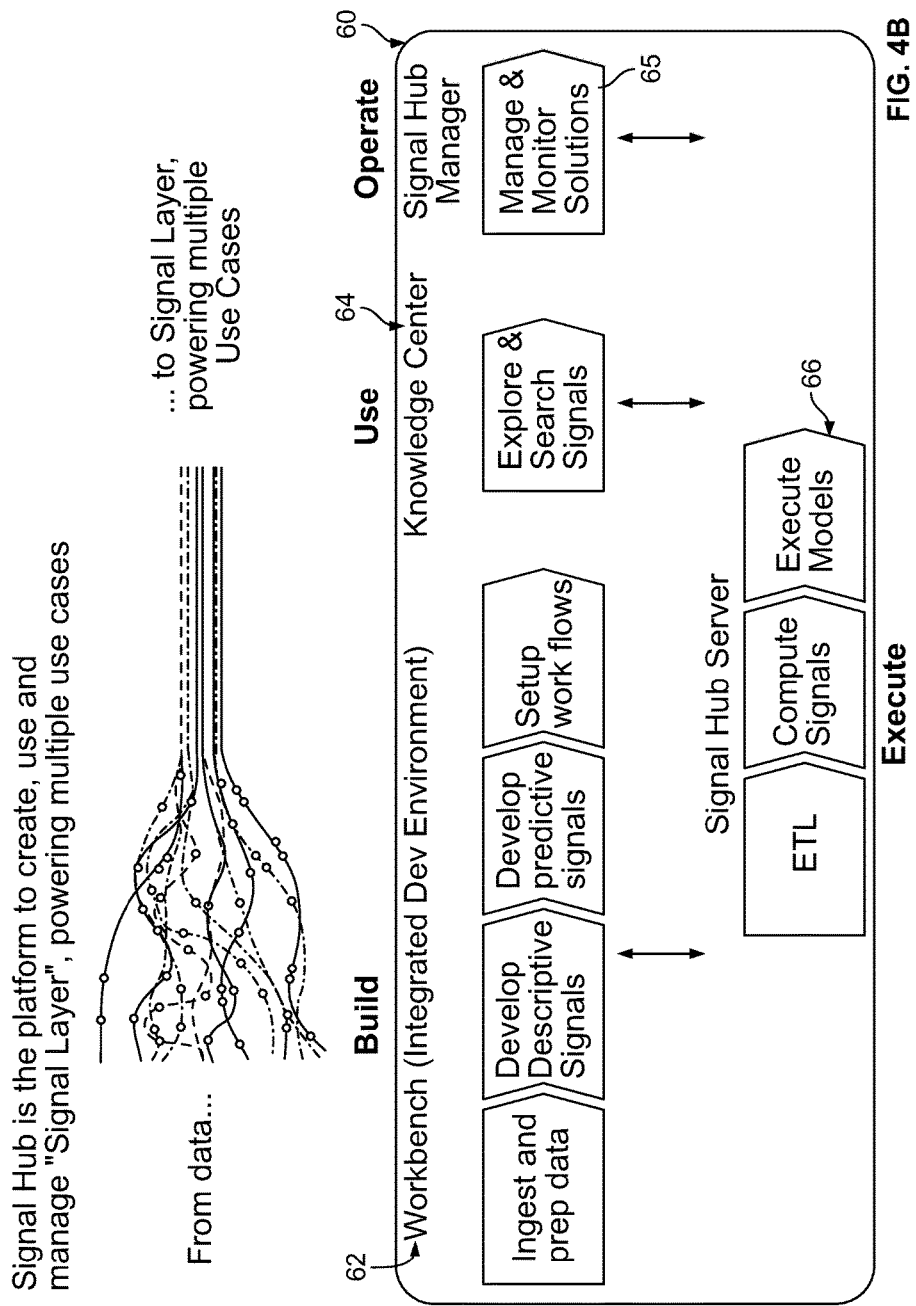

FIGS. 4A-4B are diagrams illustrating the system in greater detail. The main components of Signal Hub 60 include an integrated development environment (Workbench) 62, Knowledge Center (KC) 64, and Signal Hub Manager ("SHM") 65, and Signal Hub Server 66. The Workbench 62 is an integrated software-based productivity tool for data scientists and developers, offering analytic functionalities and approaches for the making of a complete analytic solution, from data to intelligence to value. The Workbench 62 enables scientists to more effectively transform data to intelligence through the creation of signals. Additionally, the Workbench 62 allows data scientists to rapidly develop and deploy reusable analytic code for conducting analytics on various (often, disparate) data sources, on numerous computer platforms. The Knowledge Center 64 is a centralized place for institutional intelligence and memory and facilitates the transformation of intelligence to value through the exploration and consumption of signals. The Knowledge Center 64 enables the management and reuse of signals, which leads to scalability and increased productivity. The Signal Hub manager 65 provides a management and monitoring console for analytic operational stewards (e.g., IT, business, science, etc.). The Signal Hub manager 65 facilitates understanding and managing the production quality and computing resources with alert system. Additionally, the Signal Hub manager 65 provides role-based access control for all Signal Hub platform components to increase network security in an efficient and reliable way. The Signal Hub Server 66 executes analytics by running the analytic code developed in the Workbench 62 and producing the Signal output. The Signal Hub Server 66 provides fast, flexible and scalable processing of data, code, and artifacts (e.g., in Hadoop via a data-flow execution engine; Spark Integration). The Signal Hub Server 66 is responsible for the end-to-end processing of data and its refinement into signals, as well as enabling users to solve problems across industries and domains (e.g., making Signal Hub a horizontal platform).

The platform architecture provides great deployment flexibility. It can be implemented on a single server as a single process (e.g., a laptop), or it can run on a large-scale Hadoop cluster with distributed processing, without modifying any code. It could also be implemented on a standalone computer. This allows scientists to develop code on their laptops and then move it into a Hadoop cluster to process large volumes of data. The Signal Hub Server architecture addresses the industry need for large-scale production-ready analytics, a need that popular tools such as SAS and R cannot fulfill even today, as their basic architecture is fundamentally main memory-limited.

Signal Hub components include signal sets, ETL processing, dataflow engine, signal-generating components (e.g., signal-generation processes), APIs, centralized security, model execution, and model monitoring. The more use cases that are executed using Signal Hub 60, the less time it takes to actually implement them over time because the answers to a problem may already exist inside Signal Hub 60 after a few rounds of signal creation and use case implementation. Signals are hierarchical, such that within Signal Hub 60, a signal array might include simple signals that can be used by themselves to predict behavior (e.g., customer behavior powering a recommendation) and/or can be used as inputs into more sophisticated predictive models. These models, in turn, could generate second-order, highly refined signals, which could serve as inputs to business-process decision points.

The design of the system and Signal Hub 60 allows users to use a single simple expression that represents multiple expressions of different levels of data aggregations. For example, suppose there is a dataset with various IDs. Each ID could be associated with an ID type which could also be associated with an occurrence of an event. One level of aggregation could be to determine for each ID and each ID type, the number of occurrence of an event. A second level of aggregation could be to determine for each ID, what is the most common type of ID based on the number of occurrence of an event. The system of the present disclosure allows this determination based on multiple layers of aggregation to be based on a single scalar expression and returning one expected output at one time. For example, using the code category_histogram(col), the system will create a categorical histogram for a given column, with each unique value in the column being considered a category. Using the code "mode(histogram, n=1)," allows the system to return the category with the highest number of entries. If n>1, retrieve the n'th most common value (2nd, 3rd . . . ); if n<0, retrieve the least common value (n=−1); and second least common (n=−2) etc. In the event several keys have equal frequencies, the smallest (if keys are numerical) or earliest (if keys are alphabetical) are returned. The following an example of a sample input and output based on the foregoing example.

Input:

| id | type |
|---|---|
| 1 | A |
| 1 | A |
| 1 | A |
| 1 | B |
| 2 | B |
| 2 | B |
| 2 | C |

Output:

| Id | Mode_1 |
|---|---|
| 1 | A |
| 2 | B |

Figure 4C:
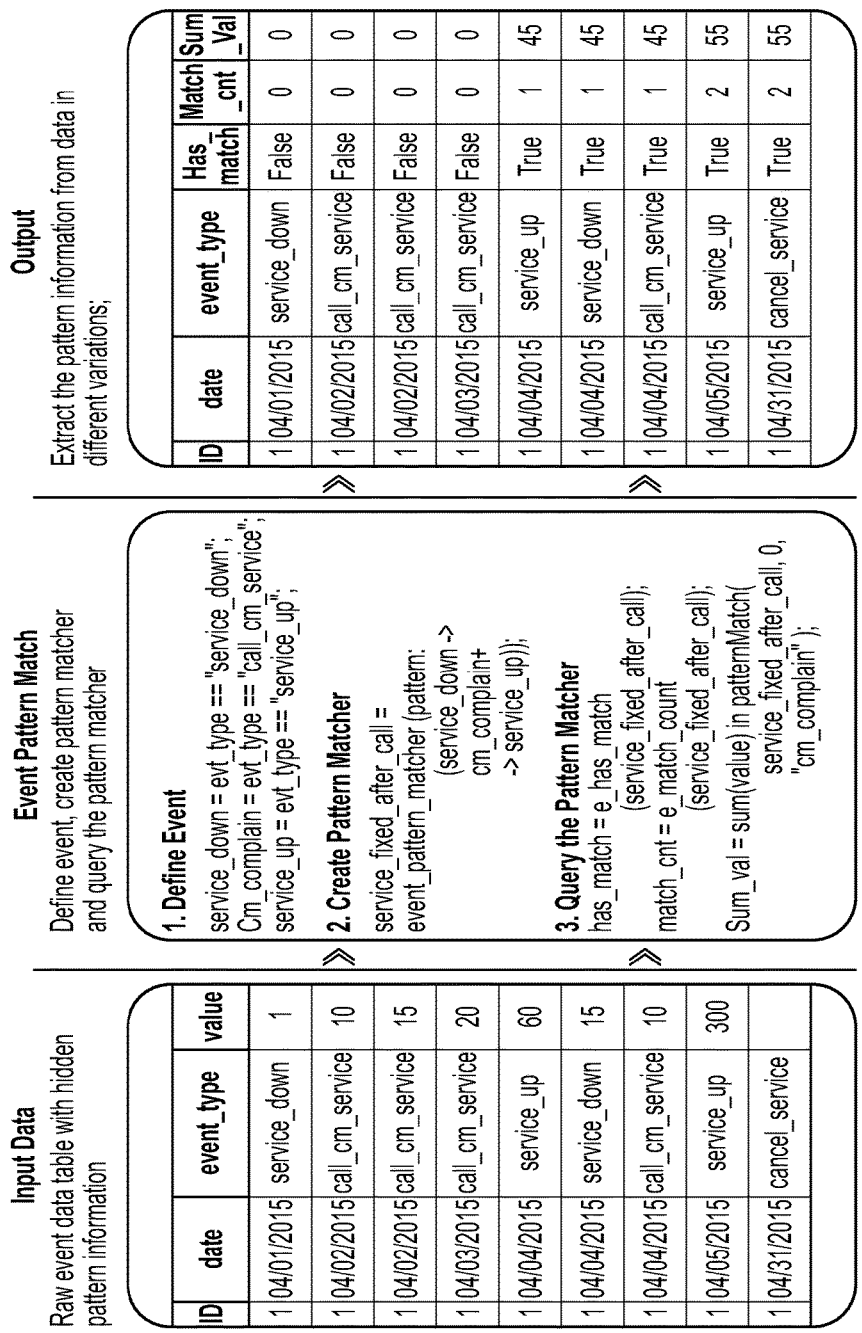

FIG. 4C is a screenshot of an event pattern matching feature of the system of the present disclosure. The system allows users to determine whether a specified sequence of events occurred in the data and then submit a query to retrieve information about the matched data. For example, in FIG. 4C, for the raw input data shown, a user can (1) define an event; (2) create a pattern matcher; and (3) query the pattern matcher to return the output as shown. As can be seen, a user can easily define with a regular expression an occurrence of a specified event such as "service fixed after call." Once the pattern matches algorithm is executed, a signal is extracted in the output showing the pattern occurrence.

Figure 5:
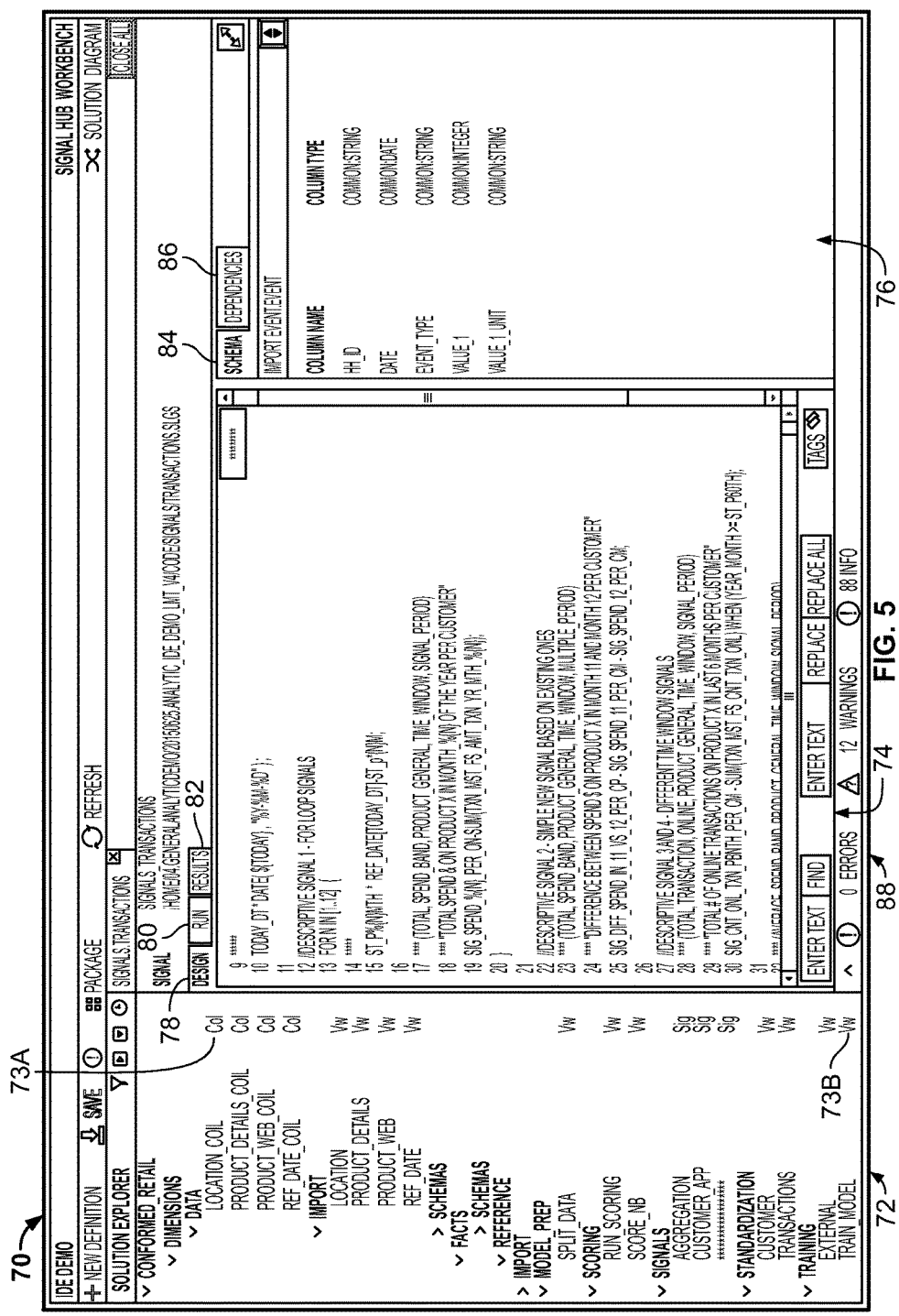
FIG. 5 is a screenshot illustrating an integrated development environment generated by the system.

FIG. 5 is a screenshot illustrating a Workbench 70 generated by the system. The Workbench 70 (along with the Knowledge Center) enables users to interact with the functionality and capabilities of the Signal Hub system via a graphical user interface (GUI). The Workbench 70 is an environment to develop end-to-end analytic solutions (e.g., a development environment for analytics) including reusable and easily developed analytic code. It offers all the necessary functionality for aggregating of the entire analytic modeling process, from data to signals. It provides an environment for the coding and development of data schemas, data quality management processes (e.g. missing value imputation and outlier detection), collections (e.g., the gathering of raw data files with the same data schema), views (e.g., logic to create a new relational dataset from other views or collections), descriptive and predictive signals, model validation and visualization (e.g., measuring of model performance through ROC (receiver operator characteristic), KS (Kolmogorov-Smirnov), Lorenz curves, etc.), visualization and maintenance of staging, input, output data models, etc. The Workbench 70 facilitates data ingestion and manipulating, as well as enabling data scientists to extract intelligence and value from data through signals (e.g., analytics through signal creation and computation).

The user interface of the Workbench could include components such as a tree view 72, an analytic code development window 74, and a supplementary display portion 76. The tree view 72 displays each collection of raw data files (e.g., indicated by "Col" 73a) as well as logical data views (e.g., indicated by "Vw" 73b), as well as third-party code called as user defined functions if any (e.g., python, R, etc.). The analytic code development window 74 has a plurality of tabs including Design 78, Run 80, and Results 82. The Design tab 78 provides a space where analytic code can be written by the developer. The Run tab 80 allows the developer to run the code and generate signal sets. Finally, the Results tab 82 allows the developer to view the data produced by the operations defined in the Run tab 80.

The supplementary display portion 76 could include additional information including schemas 84 and dependencies 86. Identifying, extracting, and calculating signals at scale from noisy big data requires a set of predefined signal schema and a variety of algorithms. A signal schema is a specific type of template used to transform data into signals. Different types of schema may be used, depending on the nature of the data, the domain, and/or the business environment. Initial signal discovery could fall into one or more of a variety of problem classes (e.g., regression classification, clustering, forecasting, optimization, simulation, sparse data inference, anomaly detection, natural language processing, intelligent data design, etc.). Solving these problem classes could require one or more of a variety of modeling techniques and/or algorithms (e.g., ARMA, CART, CIR++, compression nets, decision trees, discrete time survival analysis, D-Optimality, ensemble model, Gaussian mixture model, genetic algorithm, gradient boosted trees, hierarchical clustering, kalman filter, k-means, KNN, linear regression, logistic regression, Monte Carlo Simulation, Multinomial logistic regression, neural networks, optimization (LP, IP, NLP), poisson mixture model, Restricted Boltzmann Machine, Sensitivity trees, SVD, A-SVD, SVD++, SVM, projection on latent structures, spectral graph theory, etc.).

Advantageously, the Workbench 70 provides access to pre-defined libraries of such algorithms, so that they can be easily accessed and included in analytic code being generated. The user then can re-use analytic code in connection with various data analytics projects. Both data models and schemas can be developed within the Workbench 70 or imported from popular third-party data modeling tools (e.g., CA Erwin). The data models and schemas are stored along with the code and can be governed and maintained using modern software lifecycle tools. Typically, at the beginning of a Signal Hub project, the Workbench 70 is used by data scientists for profiling and schema discovery of unfamiliar data sources. Signal Hub provides tools that can discover schema (e.g., data types and column names) from a flat file or a database table. It also has built-in profiling tools, which automatically compute various statistics on each column of the data such as missing values, distribution parameters, frequent items, and more. These built-in tools accelerate the initial data load and quality checks.

Once data is loaded and discovered, it needs to be transformed from its raw form into a standard representation that will be used to feed the signals in the signal layer. Using the Workbench 70, data scientists can build workflows composed of "views" that transform the data and apply data quality checks and statistical measures. The Signal Hub platform can continuously execute these views as new data appears, thus keeping the signals up to date.

The dependencies tab 86 could display a dependency diagram (e.g., a graph) of all the activities comprising the analytic project, as discussed below in more detail. A bottom bar 88 could include compiler information, such as the number of errors and warnings encountered while processing views and signal sets.

Figure 6:
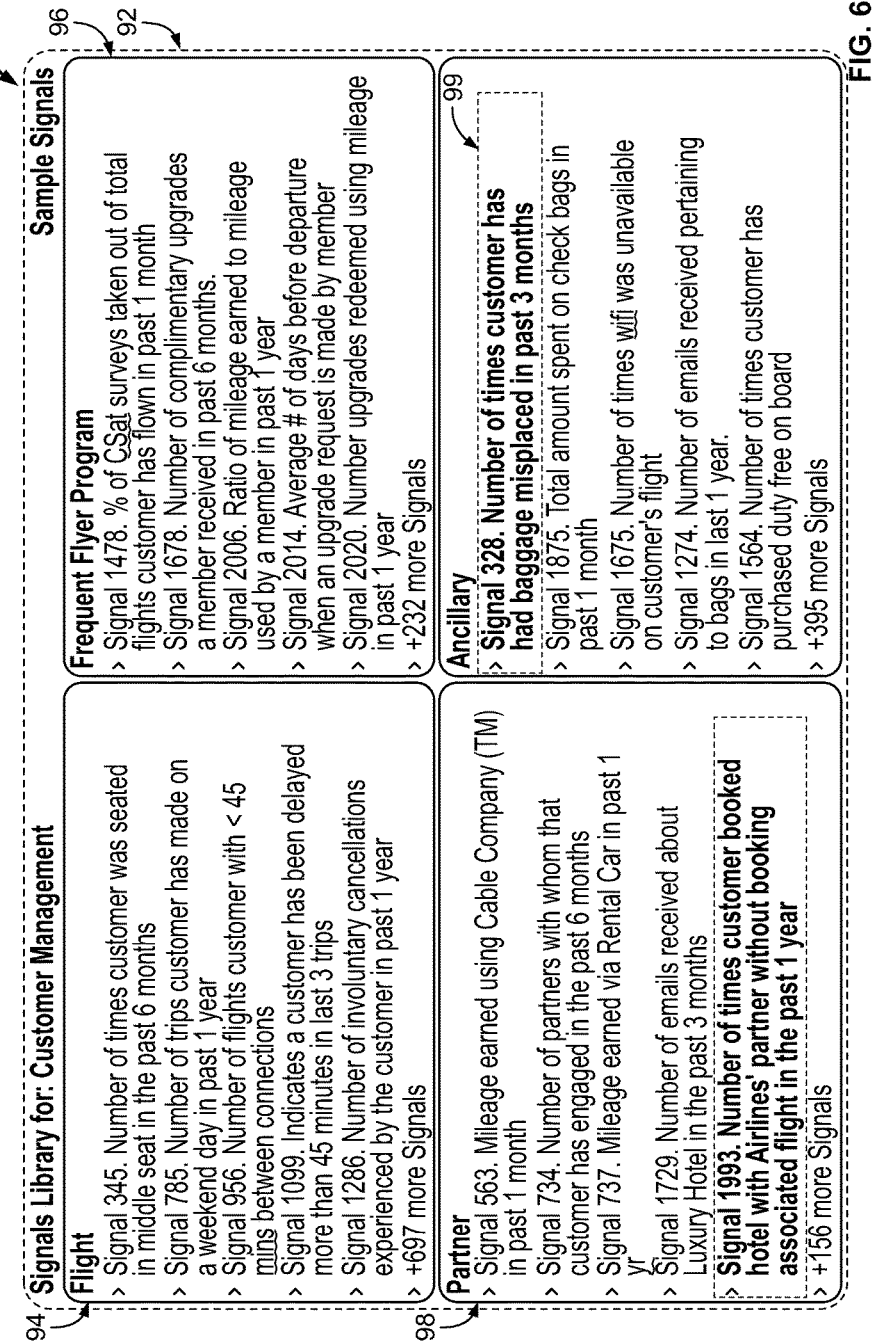
FIG. 6 is a diagram illustrating signal library and potential use cases of the system.

FIG. 6 is a diagram 90 illustrating use cases (e.g., outputs, signals, etc.) of the system. There could be multiple signal libraries, each with subcategories for better navigation and signal searching. For example, as shown, the Signal Hub could include a Customer Management signal library 92. Within the Customer Management Signal Library 92 are subcategories for Flight 94, Frequent Flyer Program 96, Partner 98, and Ancillary 99. The Flight subcategory 94 could include, for example, "Signal 345. Number of times customer was seated in middle seat in the past 6 months," "Signal 785. Number of trips customer has made on a weekend day in past 1 year," "Signal 956. Number of flights customer with <45 mins between connections," "Signal 1099. Indicates a customer has been delayed more than 45 minutes in last 3 trips," "Signal 1286. Number of involuntary cancellations experienced by the customer in past 1 year," etc. The Frequent Flyer Program subcategory 96 could include, for example, "Signal 1478. % of CSat surveys taken out of total flights customer has flown in past 1 month," "Signal 1678. Number of complimentary upgrades a member received in past 6 months," "Signal 2006. Ratio of mileage earned to mileage used by a member in past 1 year," "Signal 2014. Average # of days before departure when an upgrade request is made by member," "Signal 2020. Number upgrades redeemed using mileage in past 1 year," etc. The Partner subcategory 98 could include, for example, "Signal 563. Mileage earned using Cable Company (TM) in past 1 month," "Signal 734. Number of partners with whom that customer has engaged in the past 6 months," "Signal 737. Mileage earned via Rental Car in past 1 yr," "Signal 1729. Number of emails received about Luxury Hotel in the past 3 months," "Signal 1993. Number of times customer booked hotel with Airlines' partner without booking associated flight in the past 1 year," etc. The Ancillary subcategory 99 could include, for example, "Signal 328. Number of times customer has had baggage misplaced in past 3 months," "Signal 1875. Total amount spent on check bags in past 1 month," "Signal 1675. Number of times wife was unavailable on customer's flight," "Signal 1274. Number of emails received pertaining to bags in last 1 year," "Signal 1564. Number of times customer has purchased duty free on board," etc.

Figure 46:
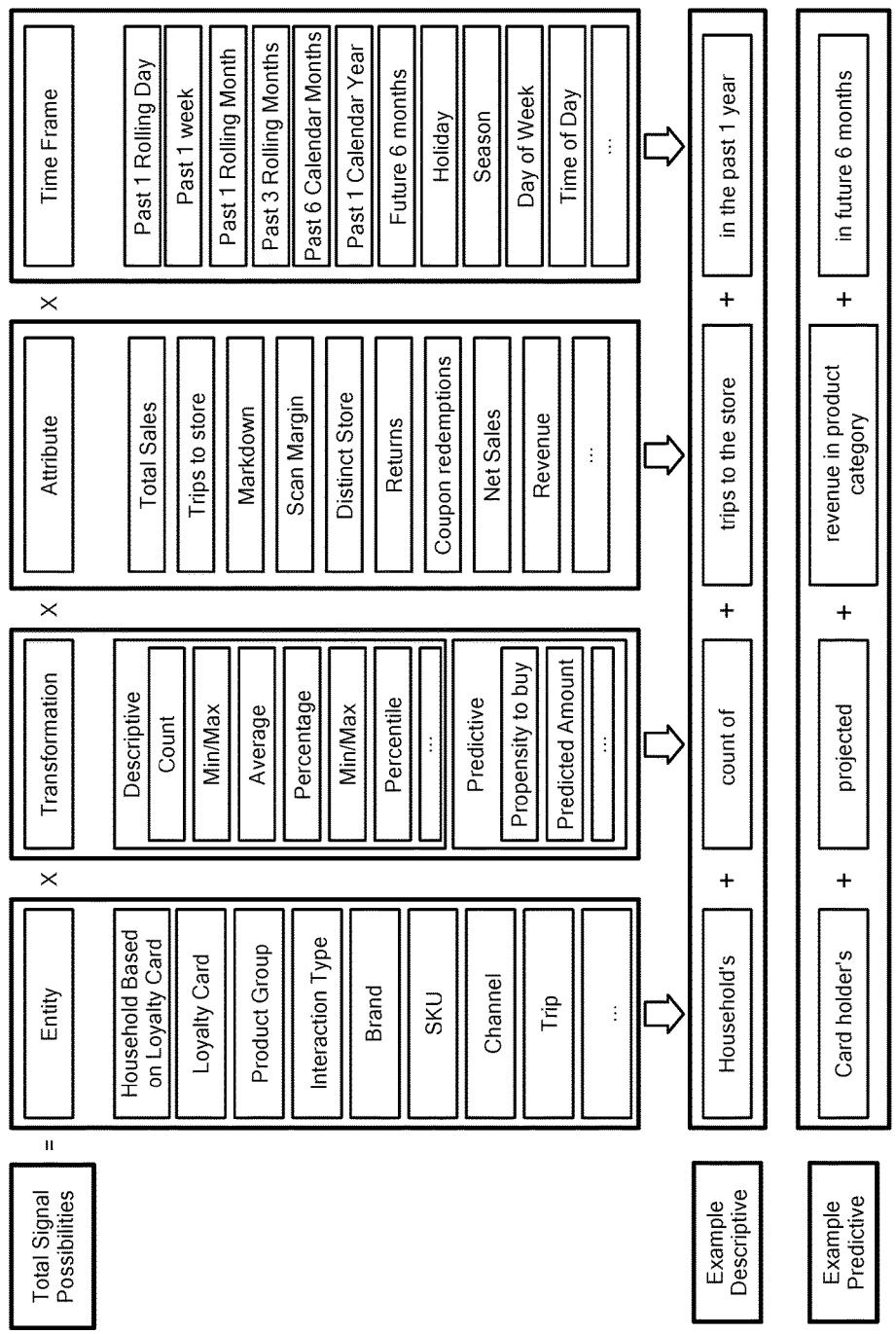
FIG. 46 is a schematic diagram illustrating an example signal creation layer methodology in accordance with one exemplary embodiment.

FIG. 46 is a schematic diagram illustrating an example signal creation layer methodology in accordance with one exemplary embodiment. Signals can be created through various combinations and permutations of categories. In this example, signals can be created through various combinations and permutations of categories including entity, transformation, attribute and time frame. Thus, one exemplary descriptive signal is a household's count of trips to the store in the past 1 year, and one exemplary predictive signal is a card holder's projected revenue in a particular product category in the future 6 months. Signals can be based on scalar functions (e.g., functions that compute a value based on a single record) or aggregate functions (e.g., functions that need to pass over the entire dataset in order to compute a value, such as to compute, say, average household income across all households). Such signals can be created automatically and can be updated automatically as source data is received and processed. The signals can be provided as a signal layer for use by various applications.

Figure 7:
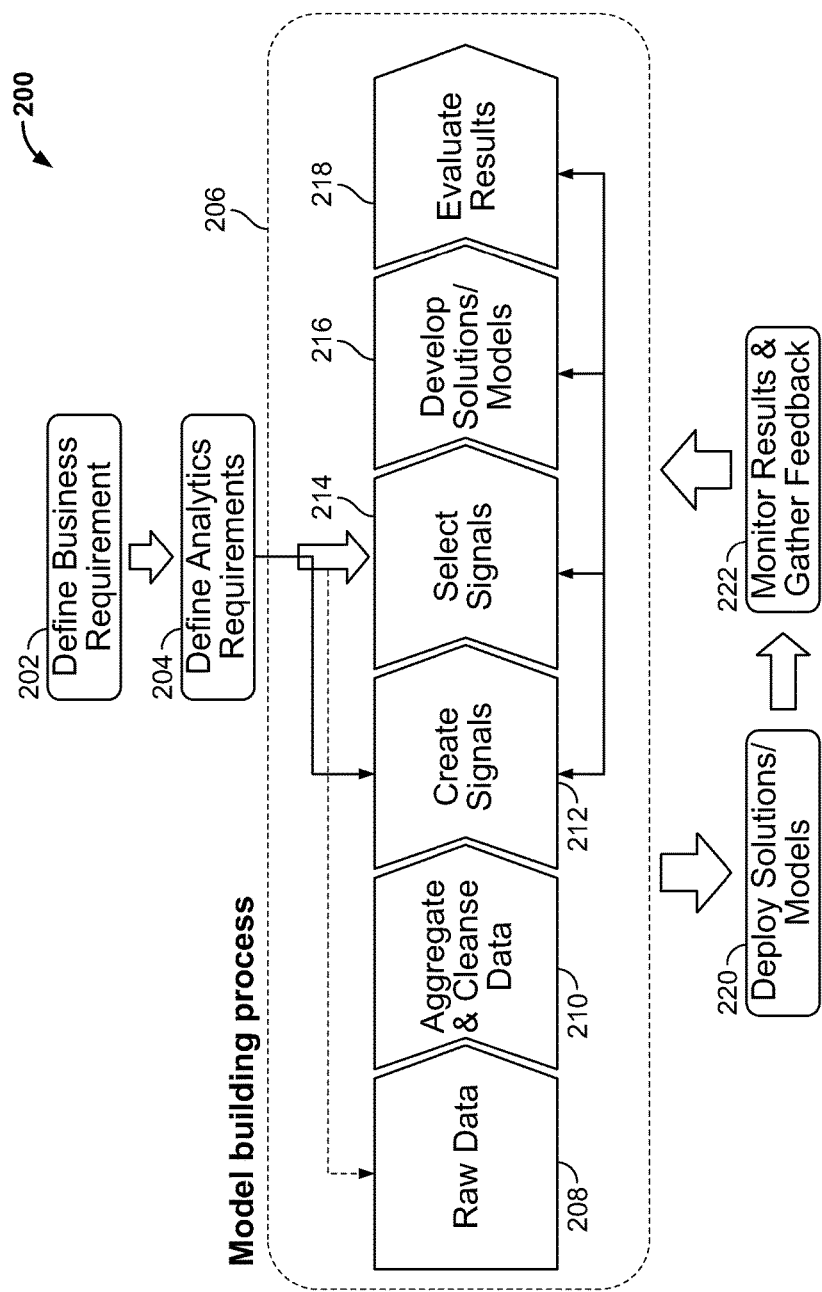
FIG. 7 is a diagram illustrating analytic model development and deployment carried out by the system.

FIG. 7 is a diagram illustrating analytic model development and deployment carried out by the system. In step 202, a user defines a business requirement (e.g., business opportunity, business problem) needing analyzing. In step 204, one or more analytics requirements are defined. In step 214, the user searches for signals, and if an appropriate signal is found, the user selects the signal. If a signal is not found, then in step 212, the user creates one or more signals by identifying the aggregated and cleansed data to base the signal on. After the signal is created, the process then proceeds to step 214. If the raw data is not available to create the signal in step 212, then in step 208 the user obtains the raw data, and in step 210, the data is aggregated and cleansed, and then the process proceeds to step 212. It is noted that the system of the present disclosure facilitates skipping steps 208-212 (unlike the traditional approach which must proceed through such steps for every new business requirement).

Once the signals are selected, then in step 216, solutions and models are developed based on the signals selected. In step 218, results are evaluated and if necessary, signals (e.g., created and/or selected) and/or solutions/models are revised accordingly. Then in step 220, the solutions/models are deployed. In step 222, results are monitored and feedback gathered to incorporate back into the signals and/or solutions/models.

Figure 8:
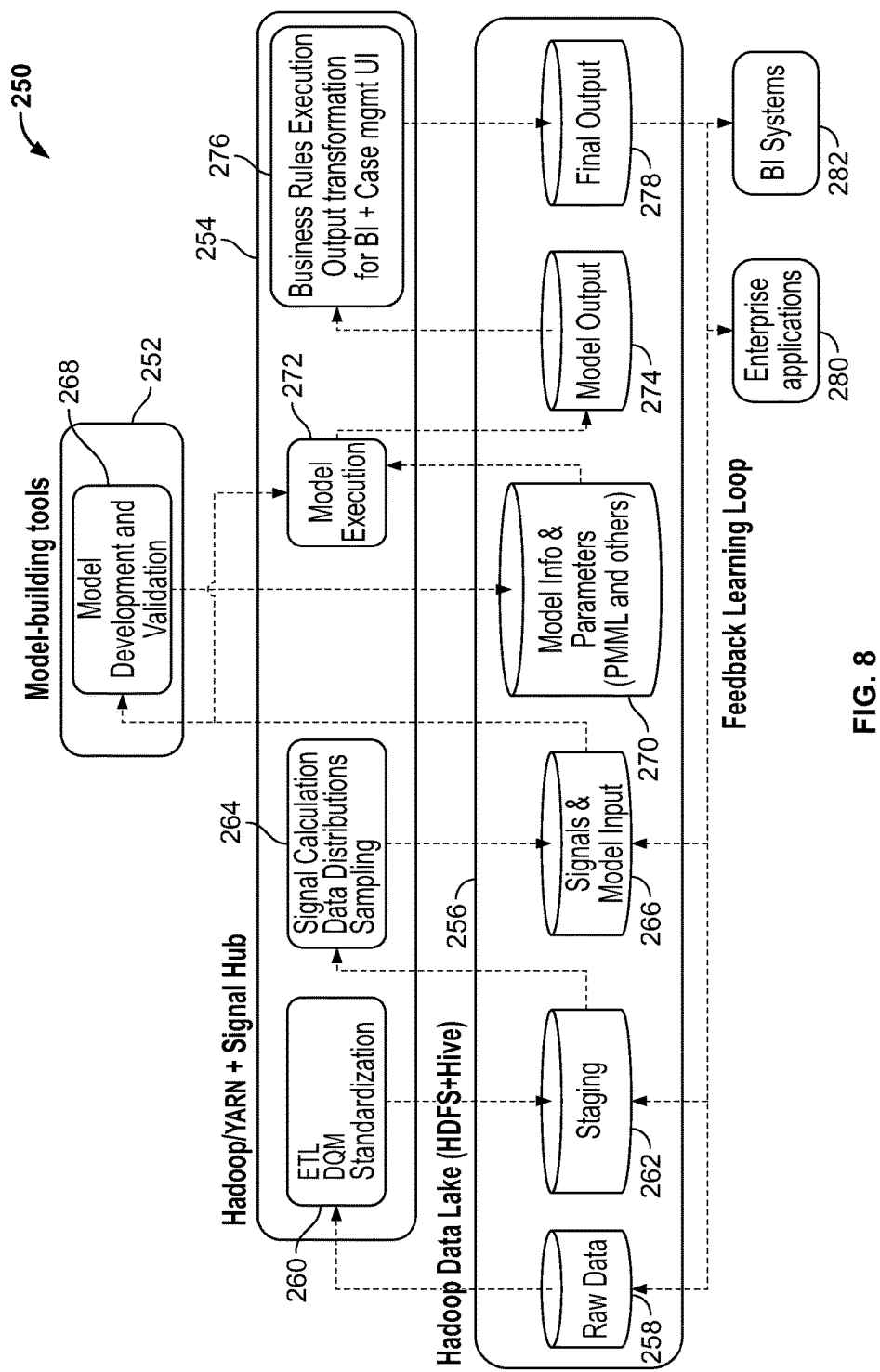
FIG. 8 is a diagram illustrating hardware and software components of the system in one implementation.

FIG. 8 is a diagram 250 illustrating hardware and software components of the system in one implementation. Other implementations could be implemented. The workflow includes model-building tools 252, Hadoop/YARN and Signal Hub processing steps 254, and Hadoop Data Lake (Hadoop Distributed file system (HDFS) and HIVE) databases 256.

The Signal Hub Server is able to perform large-scale processing of terabytes of data across thousands of Signals. It follows a data-flow architecture for processing on a Hadoop cluster (e.g., Hadoop 2.0). Hadoop 2.0 introduced YARN (a large-scale, distributed operating system for big data applications), which allows many different data processing frameworks to coexist and establishes a strong ecosystem for innovating technologies. With YARN, Signal Hub Server solutions are native certified Hadoop applications that can be managed and administered alongside other applications. Signal Hub users can leverage their investment in Hadoop technologies and IT skills and run Signal Hub side-by-side with their current Hadoop applications.

Raw data is stored in the raw data database 258 of the Hadoop Data Lake 256. In step 260, Hadoop/Yarn and Signal Hub 254 process the raw data 258 with ETL (extract, transform, and load) modules, data quality management modules, and standardization modules. The results of step 260 are then stored in a staging database 262 of the Hadoop Data Lake. In step 260, Hadoop/Yarn and Signal Hub 254 process the staging data 262 with signal calculation modules, data distribution modules, and sampling modules. The results of step 264 are then stored in the Signals and Model Input database 266. In step 268, the model development and validation module 268 of the model building tools 252 processes the signals and model input data 266. The results of step 268 are then stored in the model information and parameters database 270. In step 272, the model execution module 272 of the Hadoop/Yarn and Signal Hub 254 processes signals and model input data 266 and/or model information and parameters data 270. The results of step 272 are then stored in the model output database 274. In step 276, the Hadoop/Yarn and Signal Hub 254 processes the model output data 274 with a business rules execution output transformation for business intelligence and case management user interface. The results of step 276 are then stored in the final output database 278. Enterprise applications 280 and business intelligence systems 282 access the final output data 278, and can provide feedback to the system which could be integrated into the raw data 258, the staging data 262, and/or the signals and model input 266.

The Signal Hub Server automates the processing of inputs to outputs. Because of its data flow architecture, it has a speed advantage. The Signal Hub Server has multiple capabilities to automate server management. It can detect data changes within raw file collections and then trigger a chain of processing jobs to update existing Signals with the relevant data changes without transactional system support.

Figure 9:
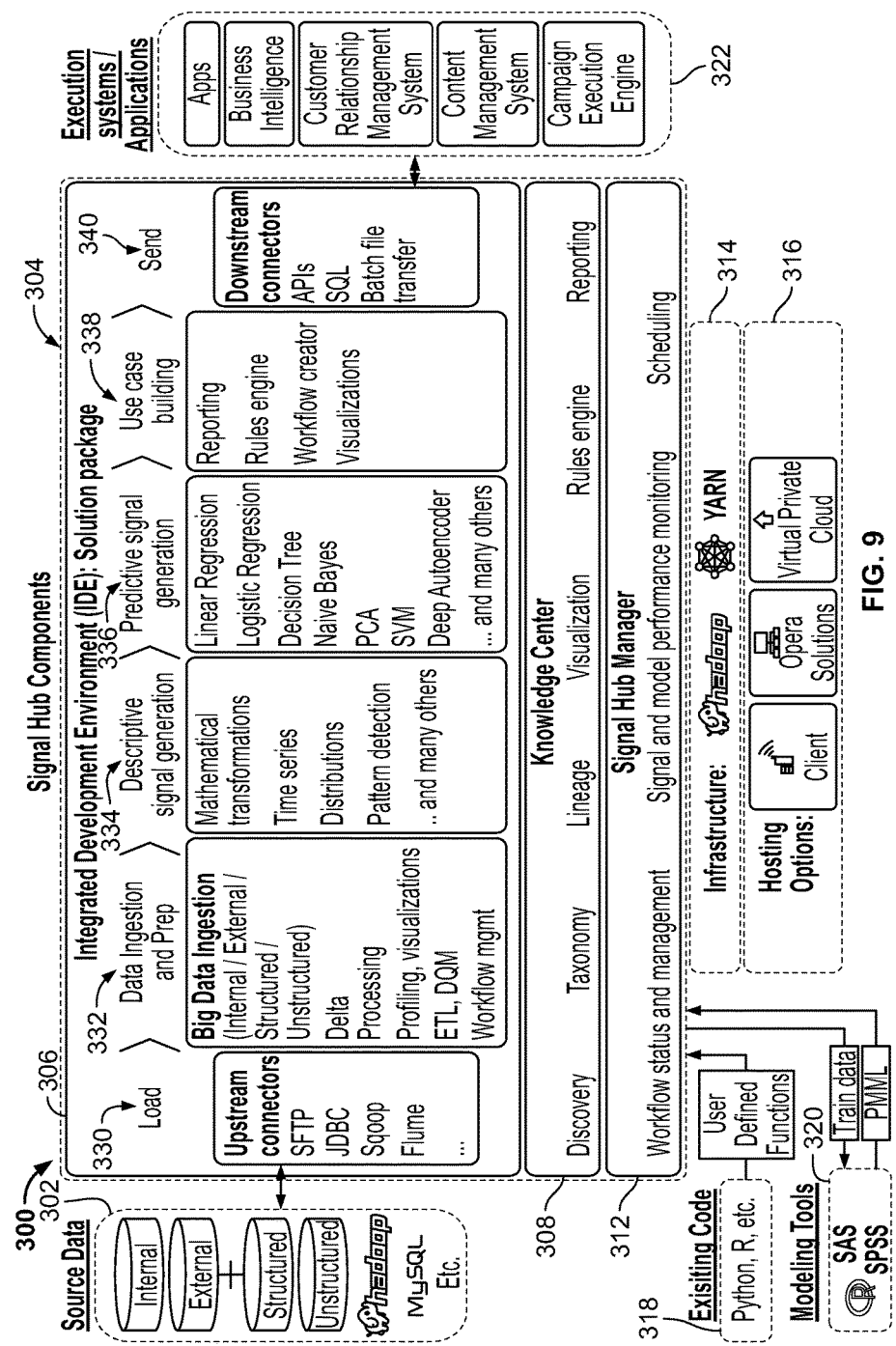
FIGS. 9-10 are diagrams illustrating hardware and software components of the system during development and production.
Figure 10:
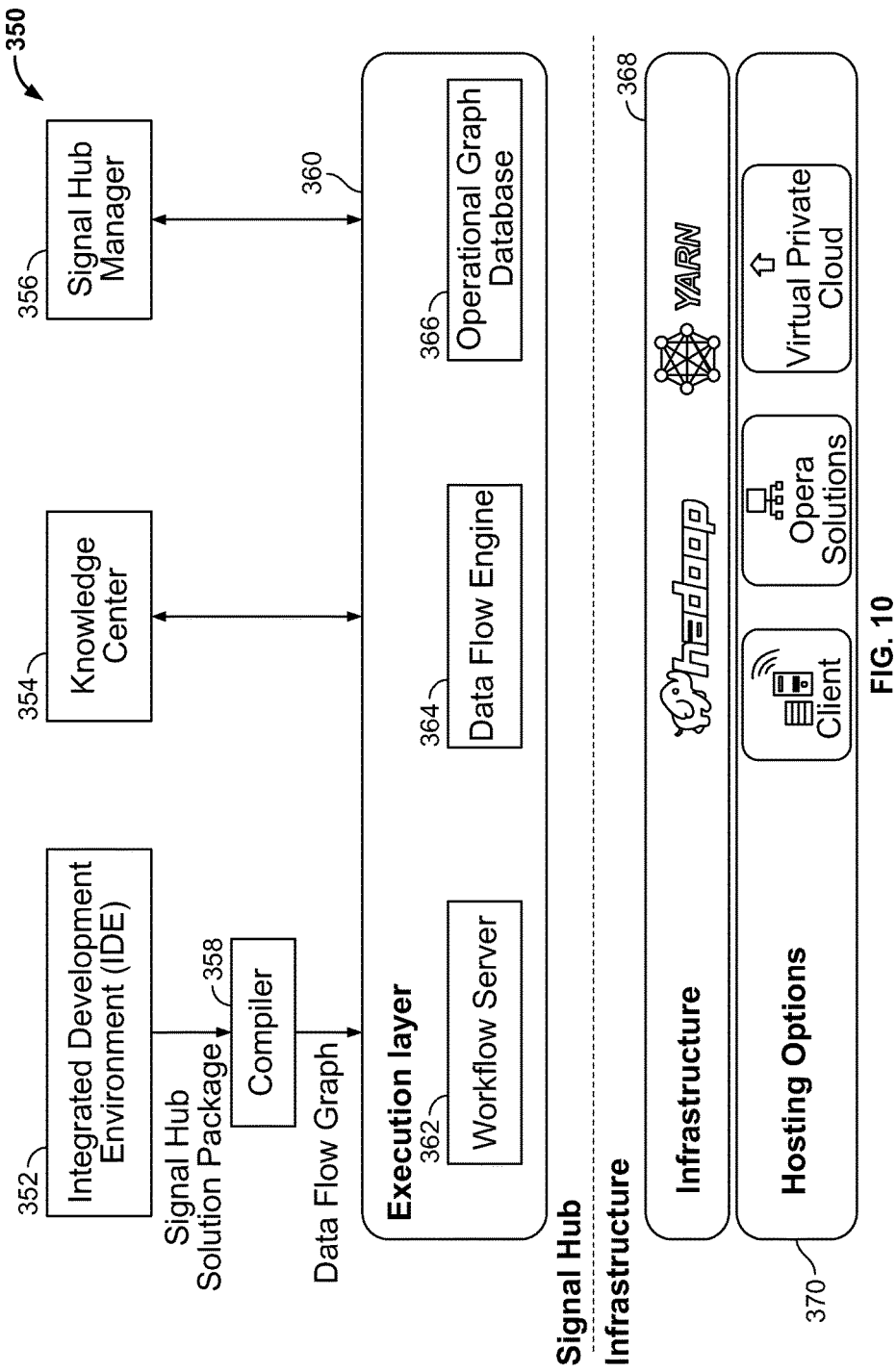

FIGS. 9-10 are diagrams illustrating hardware and software components of the system during development and production. More specifically, FIG. 9 is a diagram 300 illustrating hardware and software components of the system during development and production. Source data 302 is in electrical communication with Signal Hub 304. Signal Hub 304 comprises a Workbench 306, and a Knowledge Center 308. Signal Hub 304 could also include a server in electronic communication with the Workbench 306 and the Knowledge Center 308, such as via Signal Hub manager 312. Signal Hub further comprises infrastructure 314 (e.g., Hadoop, YARN, etc.) and hosting options 316, such as Client, Opera, and Virtual Cloud (e.g., AWS).

Signal Hub 304 allows companies to absorb information from various data sources 302 to be able to address many types of problems. More specifically, Signal Hub 304 can ingest both internal and external data as well as structured and unstructured data. As part of the Hadoop ecosystem, the Signal Hub Server can be used together with tools such as Sqoop or Flume to digest data after it arrives in the Hadoop system. Alternatively, the Signal Hub Server can directly access any JDBC (Java Database Connectivity) compliant database or import various data formats transferred (via FTP, SFTP, etc.) from source systems.

Signal Hub 304 can incorporate existing code 318 coded in various (often non-compatible) languages (e.g., Python, R, Unix Shell, etc.), called from the Signal Hub platform as user defined functions. Signal hub 304 can further communicate with modeling tools 320 (e.g., SAS, SPSS, etc.), such as via flat file, PMML (Predictive Model Markup Language), etc. The PMML format is a file format describing a trained model. A model developed in SAS, R, SPSS, or other tools can be consumed and run within Signal Hub 304 via the PMML standard. Advantageously, such a solution allows existing analytic code that may be written in various, non-compatible languages (e.g., SAS, SPSS, Python, R, etc.) to be seamlessly converted and integrated for use together within the system, without requiring that the existing code be re-written. Additionally, Signal Hub 304 can create tests and reports as needed. Through the Workbench, descriptive signals can be exported into a flat file for the training of predictive models outside Signal Hub 304. When the model is ready, it can then be brought back to Signal Hub 304 via the PMML standard. This feature is very useful if a specific machine-learning technique is not yet part of the model repertoire available in Signal Hub 304. It also allows Signal Hub 304 to ingest models created by clients in third-party analytic tools (including R, SAS, SPSS). The use of PMML allows Signal Hub users to benefit from a high level of interoperability among systems where models built in any PMML-compliant analytics environment can be easily consumed. In other words, because the system can automatically convert existing (legacy) analytic code modules/libraries into a common format that can be executed by the system (e.g., by automatically converting such libraries into PMML-compliant libraries that are compatible with other similarly compliant libraries), the system thus permits easy integration and re-use of legacy analytic code, interoperably with other modules throughout the system.

Signal Hub 304 integrates seamlessly with a variety of front-end systems 322 (e.g., use-case specific apps, business intelligence, customer relationship management (CRM) system, content management system, campaign execution engine, etc.). More specifically, Signal Hub 304 can communicate with front end systems 322 via a staging database (e.g., MySQL, HIVE, Pig, etc.). Signals are easily fed into visualization tools (e.g. Pentaho, Tableau), CRM systems, and campaign execution engines (e.g. Hubspot, ExactTarget). Data is transferred in batches, written to a special data landing zone, or accessed on-demand via APIs (application programming interfaces). Signal Hub 304 could also integrate with existing analytic tools, pre-existing code, and models. Client code can be loaded as an external library and executed within the server. All of this ensures that existing client investments in analytics can be reused with no need for recoding.

The Workbench 306 could include a workflow to process signals that includes loading 330, data ingestion and preparation 332, descriptive signal generation 336, use case building 338, and sending 340. In the loading step 330, source data is loaded into the Workbench 306 in any of a variety of formats (e.g., SFTP, JDBC, Sqoop, Flume, etc.). In the data ingestion and preparation step 332, the Workbench 306 provides the ability to process a variety of big data (e.g., internal, external, structured, unstructured, etc.) in a variety of ways (e.g., delta processing, profiling, visualizations, ETL, DQM, workflow management, etc.). In the descriptive signal generation step 334, a variety of descriptive signals could be generated (e.g., mathematical transformations, time series, distributions, pattern detection, etc.). In the predictive signal generation step 336, a variety of predictive signals could be generated (e.g., linear regression, logistic regression, decision tree, Naïve Bayes, PCA, SVM, deep autoencoder, etc.). In the use case building step 338, uses cases could be created (e.g., reporting, rules engine, workflow creator, visualizations, etc.). In the sending step 340, the Workbench 306 electronically transmits the output to downstream connectors (e.g., APIs, SQL, batch file transfer, etc.).

FIG. 10 is a diagram 350 illustrating hardware and software components of the system during production. As discussed in FIG. 9, Signal Hub includes a Workbench 352, a Knowledge Center 354, and a Signal Hub Manager 356. The Workbench 352 could communicate with an execution layer 360 via a compiler 358. The Knowledge Center 354 and Signal Hub manager 356 could directly communicate with the execution layer 360. The execution layer 360 could include a workflow server 362, a plurality of flexible data flow engines 364, and an operational graph database 366. Signal Hub further comprises infrastructure 366 (e.g., Hadoop, YARN, etc.) and hosting options 370, such as Client, Opera, and Virtual Private Cloud (e.g., AWS, Amazon, etc.). The plurality of flexible data flow engines 364 can have the latest cutting-edge technology.

FIGS. 11-17 are screenshots illustrating use of the Signal Hub platform to create descriptive signals. The Workbench user interface 500 includes a tree view 502 and an analytic code development window 504. The Workbench provides direct access to the Signal API, which speeds up development and simplifies (e.g., reduce errors in) signal creation (e.g., descriptive signals). The Signal API provides an ever-growing set of mathematical transformations that will allow for the creation of powerful descriptive signals, along with a syntax that is clear, concise, and expressive. Signal API allows scientists to veer away from the implementation details and focus solely on data analysis, thus maximizing productivity and code reuse. For example, the Signal API allows for easy implementation of complex pattern-matching signals. For example, for the telecom industry, one pattern could be a sequence of events in the data that are relevant for measuring attrition, such as a widespread service disruption followed by one or more customer complaints followed by restored service. The Signal API also provides a direct link between the Workbench and the Knowledge Center. Users can add metatags and descriptions to signals directly in Signal API code (which is reusable analytic code). These tags and taxonomy information are then used by the Knowledge Center to enable signal search and reuse, which greatly enhances productivity.

As for predictive signals, training and testing of models can easily be done in the Workbench through its intuitive and interactive user interface. Current techniques available for modeling and dimensionality reduction include SVMs, k-means, decision trees, association rules, linear and logistic regression, neural networks, RBM (machine-learning technique), PCA, and Deep AutoEncoder (machine-learning technique) which allows data scientists to train and score deep-learning nets. Some of these advanced machine-learning techniques (e.g., Deep AutoEncoder and RBM) project data from a high-dimensional space into a lower-dimensional one. These techniques are then used together with clustering algorithms to understand customer behavior.

Figure 11:
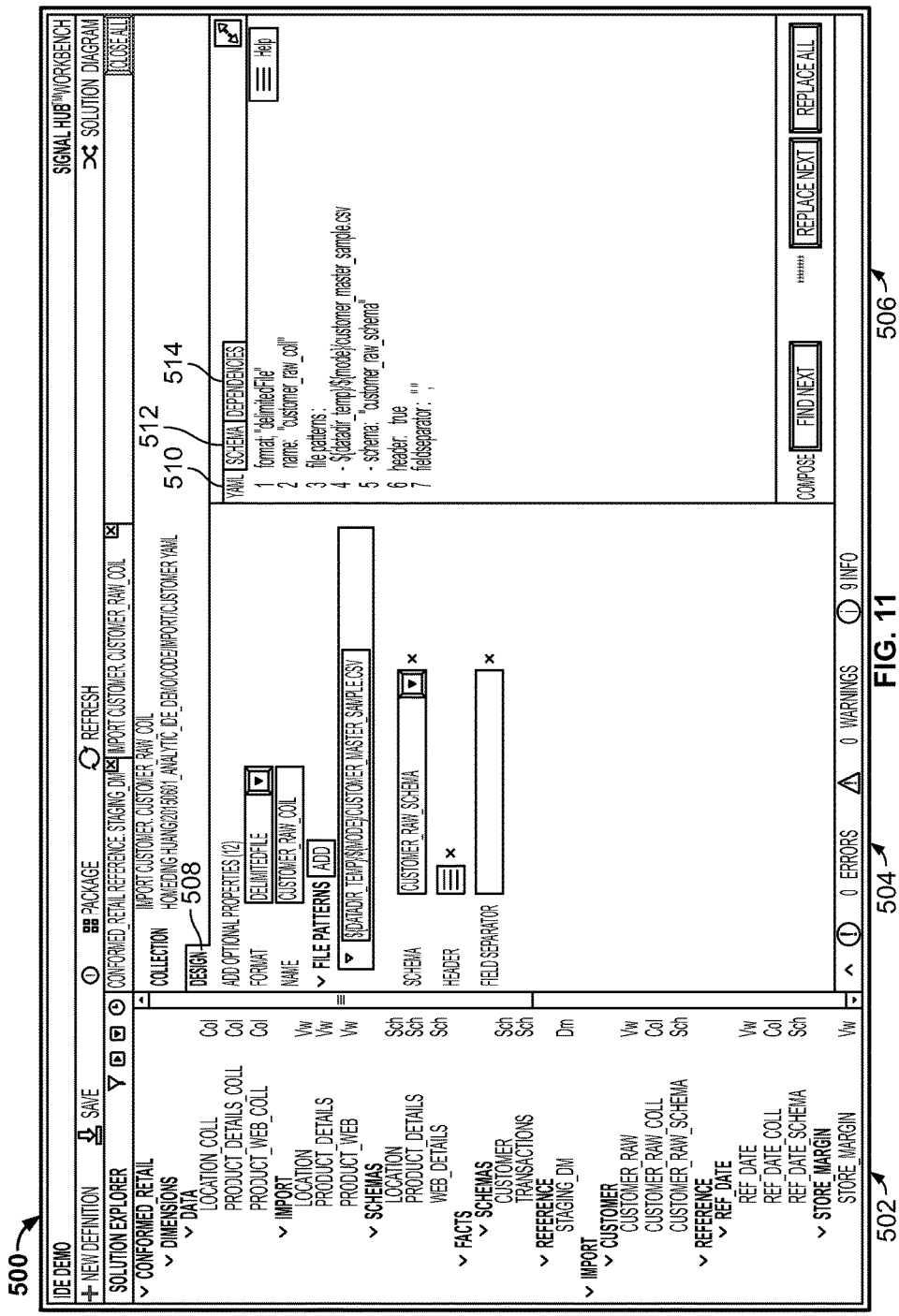
FIG. 11 is a screenshot illustrating data profiles for each column using the integrated development environment generated by the system.

FIG. 11 is a screenshot illustrating data profiles for each column (e.g., number of unique, number of missing, average, max, min, etc.) using the Workbench 500 generated by the system. As described above, the Workbench user interface could include sets of components including a tree view 502, an analytic code development window 504, and a supplementary display portion 506. The analytic code development window 504 includes a design tab 508, which provides a user with the ability to choose a format, name, file pattern, schema, header, and/or field separator. Signal Hub supports various input file formats including delimited, fixed width, JDBX, xml, excel, log file, etc. A user can load data from various data sources. More specifically, parameterized definitions allow a user to load data from a laptop, cluster, and/or client database system. The supplementary display portion 506 includes a YAML tab 510, a Schema tab 512, and a dependencies tab 514. The YAML tab 510 includes a synchronized editor so that a user can develop the code in a graphical way or in a plain text format, where these two formats are easily synchronized.

Figure 12:
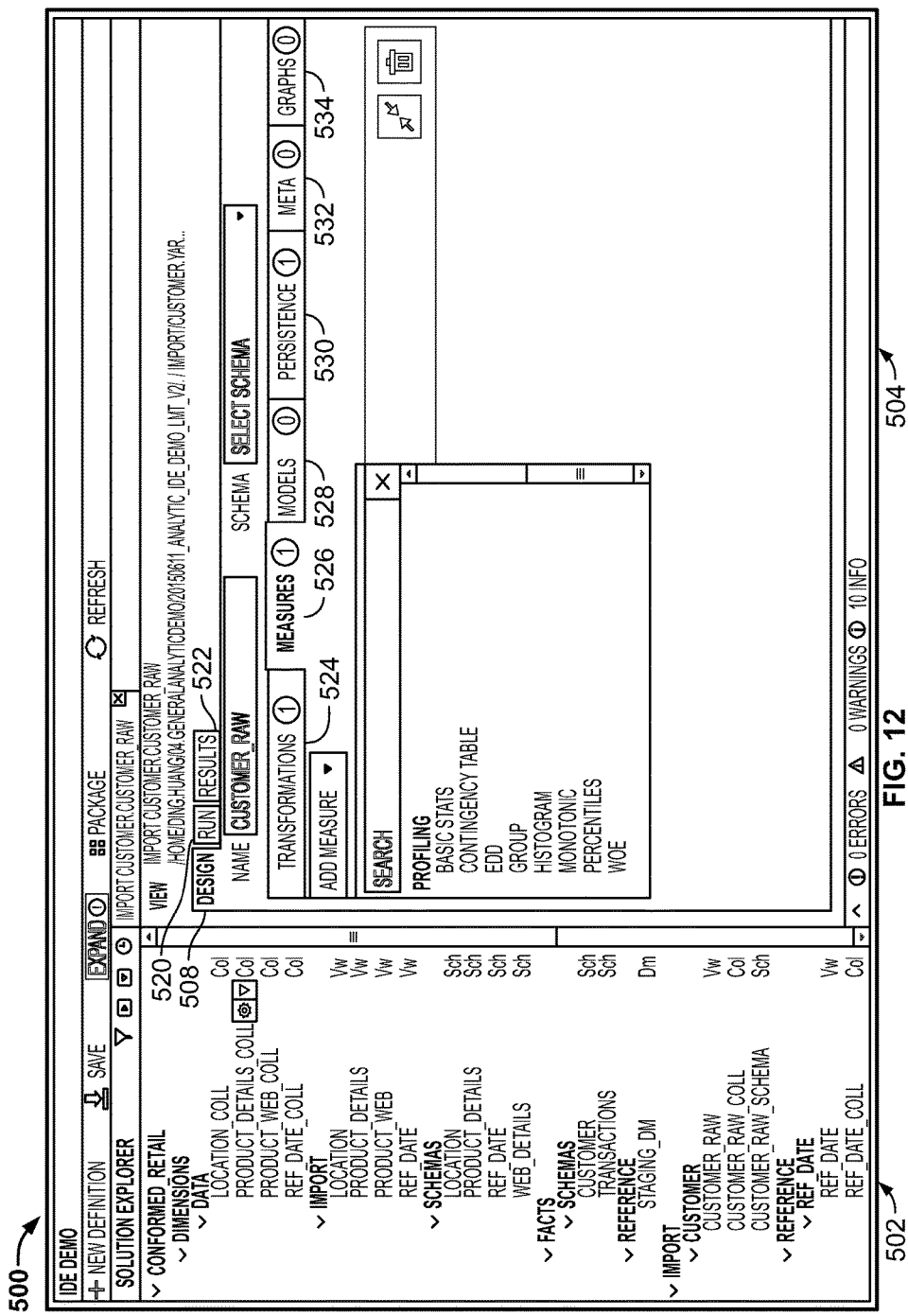
FIG. 12 is a screenshot illustrating profiling of raw data using the integrated development environment generated by the system.

FIG. 12 is a screenshot illustrating profiling of raw data using the Workbench 500 generated by the system. The analytic code development window 504 includes a design tab 508, a run tab 520, and a results tab 522. The design tab 508 is activated, and within the design tab 508 are a plurality of other tabs. More specifically, the design tab 508 includes a transformations tab 524, a measures tab 526, a models tab 528, a persistence tab 530, a meta tab 532, and a graphs tab 534. The measures tab 526 is activated, thereby allowing a user to add a measure from a profiling library, such as from a drop down menu. The profiling library offers data profiling tools to help a user understand the data. For example, profiling measures could include basicStats, contingency Table, edd (Enhanced Data Dictionary), group, histogram, monotonic, percentiles, woe, etc. The edd is a data profiling capability which analyzes content of data sources.

Figure 13:
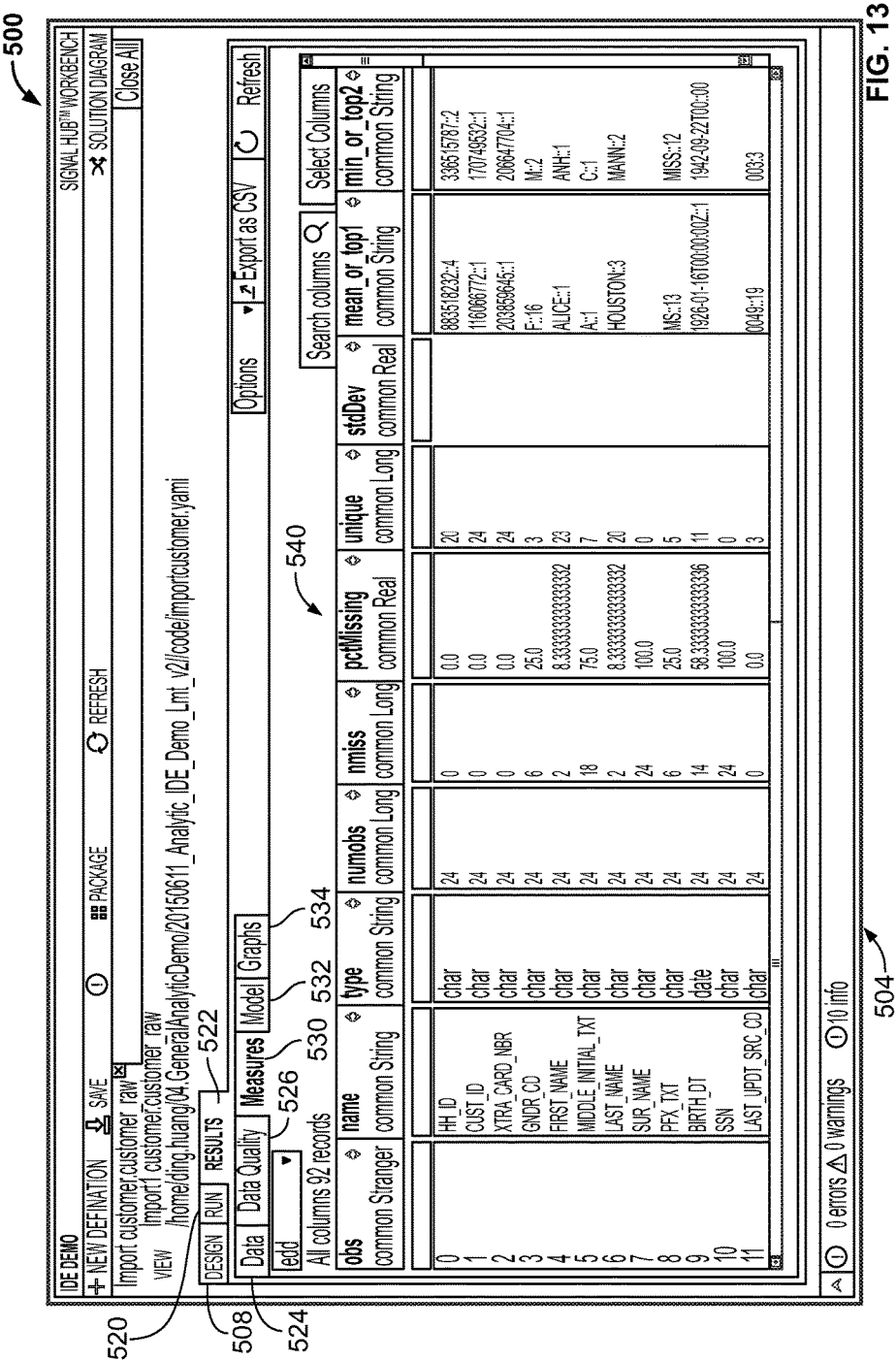
FIG. 13 is a screenshot illustrating displaying of specific entries within raw data using the integrated development environment generated by the system.

FIG. 13 is a screenshot illustrating displaying of specific entries within raw data using the Workbench 500 generated by the system. The analytic code development window 504 includes a table 540 showing specific data entries for the measure "edd", as well as a plurality of columns pertaining to various types of information for each data entry. More specifically, the table 540 includes columns directed to obs, name, type, nmiss, pctMissing, unique, stdDev, mean_or_top_1, min_or_top_2, etc. The table 540 includes detailed data statistics including number of records, missing rate, unique values, percentile distribution, etc.

Figure 14:
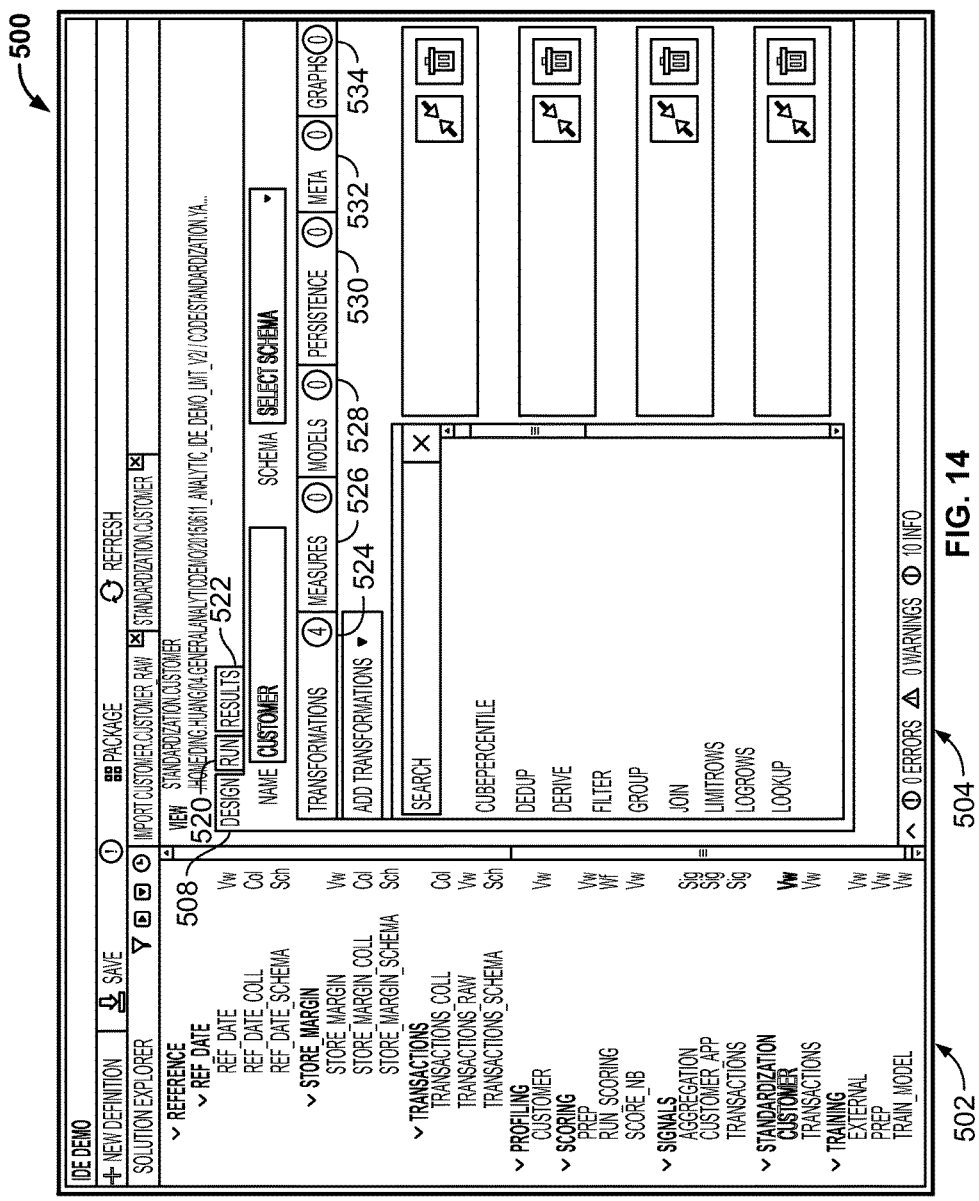
FIG. 14 is a screenshot illustrating aggregating and cleaning of raw data using the integrated development environment generated by the system.
Figure 15:
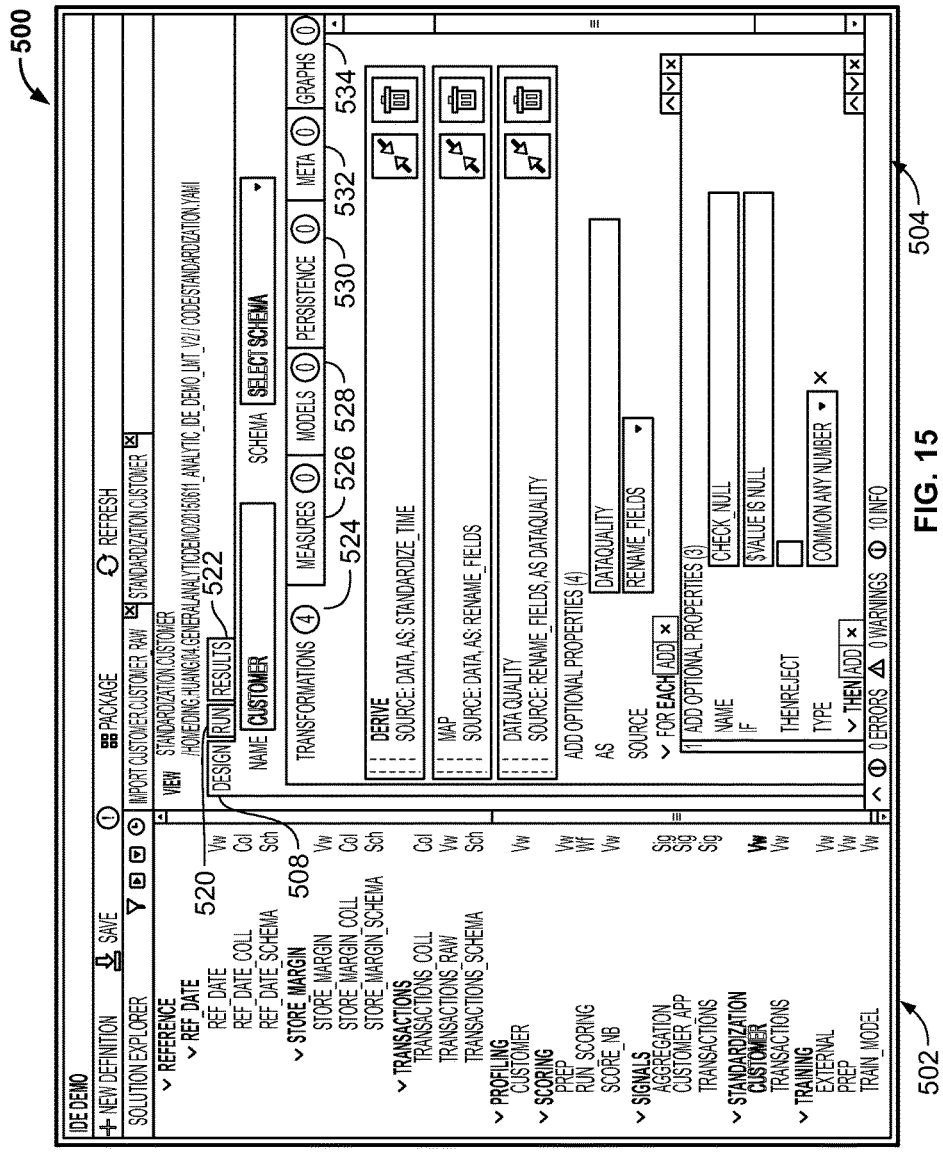
FIG. 15 is a screenshot illustrating managing and confirmation of raw data quality using the integrated development environment generated by the system.

FIG. 14 is a screenshot illustrating aggregating and cleaning of raw data using the Workbench 500 generated by the system. As shown, the analytic code development window 504 has the transformations tab 524 activated. The transformation tab 524 is directed to the transformation library which allows users to do various data aggregation and cleaning work before using data. In the transformations tab 524, the user can add one or more transformations, such as cubePercentile, dedup, derive, filter, group, join, limitRows, logRows, lookup, etc. FIG. 15 is a screenshot illustrating managing and confirmation of raw data quality using the Workbench 500 generated by the system. As shown, the analytic code development window 504 has the transformations tab 524 activated. A user can gather more information about each transformation, such as shown for Data Quality. The data quality management uses a series of checks which contains a predicate, an action, and an optional list of fields to control and manage the data quality.

Figure 16:
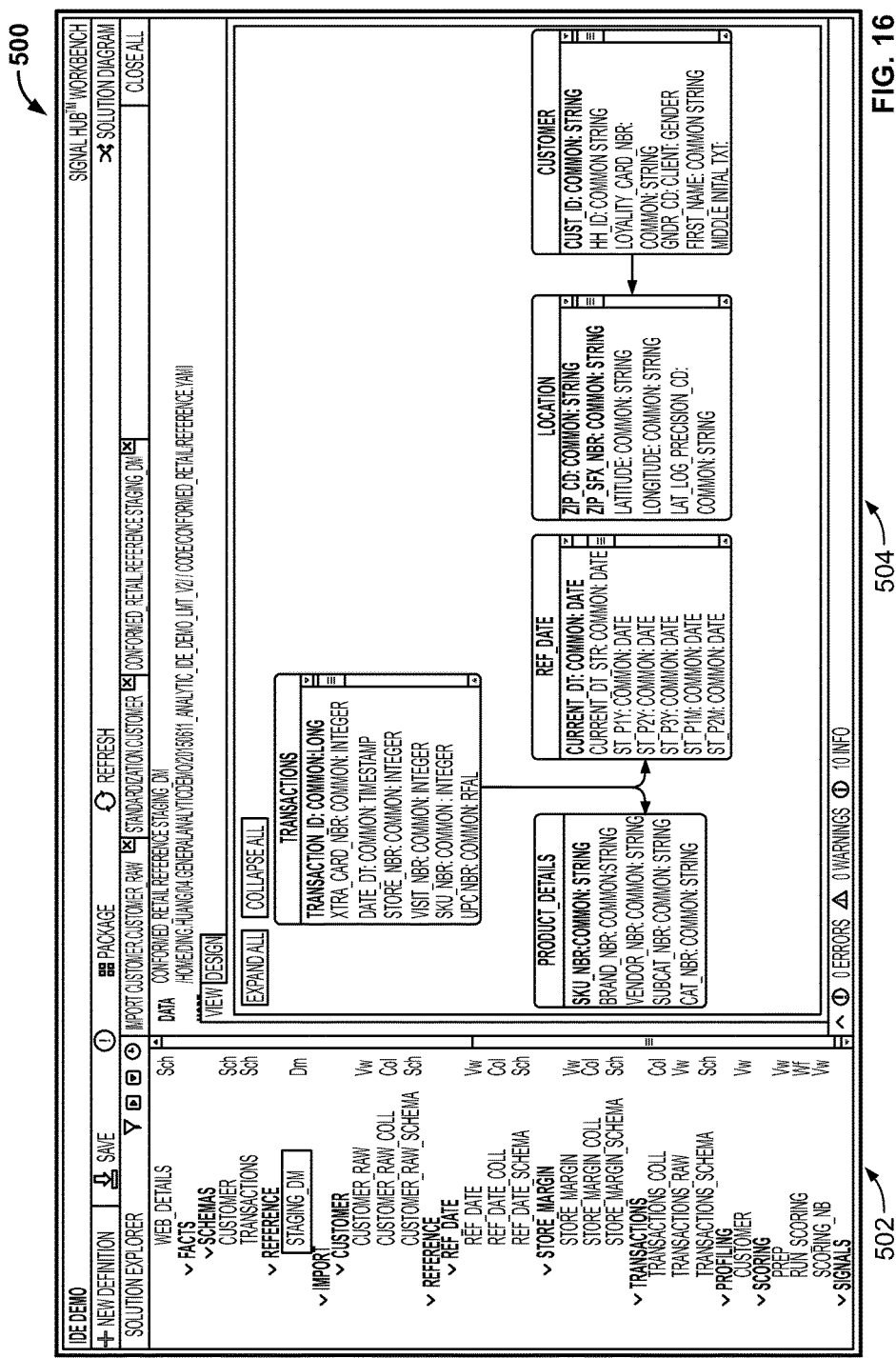
FIG. 16 is a screenshot illustrating auto-generated visualization of a data model created using the integrated development environment.
Figure 17A:
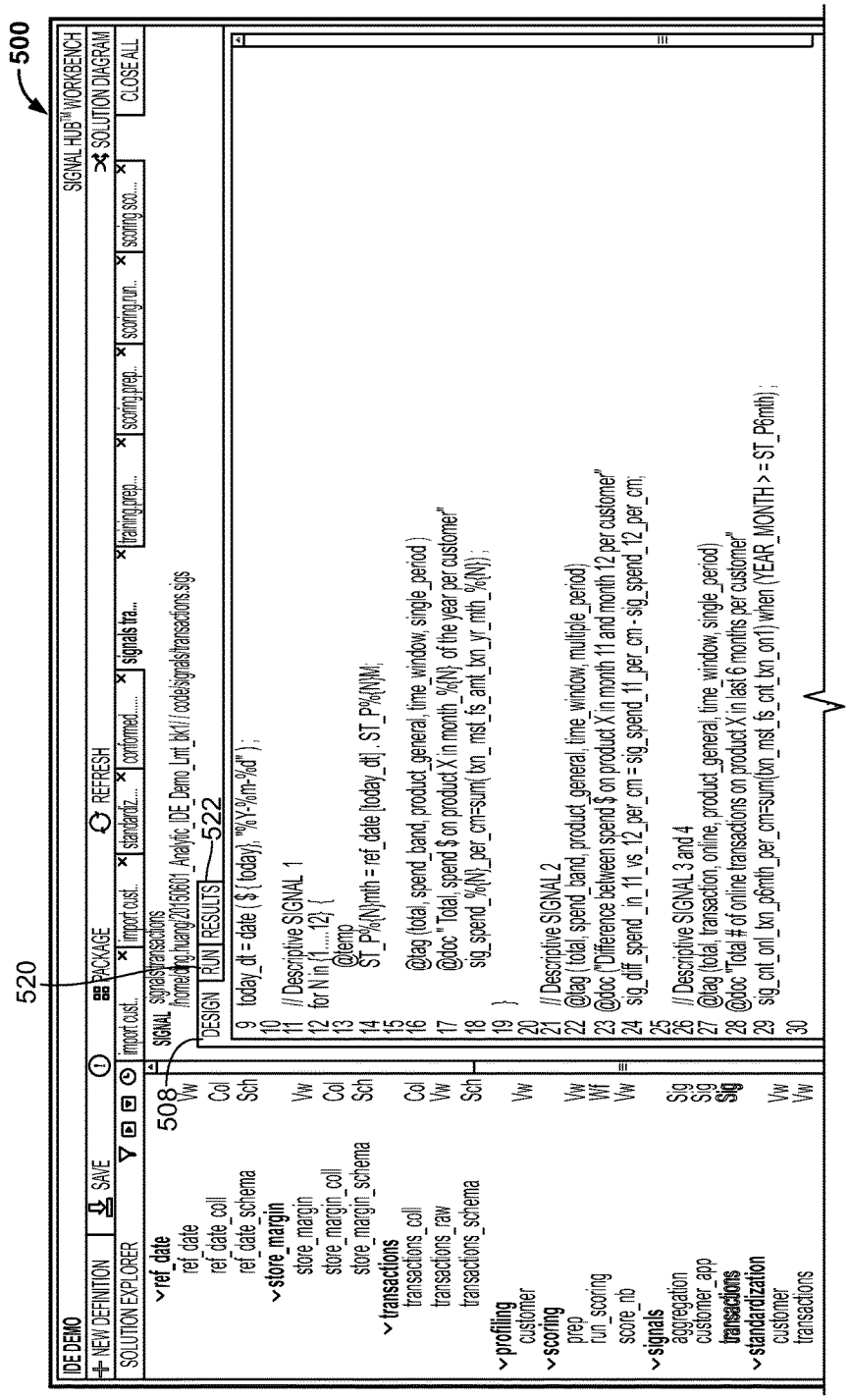
FIG. 17A is a screenshot illustrating creation of reusable analytic code using the Workbench 500 generated by the system.
Figure 17A:
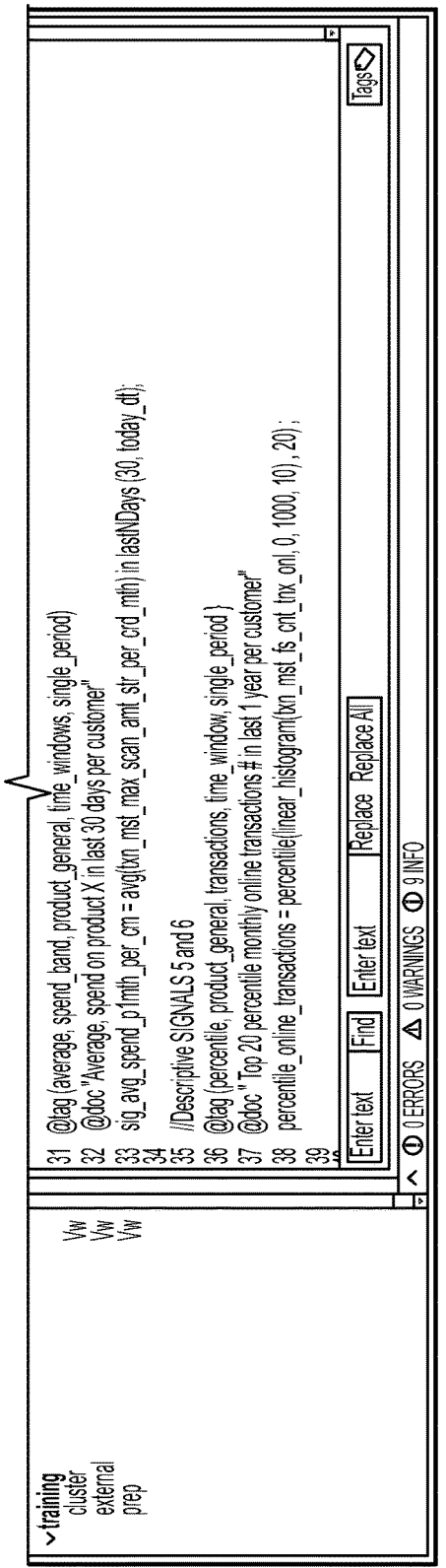
Figure 17B:
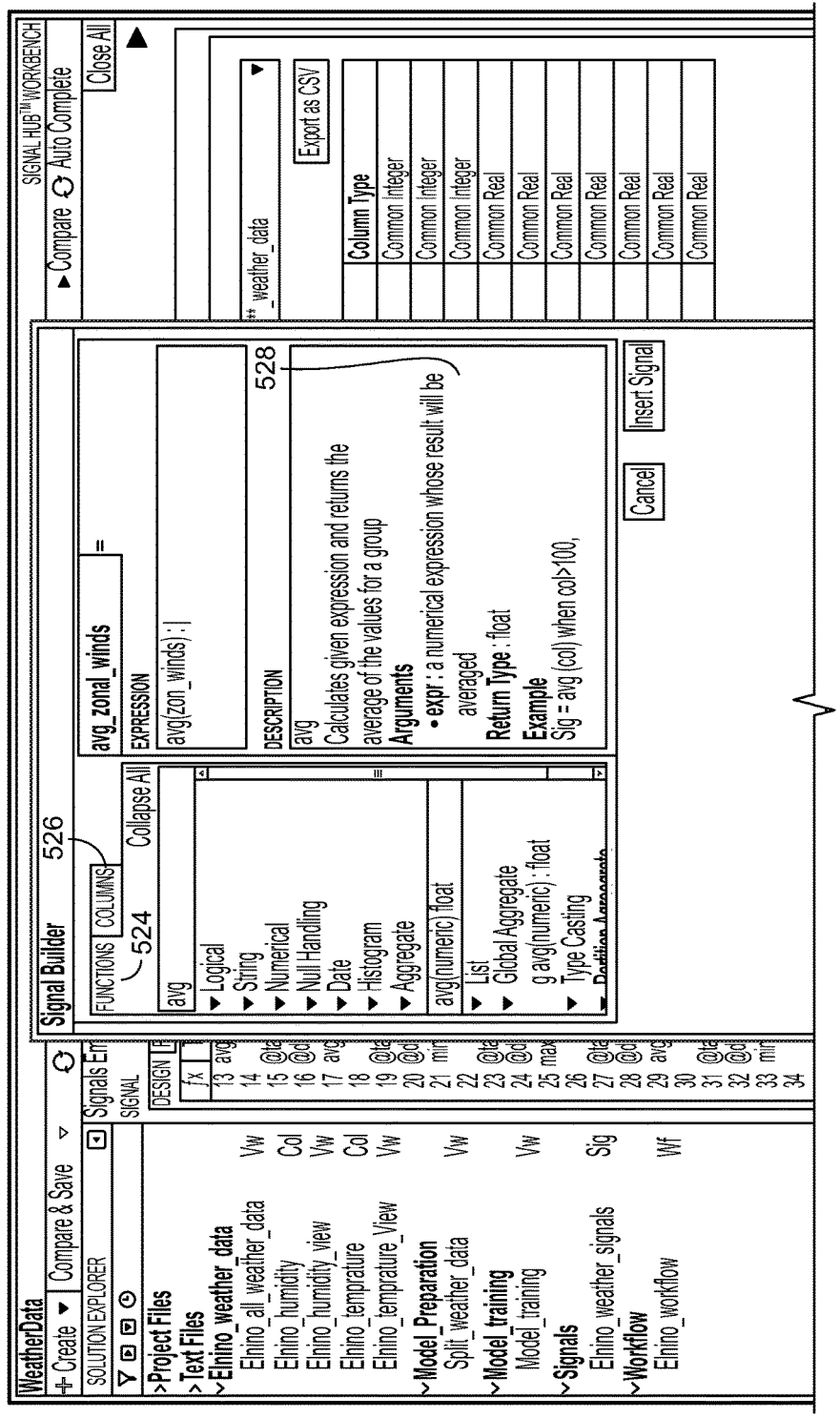
FIG. 17B is a screenshot illustrating the graphical user interface generated by the Signal Builder component of the Workbench of the system.

FIG. 16 is a screenshot illustrating auto-generated visualization of a data model created using the Workbench 500. This visualization could be automatically generated from YAML code (e.g., the code that reads and does initial linking and joining of data). As shown, analytic code development window 504 allows a user to view relations and interactions between various data elements. The data model organizes data elements into fact and dimension tables and standardizes how the data elements relate to one another. This could be automatically generated in Signal Hub after loading the data. FIG. 17A is a screenshot illustrating creation of reusable analytic code using the Workbench 500 generated by the system. As shown, the analytic code development window 504 includes many lines of code that incorporate and utilize the raw data previously selected and prepared. The Signal API could be scalable and easy to use (e.g., for loop signals, peer comparison signals, etc.). Further, Signal Hub could provide signal management by using @tag and @doc to specify signal metadata and description, which can be automatically extracted and displayed in the Knowledge Center. FIG. 17B is a screenshot illustrating the graphical user interface of Signal API in Workbench. Similar to excel, users can select from a function list 524 and a column list 526 to create new signals with a description 528 and example code provided at the bottom. Users can use Signal API either in a plain text format or in a graphical way, where these two formats are easily synchronized.

FIGS. 18-23 are screenshots illustrating user interface screens generated by the system using the Knowledge Center 600 to find and use a signal. As an integral part of Signal Hub, the Knowledge Center could be used as an interactive signal management system to enable model developers and business users to easily find, understand, and reuse signals that already exist in the signal library inside Signal Hub. The Knowledge Center allows for the intelligence (e.g., signals) to be accessed and explored across use cases and teams throughout the enterprise. Whenever a new use case needs to be implemented, the Knowledge Center enables relevant signals to be reused so that their intrinsic value naturally flows toward the making of a new analytic solution that drives business value.

Multiple features of the Knowledge Center facilitate accessing and consuming intelligence. The first is its filtering and searching capabilities. When signals are created, they are tagged based on metadata and organized around a taxonomy. The Knowledge Center empowers business users to explore the signals through multiple filtering and searching mechanisms.

Key components of the metadata in each signal include the business description, which explains what the signal is (e.g., number of times a customer sat in the middle seat on a long-haul flight in the past three years). Another key component of the metadata in each signal is the taxonomy, which shows each signal's classification based on its subject, object, relationship, time window, and business attributes (e.g., subject=customer, object=flight, relationship=count, time window=single period, and business attributes=long haul and middle seat).

The Knowledge Center facilitates exploring and identifying signals based on this metadata when executing use cases by using filtering and free-text searching. The Knowledge Center also allows for a complete visualization of all the elements involved in the analytical solution. Users can visualize how data sources connect to models through a variety of descriptive signals, which are grouped into Signal Sets depending on a pre-specified and domain-driven taxonomy. The same interface also allows users to drill into specific signals. Visualization tools can also allow a user to visualize end-to-end analytics solution components from the data, to the signal and finally to the use-cases. The system can automatically detect the high level lineage between the data, signal and use-cases when hovering over specific items. The system can also allow a user to further drill down specific data, signal and use-cases by predefined metadata which can also allow a user to view the high level lineage as well.

Figure 18:
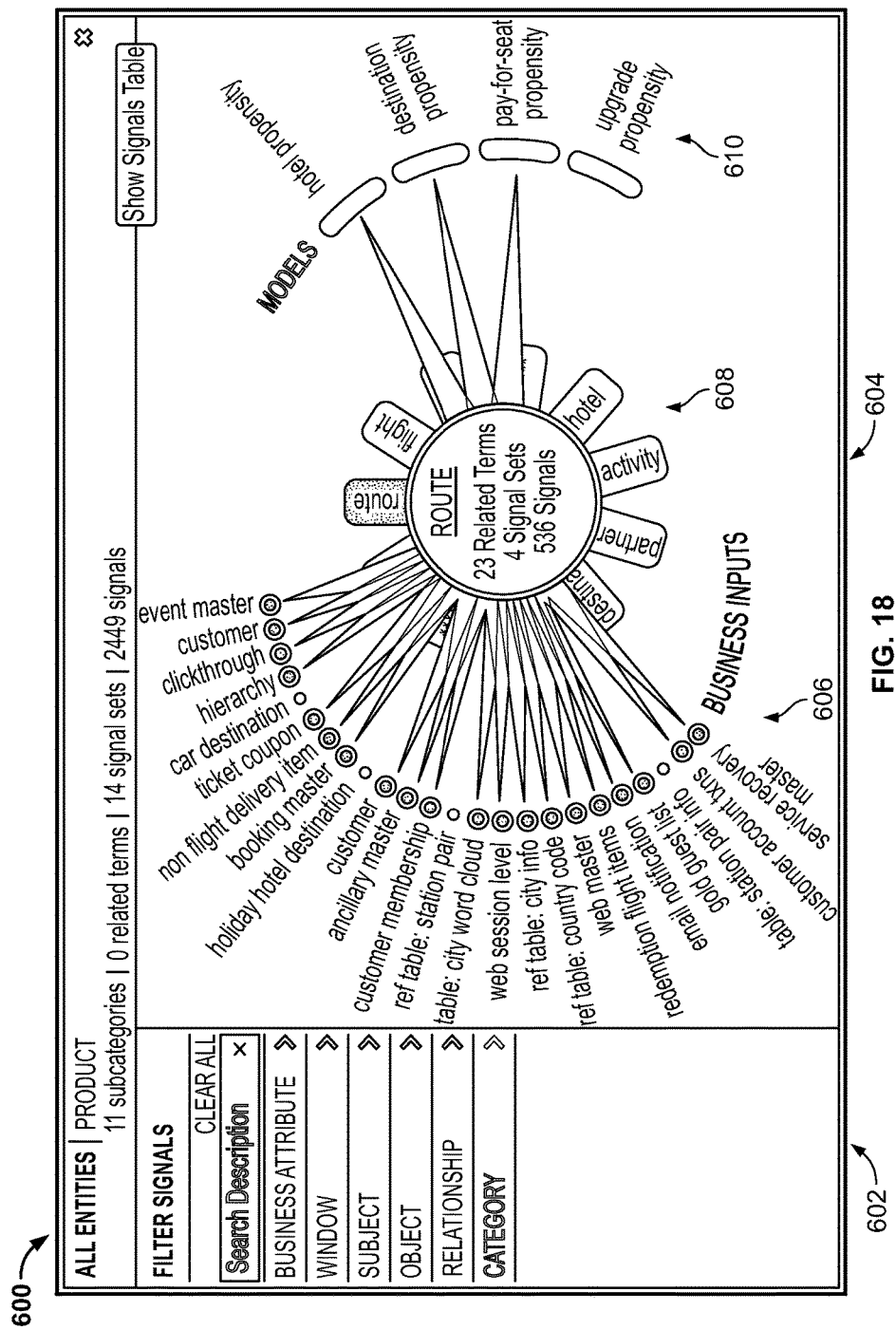
FIG. 18 is a screenshot illustrating a user interface screen generated by the system for visualizing signal paths using the Knowledge Center generated by the system.

FIG. 18 is a screenshot illustrating a user interface screen generated by the system for visualizing signal paths using the Knowledge Center 600 generated by the system. As shown, the Signal Hub platform 600 includes a side menu 602 which allows a user to filter signals, such as by entering a search description into a search bar, or by browsing through various categories (e.g., business attribute, window, subject, object, relationship, category, etc.). The Signal Hub platform 600 further includes a main view portion 604. The main view portion 604 diagrammatically displays data sources 606 (e.g., business inputs), descriptive signals 608 (e.g., grouped and organized by metadata), and predictive signals 610. The descriptive signals 608 include a wheel of tabs indicating categories to browse in searching for a particular signal. For example, the categories could include route, flight, hotel, etc. Once a particular category is selected in the descriptive signals 608, the center of the descriptive signals 608 displays information about that particular category. For example, when "route" is chosen, the system indicates to the user that there are 23 related terms, 4 signal sets, and 536 signals.

The Signal Hub platform 600 also displays all the data sources that are fed into the signals of the category chosen. For example, for the "route" category, the data sources include event mater, customer, clickthrough, hierarchy, car destination, ticket coupon, non-flight delivery item, booking master, holiday hotel destination, customer, ancillary master, customer membership, ref table: station pair, table: city word cloud, web session level, ref table: city info, ref table: country code, web master, redemption flight items, email notification, gold guest list, table: station pair info, customer account tcns, service recovery master, etc. A user can then choose one or more of these data sources to further filter the signals (and/or to navigate to those data sources for additional information).

The Signal Hub platform 600 also displays all the models that utilize the signals of the category chosen. For example, for the "route" category, the predictive signals within that category include hotel propensity, destination propensity, pay-for-seat propensity, upgrade propensity, etc. A user can then choose one or more of these predictive signals.

Figure 19:
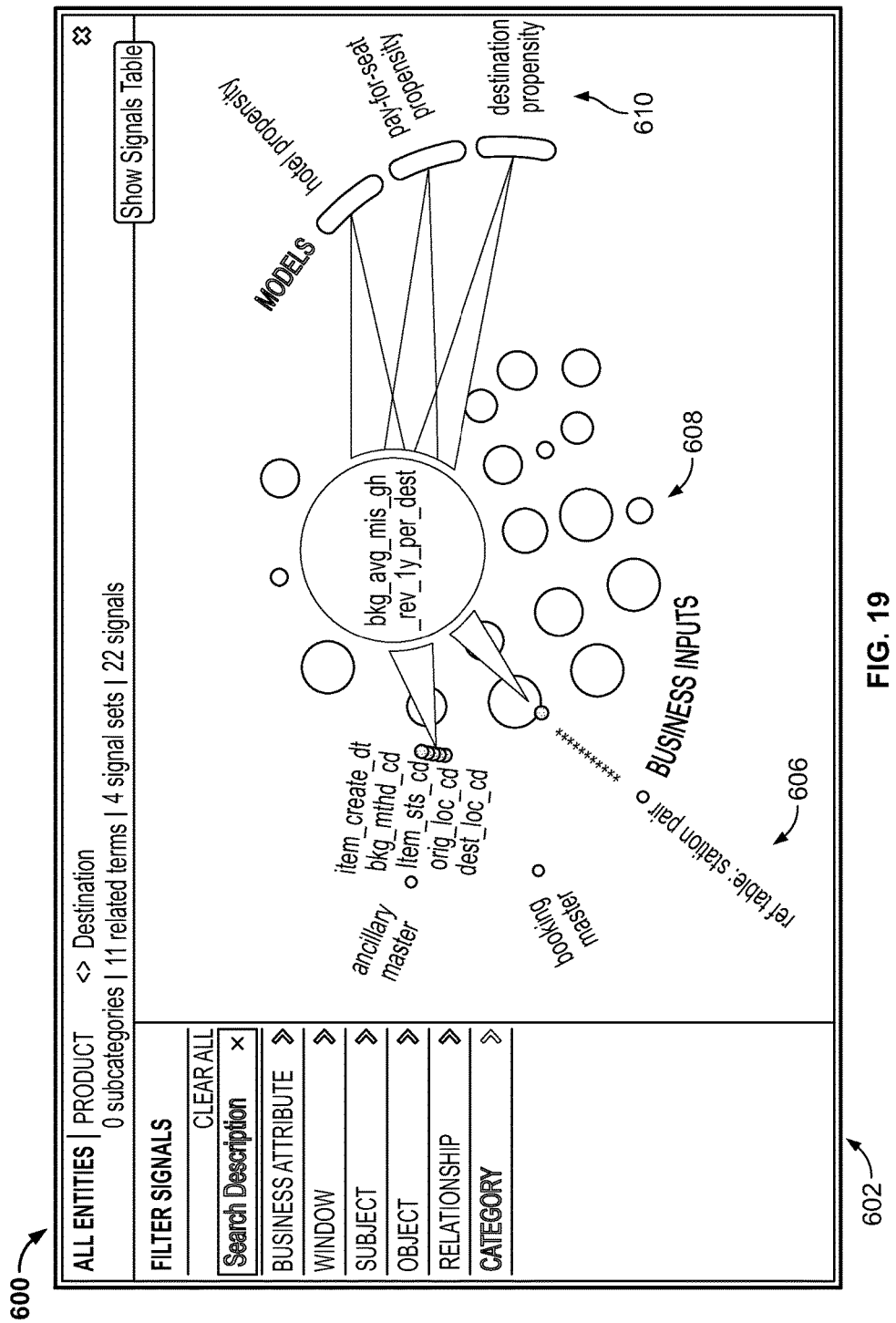
FIG. 19 is a screenshot illustrating a user interface screen generated by the system for visualizing a particular signal using the Knowledge Center generated by the system.

FIG. 19 is a screenshot illustrating a user interface screen generated by the system for visualizing a particular signal using the Knowledge Center 600 generated by the system. As shown, the particular descriptive signal "bkg_avg_mis_gh_re_v_ly_per_dest" at an individual level, the data sources 606 that feed into that signal include "ancillary master," "booking master," and "ref table: station pair," and the predictive signals that use that descriptive signal include "hotel propensity," "pay-for-seat-propensity," and "destination propensity."

FIG. 20A is a screenshot illustrating a user interface screen generated by the system for finding a signal using the knowledge center 600 generated by the system. The main view portion 604 includes a signal table listing all existing signals with summary information (e.g., loaded 100 of 2851 signals) for browsing signals and their related information. The table includes the signal name, signal description, signal tags, signal set, signal type (e.g., Common:Real, Common:Long, etc.), and function. The signal description is an easy to understand business description (e.g., average number of passengers per trip customer travelled with). A user could also conduct a free text search to identify a signal description that contains a specific word (e.g., hotel signals). Further, a metadata filter could identify signals that fit within certain metadata criteria (e.g., signals that calculate an average).

FIG. 20B is a screenshot illustrating a user interface screen generated by the system for finding a signal using the knowledge center 600 generated by the system. Users are first asked to select a pre-defined signal subject from "Search Signal" dropdown list to start the signal search process. The main view portion 604 includes a signal table listing all existing signals with summary information (e.g., filtered conditions applied; loaded 100 of 2851 signals) for browsing signals and their related information. The table includes the signal description, signal type (e.g., Real, Long, etc.), update time, refresh frequency, etc. The signal description is an easy to understand business description (e.g., average number of passengers per trip customer travelled with). A user could also define search columns (e.g., description) and conduct a free text search within the search columns that contains a specific word (e.g., hotel signals). Further, a metadata filter could identify signals that fit within certain metadata criteria as shown in the left side panel (e.g., signals that calculate an average).

Figure 21B:
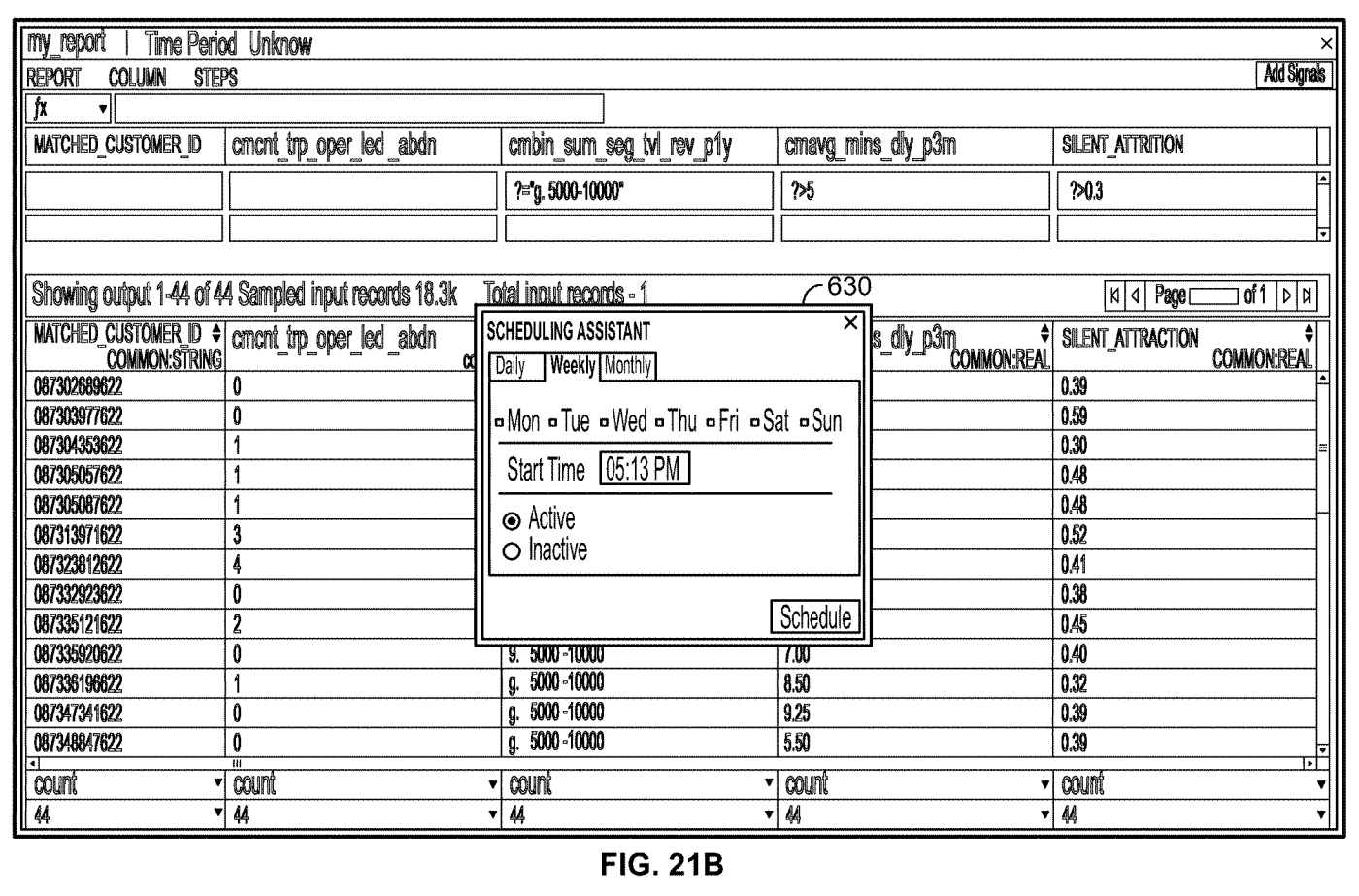

FIG. 21A is a screenshot illustrating a user interface screen generated by the system for selecting entries (e.g., customers) with particular signal values using the Knowledge Center 600 generated by the system. Users are also able to apply business rules to signals to filter the data and target subsections of the population. For example, the user may want to identify all customers with a propensity to churn that is greater than 0.7 and those who have had two or more friends churn in the last two weeks. This is particularly important as it enables business users to build sophisticated prescriptive models allowing true democratization of big data analytics across the enterprise. More specifically, a user can select signals to limit the table to only signals necessary to execute the specific use case (e.g., Signal: "cmcnt_trp_oper_led_abdn"). The table 618 also provides for the ability to apply rules to filter the table to include only data that fits within the thresholds (e.g., customers with a hotel propensity score>0.3). For example, the table 618 includes the columns "matched_party_id" 620, "cmcnt_trp_oper_led_abdn" 622, "cmbin_sum_seg_tvl_rev_ply" 624, "cmavg_mins_dly_p3m" 626, "SILENT_ATTRITION" 628. A user can narrow the search for a signal by indicating requirements for each column. For example, a user can request to see all signals that have a cmbin_sum_seg_tvl_rev_ply of ="g. 5000-10000" and a cmavg_mins_dly_p3mof>5. A user can also apply more complex transformation on top the signals with standard SQL query language. Further, as shown in FIG. 21B, the Signal Hub platform 600 can schedule the business report at regular basis (e.g., daily, weekly, monthly, etc.) using a reporting tool 630 to gain recurring insights or export the filtered data to external systems (e.g., CSV file into client's campaign execution engine). The system of the present disclosure can also include a reporting tool implemented in a Hadoop environment. The user can generate a report and query various reports. Further, the user can query a single signal table and view the result in real-time. Still further, the reporting tool can include a query code and a data table fully listed out in the same page so users are able to switch between different steps easily and view the result for previous step.

Figure 21C:
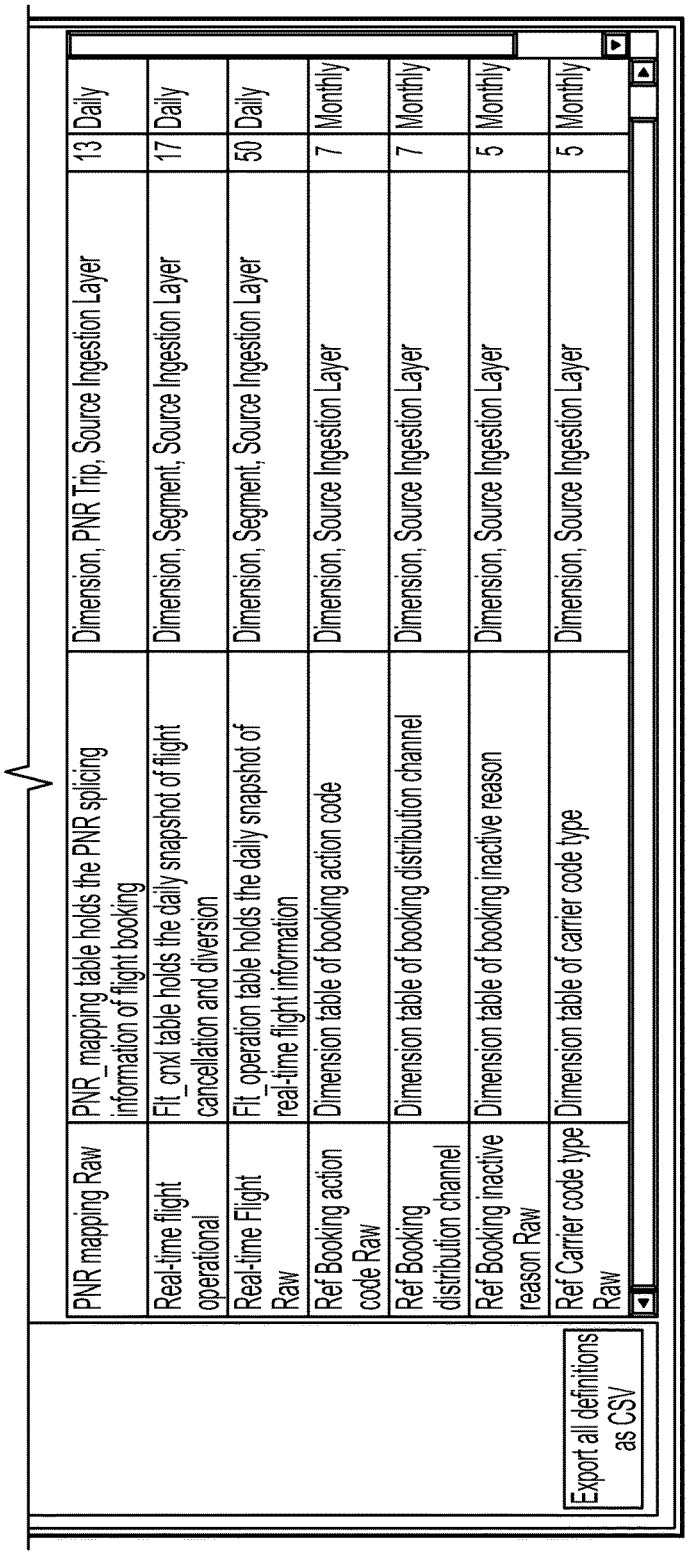
Figure 21D:
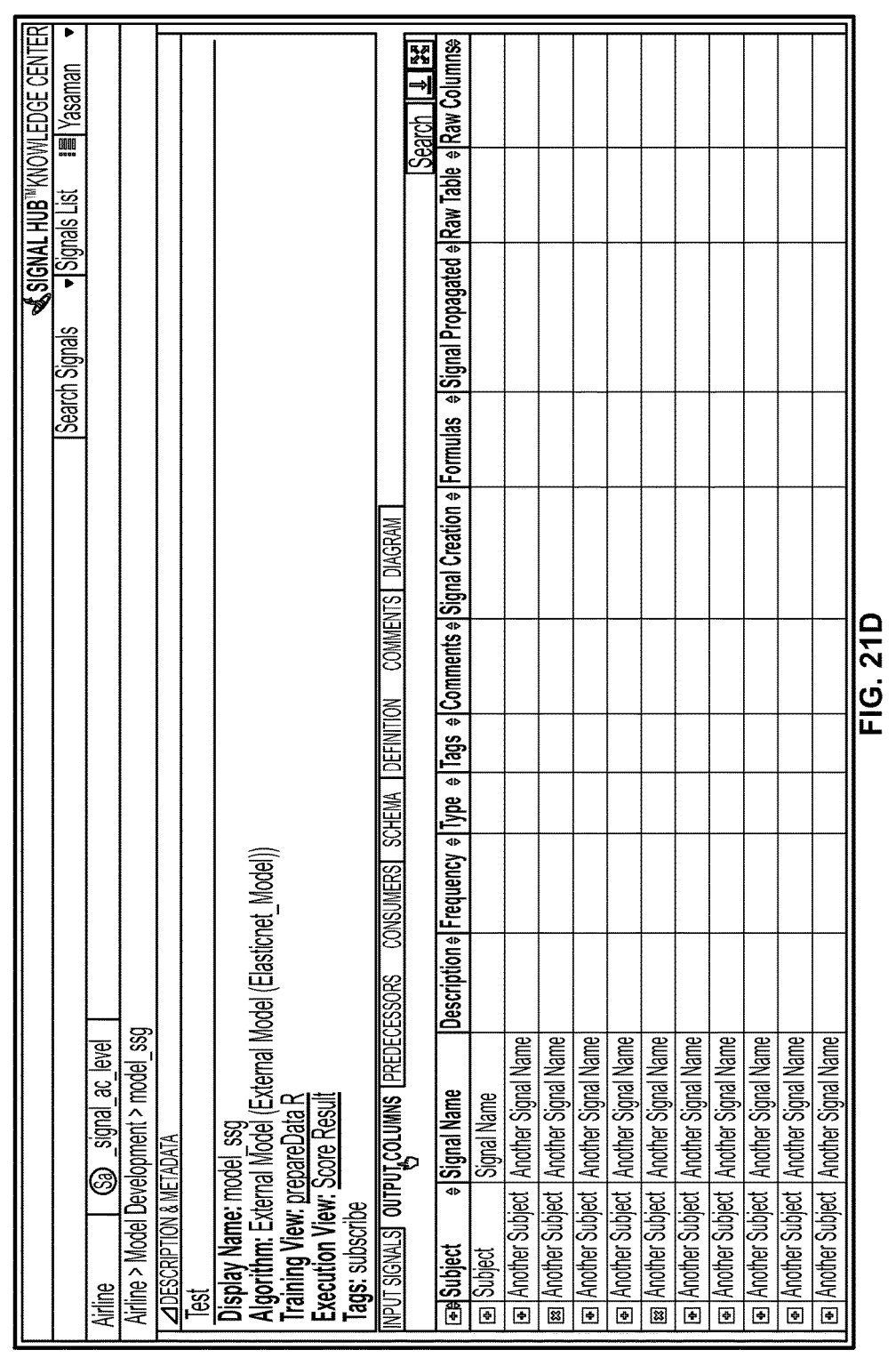
Figure 21E:
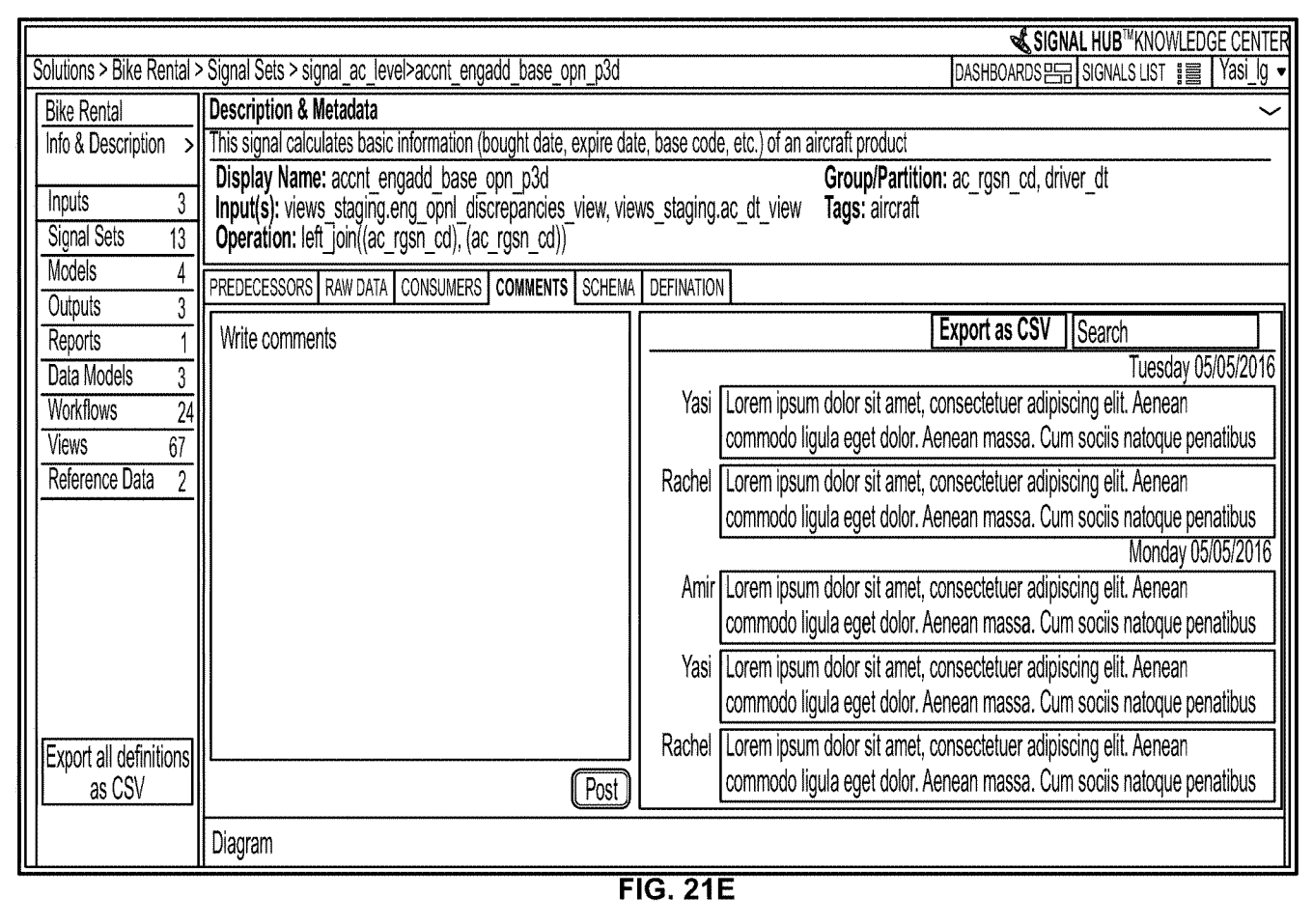
Figure 21F:
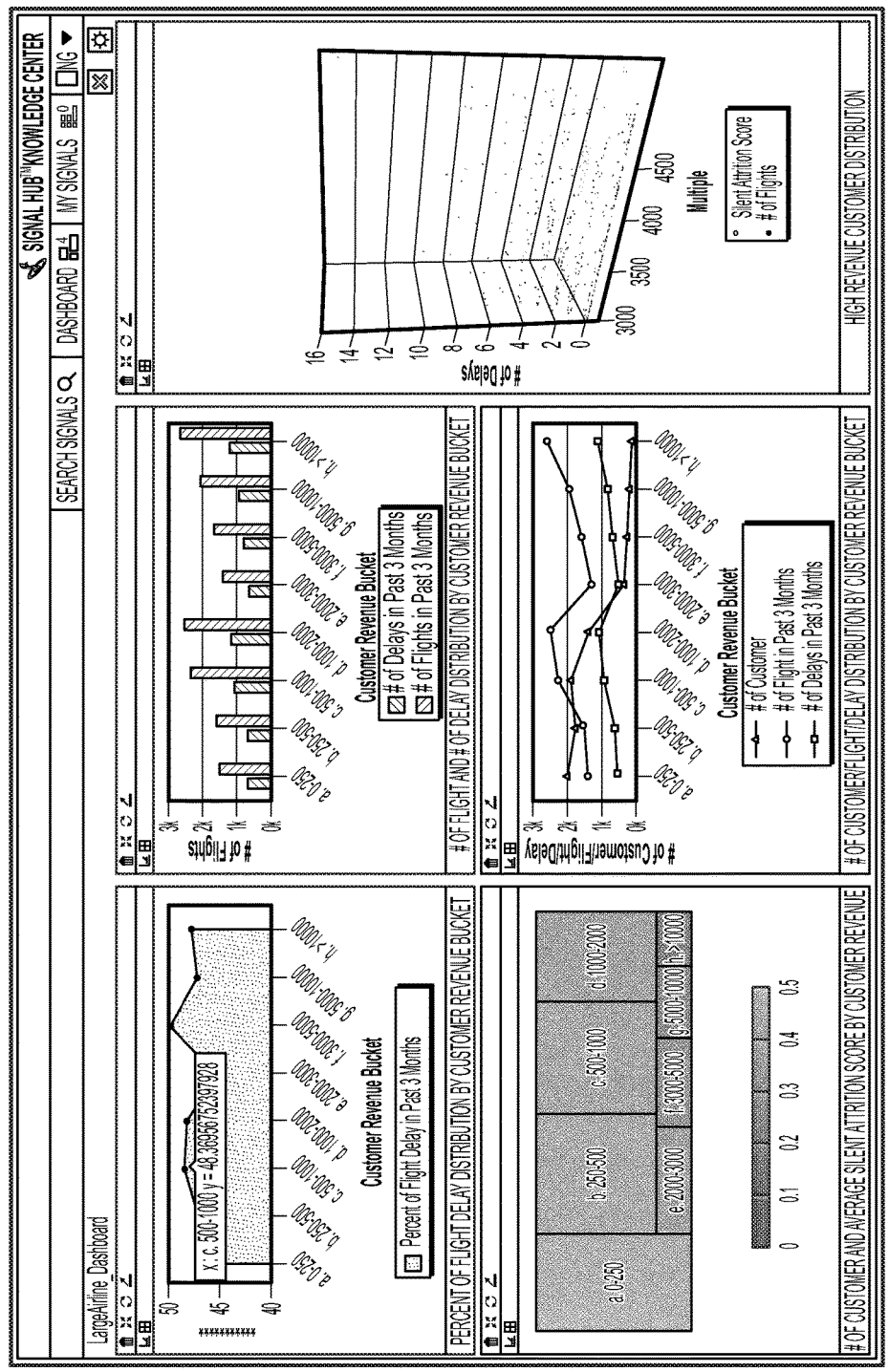

FIG. 21C is a screenshot illustrating a user interface screen generated by the system for displaying dashboard created using the Knowledge Center 600 generated by the system. A user is able to create various types of graphs (e.g. line chart, pie chart, scattered 3D chart, heat map, etc.) in the Knowledge Center and populate dashboard with graphs created in certain layout. Dashboard will get refreshed automatically as the backend data get refreshed. A user can also export the dashboard to external system. FIG. 21D is a screenshot illustrating a user interface screen generated by the system for exploring data dictionary created using the Knowledge Center 600 generated by the system. A user is able to learn all the data input tables used the solution, with name, description, metadata, columns, and refresh rate information for each data input table. A user can also further explore individual data input table and learn the meaning of each column in the table. The Signal Hub platform collects and centralizes all the siloed (stored) data knowledge together via data dictionary and makes it accessible and reusable for all the users. FIG. 21E is a screenshot illustrating a user interface screen generated by the system for exploring models created using the Knowledge Center 600 generated by the system. A user is able to learn all the models created in the solution and explore individual model in depth. The Signal Hub platform can display model description, metadata, input signal, output column, etc. all in one centralized page for each model. FIG. 21E also illustrates a user interface screen generated by the system for commenting signals using the Knowledge Center 600 generated by the system. Users can comment on a signal via Knowledge Center user interface directly to express interest on a signal, propose potential use case for the signal, or validate the signal value. The Signal Hub platform allows users to interact with each other and exchange ideas. FIG. 21F is a screenshot generated by the system which illustrates the charts that could be generated by the system. The charts could be a representation of a signal or multiple signals. The types of charts could include, but is not limited to, bar charts, line charts, density charts, pie charts, bar graphs, or any other chart known to those of ordinary skill in the art. Further, as shown, multiple charts could be included in the dashboard for comparing and viewing different charts simultaneously.

Figure 22:
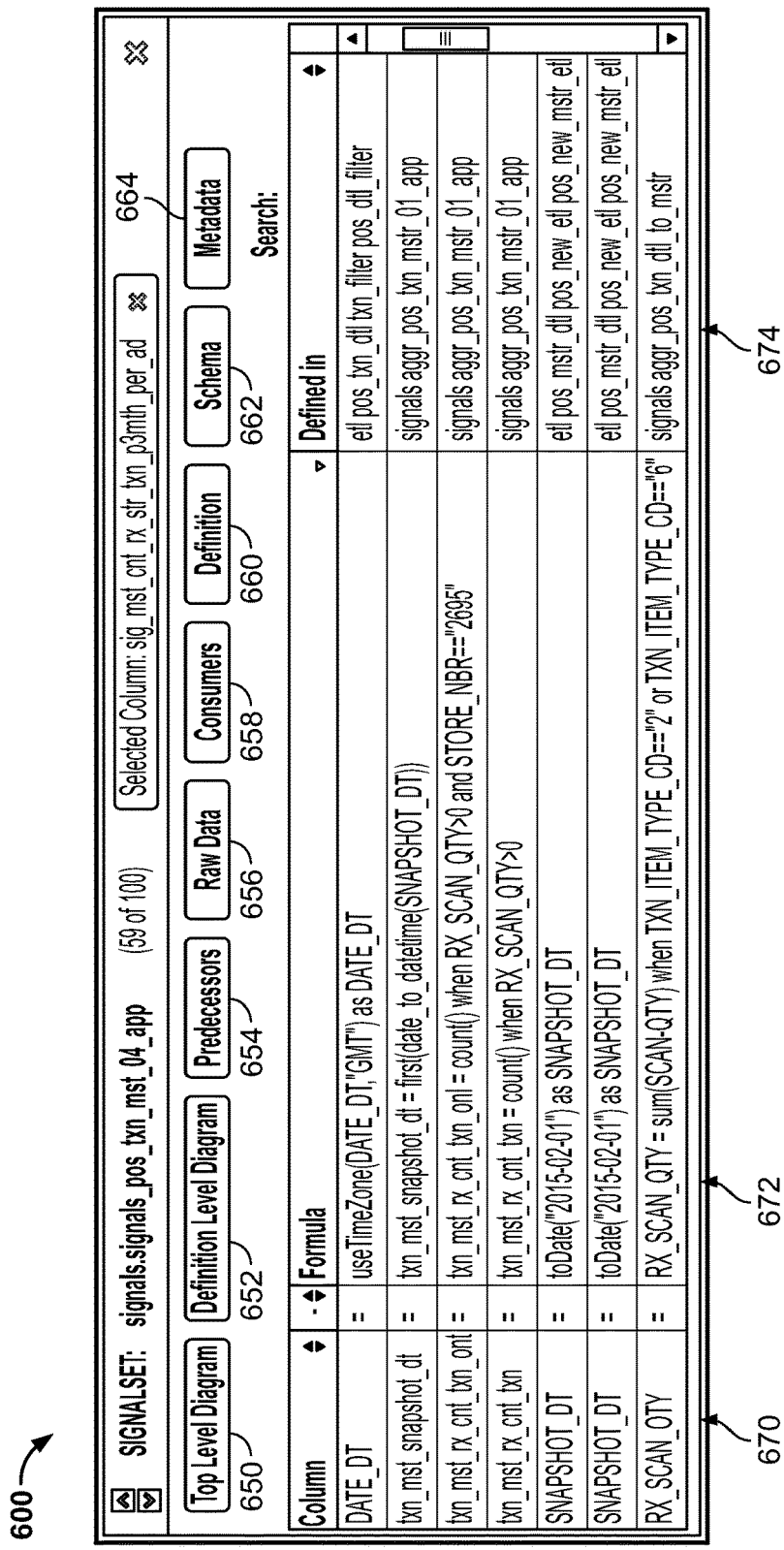
FIG. 22 is a screenshot illustrating a user interface screen generated by the system for visualizing signal parts of a signal using the Knowledge Center generated by the system.

FIG. 22 is a screenshot illustrating a user interface screen generated by the system for visualizing signal parts of a signal using the Knowledge Center 600 generated by the system. Shown is a table showing various signals of a signal set. Users can isolate exactly which columns in the raw data or other signals were combined to create the signal of interest. The Signal Hub platform 600 can display the top level diagram 650, the definition level diagram 652, the predecessors 654, raw data 656, consumers 658, definition 660, schema 62, and metadata 664 and stats. The predecessors tab is used to understand the raw data columns and signals that are used to create a specific signal (e.g., txh_mst_rx_cnt_txn_onl) and can be used to track the detailed signal calculation step by step. When the predecessors tab is selected the resulting table can have one or more columns. For example, the table could include a column 670 of names of the signals within the signal set (e.g., within signal set "signals. signals_pos_txn_mst_04_app"), as well as the formula 672, and what the signal is defined in 674.

Figure 23A:
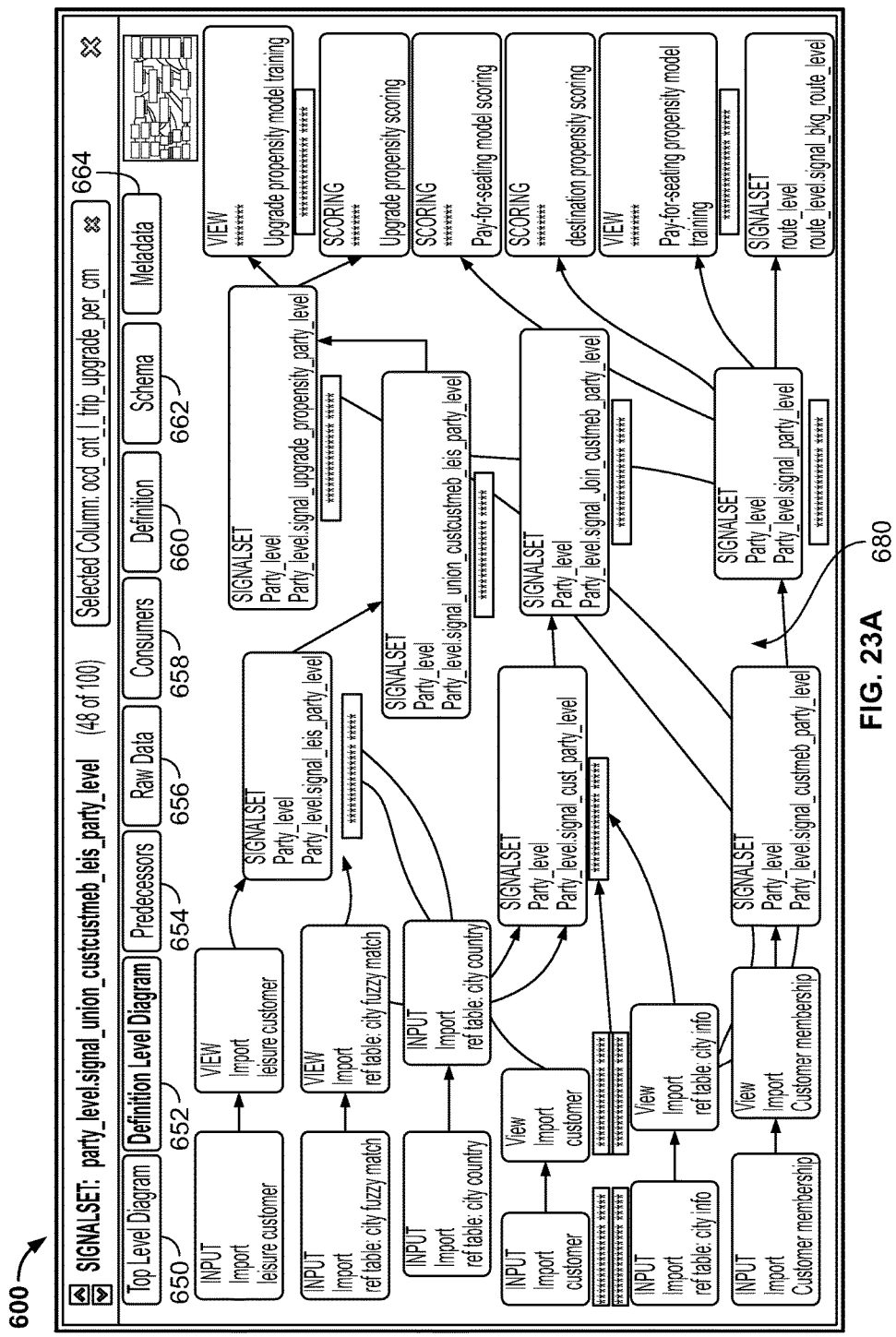
FIG. 23A is a screenshot illustrating a user interface screen generated by the system for visualizing a lineage of a signal using the Knowledge Center generated by the system.
Figure 23B:
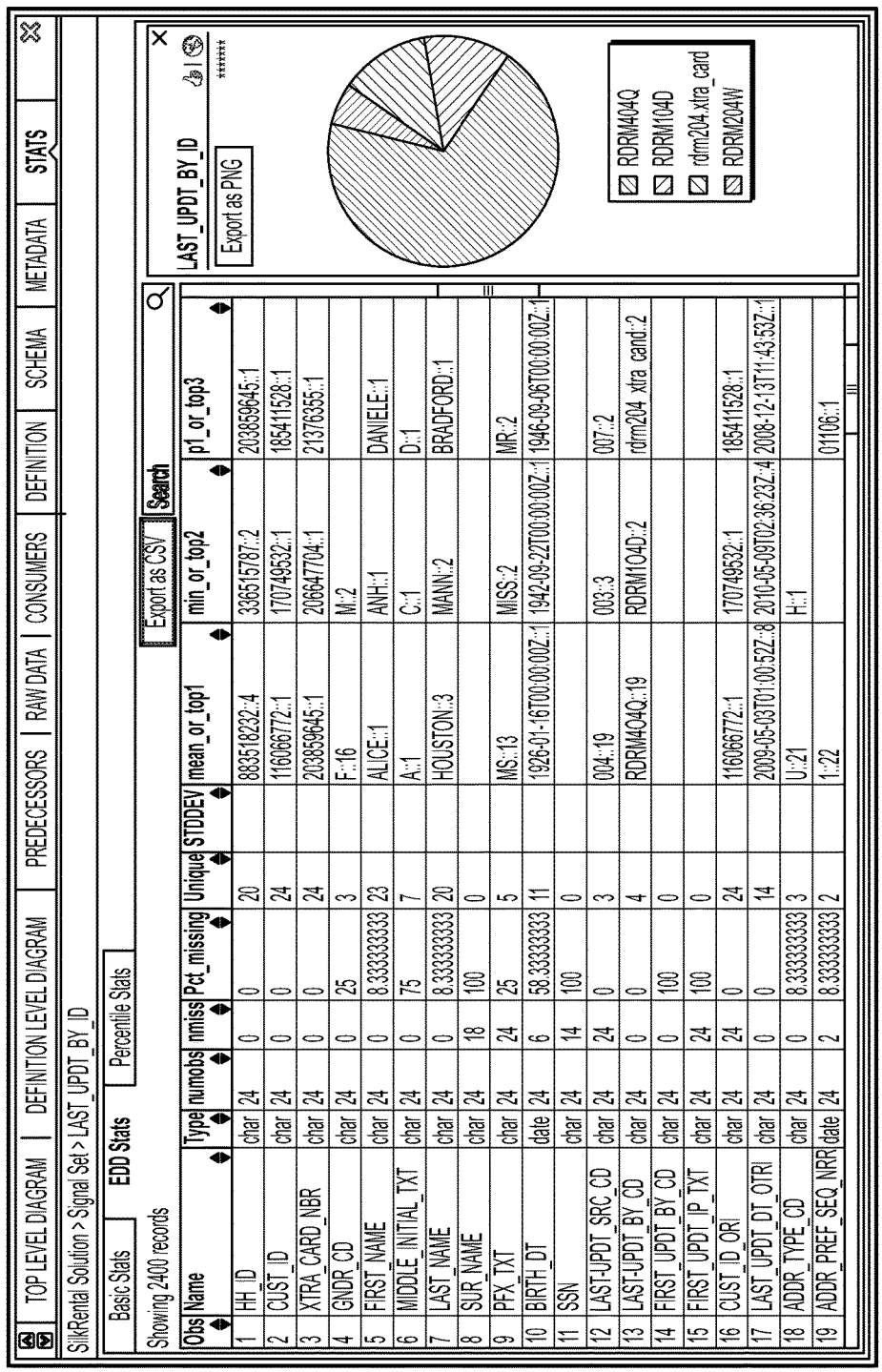
FIG. 23B is a screenshot illustrating a user interface screen generated by the system for displaying signal values, statistics and visualization of signal value distribution.

FIG. 23A is a screenshot illustrating a user interface screen generated by the system for visualizing a lineage of a signal using the Knowledge Center 600 generated by the system. The lineage is used to understand the transformation from raw data to descriptive signals and predictive signals (e.g., how is the number of trips required to move to the next loyalty tier signal generated and which models consume it). As shown, when the definition level diagram button 652 is activated, the Signal Hub platform 600 displays the lineage of a particular signal, which includes what data is being pulled, and what models the signal is being used in. Once a signal of interest is identified, users can gain a deeper understanding of the signal by exploring its lineage from the raw data through all transformations, providing insight into how a particular Signal was created and what the value truly represents. They can identify which signals, if any, consume the signal of interest and view the code that was used to define it. FIG. 23B is a screenshot illustrating a user interface screen generated by the system for displaying signal values stats and visualization of signal value distribution. Both features provide a better understanding of signals, helps scientists determine what codes need to be evoked in the production system to calculate the signal, and makes signal management easier and faster. The Knowledge Center contains visualization capabilities to allow users to explore the values of signals directly in the Signal Hub platform 600.

FIGS. 24-29 are screenshots illustrating using the Workbench 700 generated by the system to create predictive signals (models) with Analytic Wizard module. Analytic Wizard streamlines model development process with predefined steps and parameter presets. More specifically, FIG.

Figure 24A:
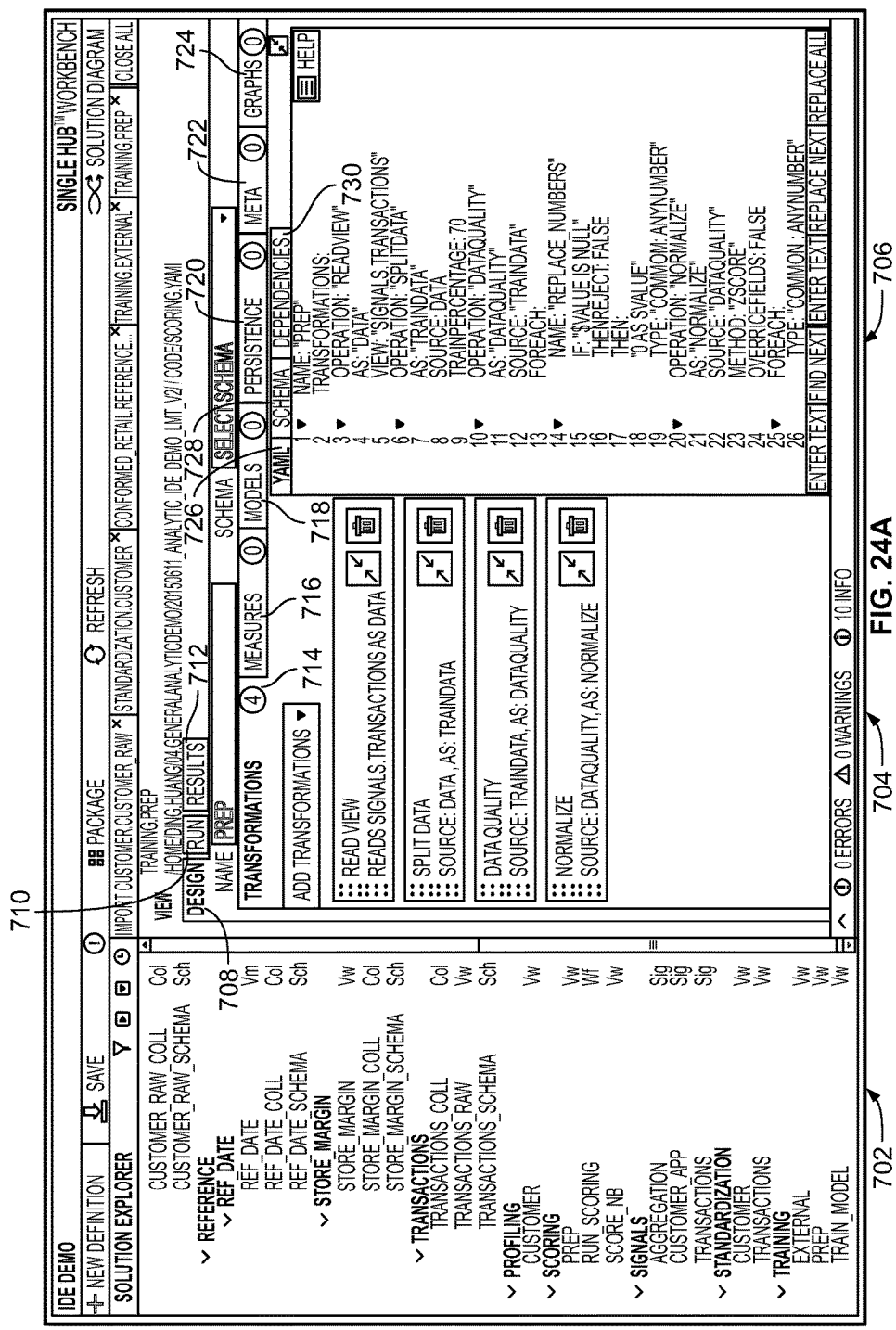
FIG. 24A is a screenshot illustrating preparation of data to train a model using the integrated development environment generated by the system.
Figure 24B:
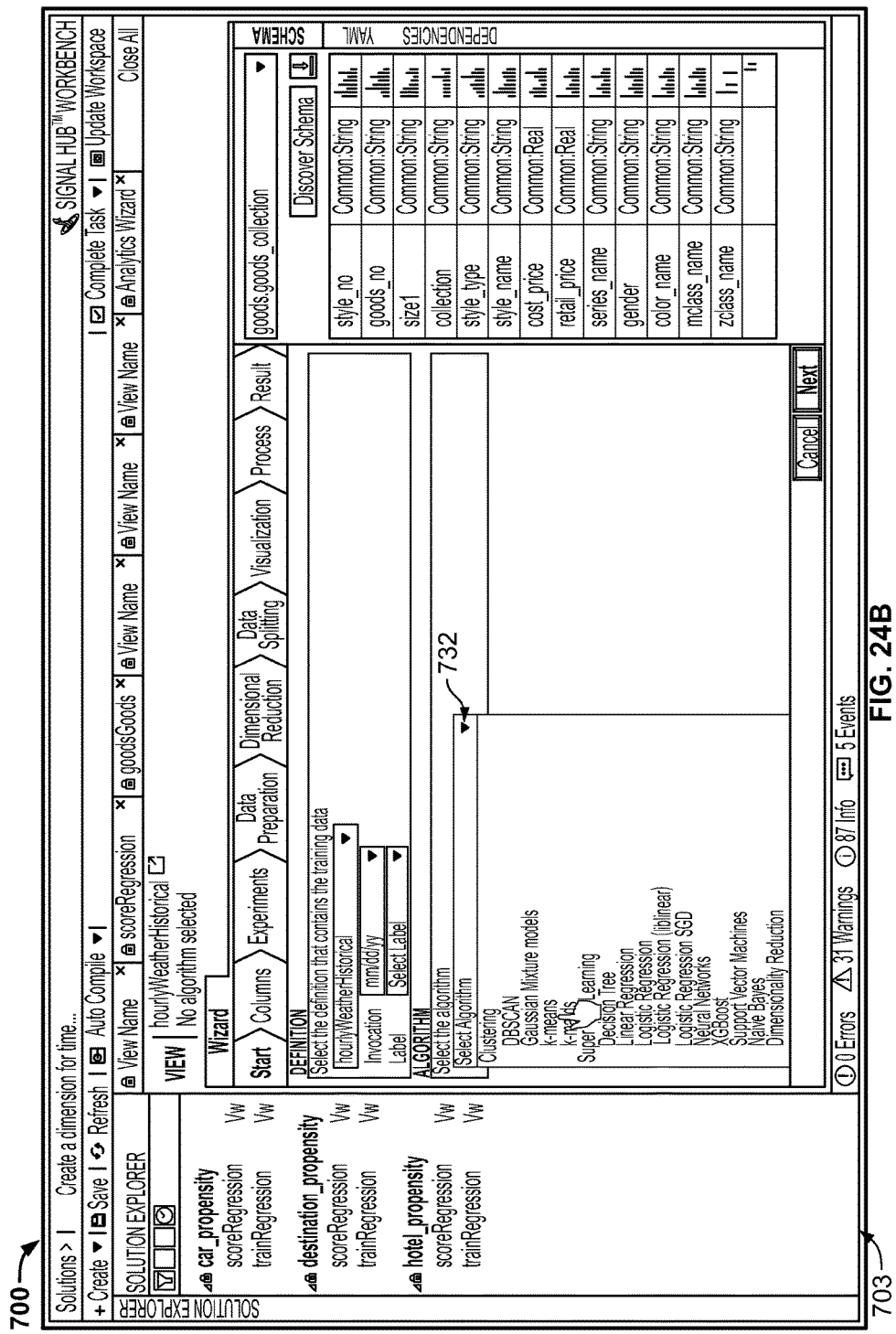
FIG. 24B is a screenshot illustrating a graphical user interface generally by the system of allowing users to select from a variety of model algorithms (e.g., logistic regression, deep autoencoder, etc.)
Figure 24C:
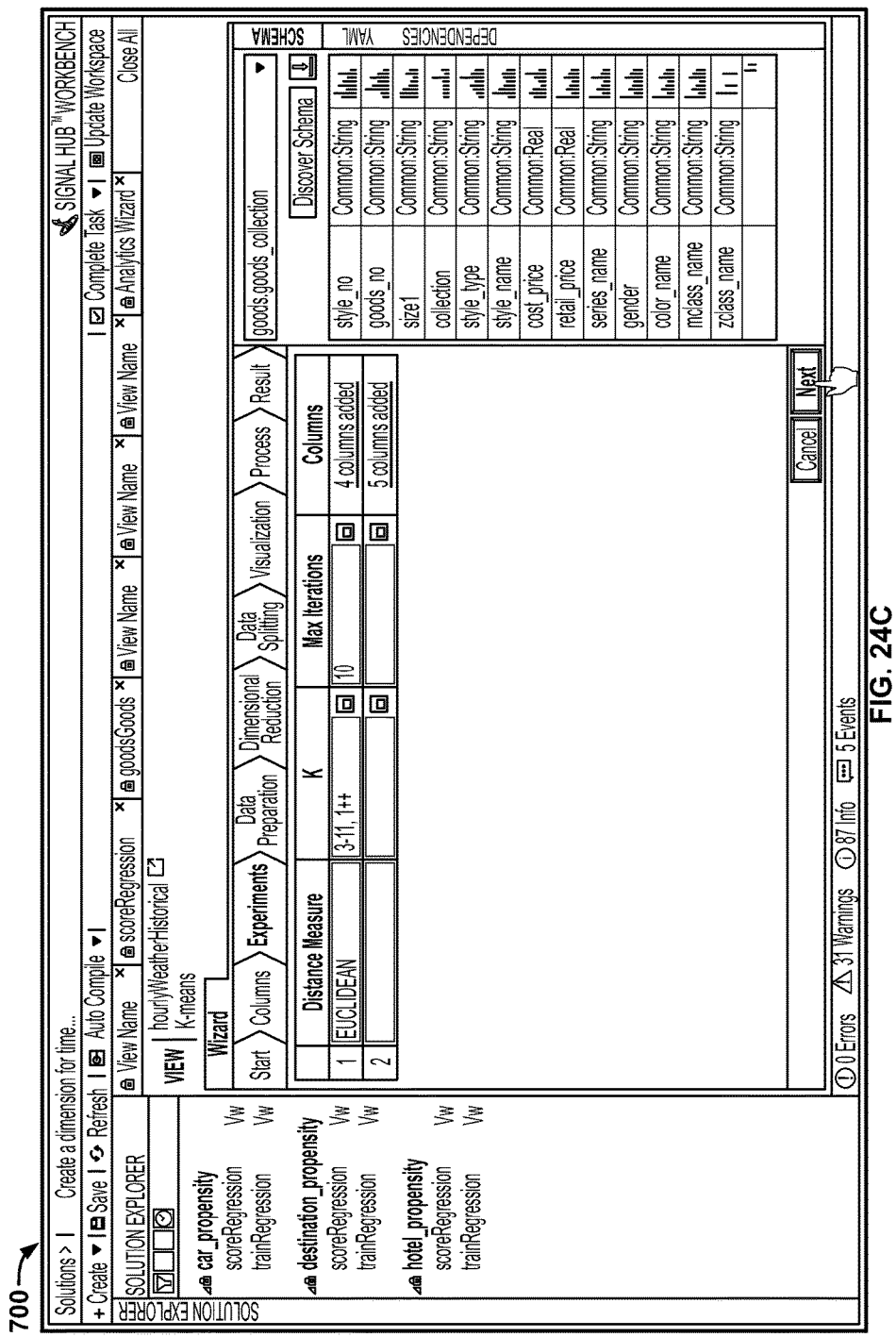
FIG. 24C is a screenshot illustrating the different parameter experiments users can apply during the model training process.
Figure 24D:
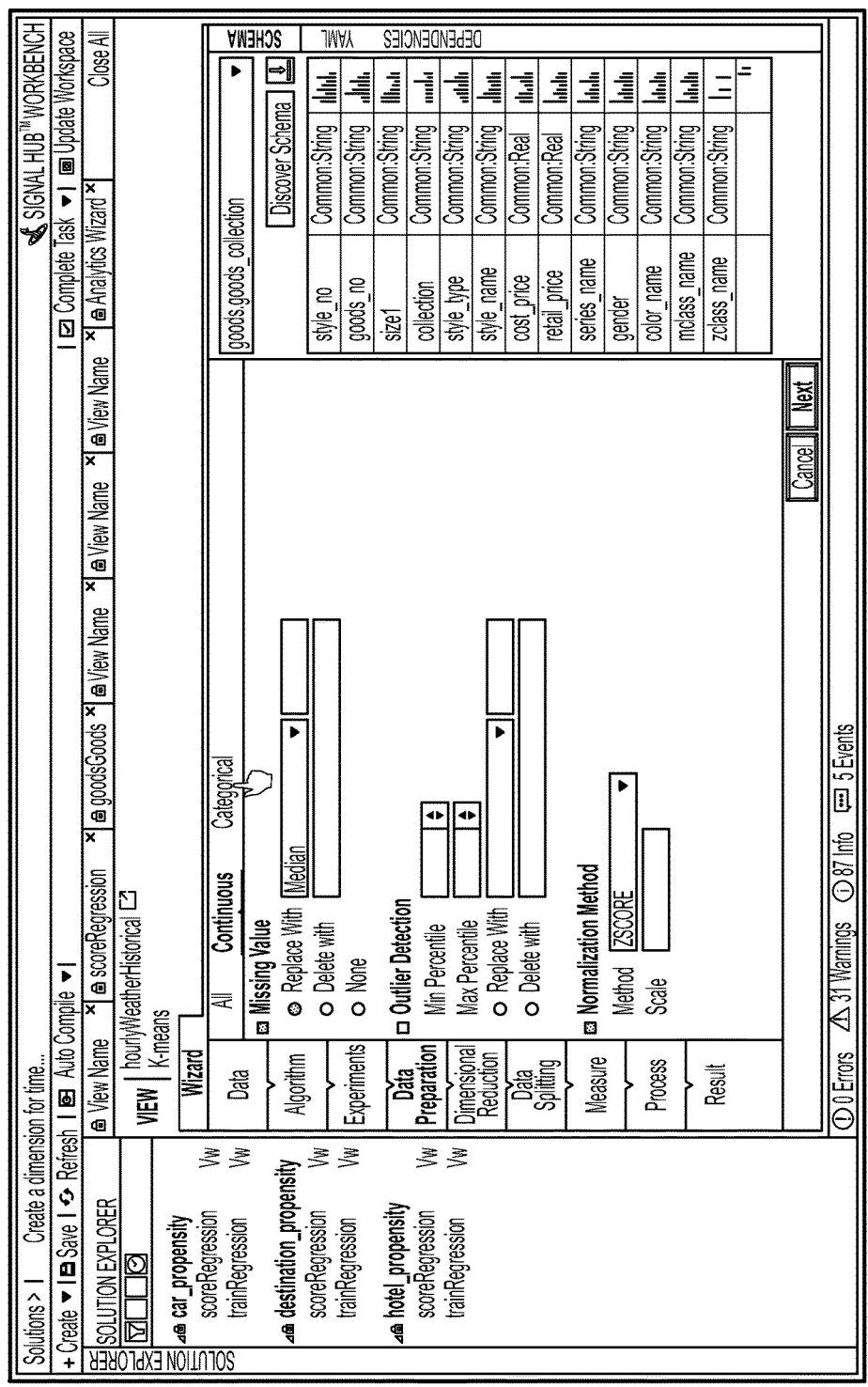
FIGS. 24D-J are screenshots illustrating the model training process in greater detail.
Figure 24E:
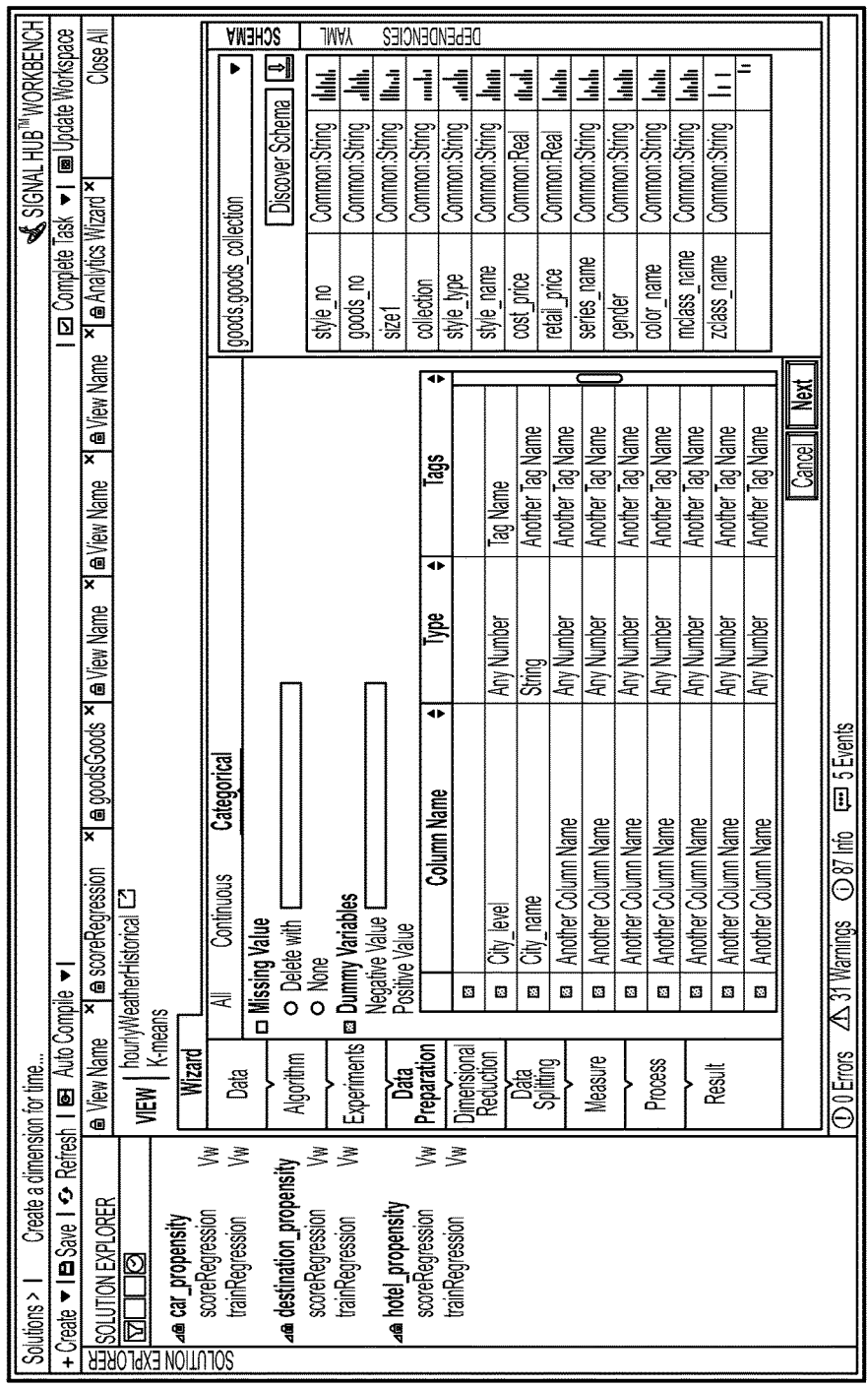
Figure 24F:
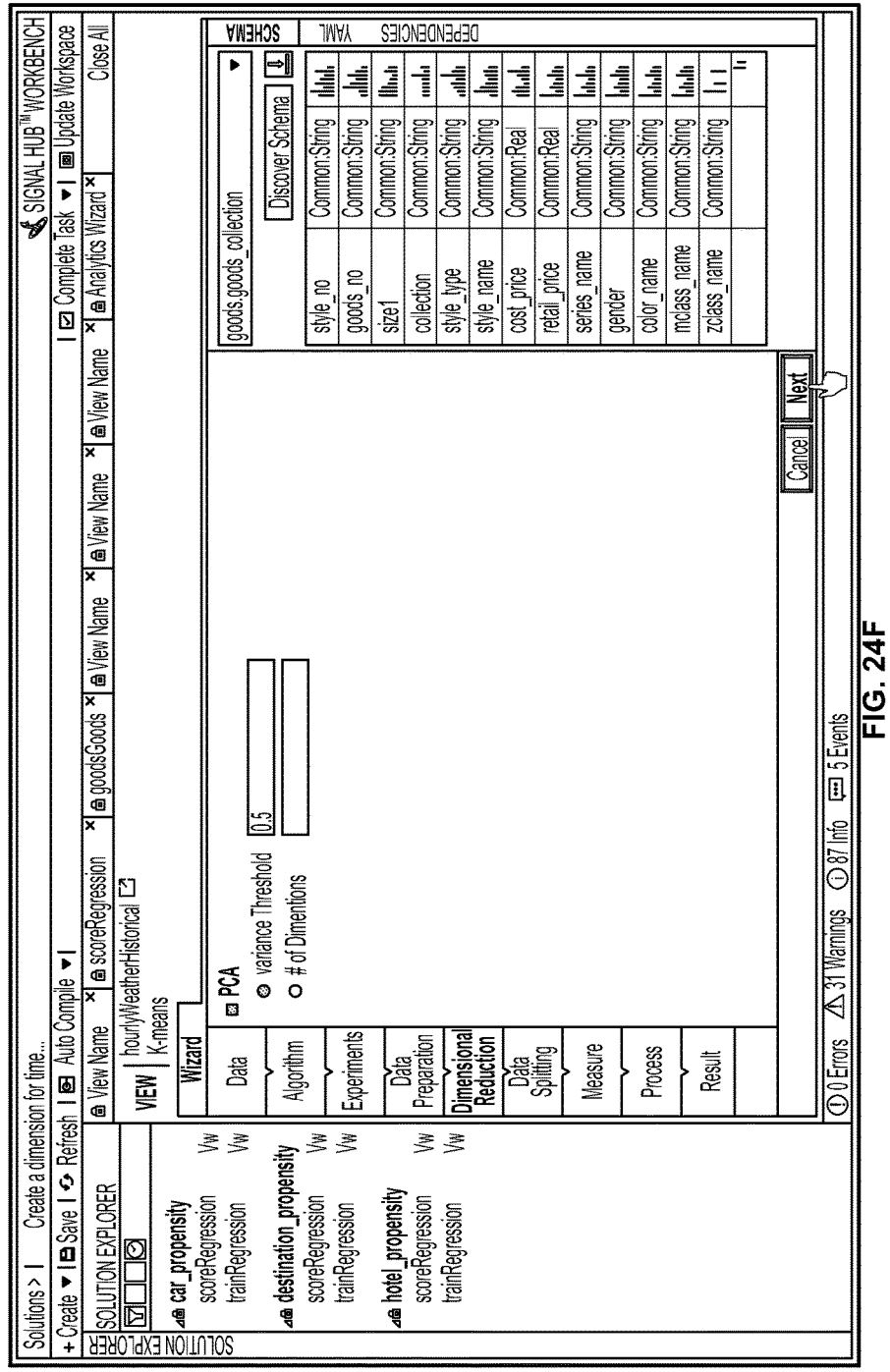
Figure 24G:
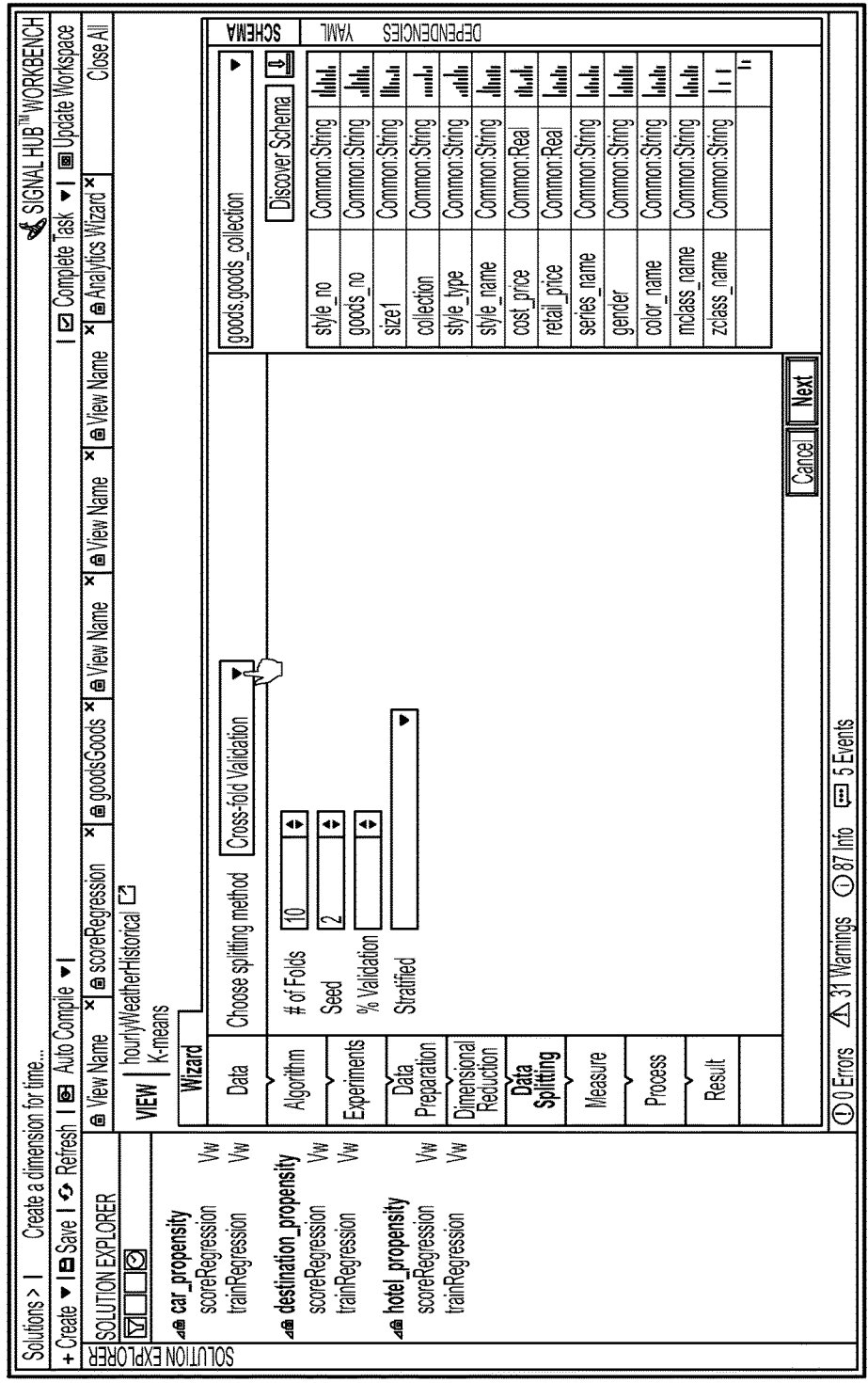
Figure 24H:
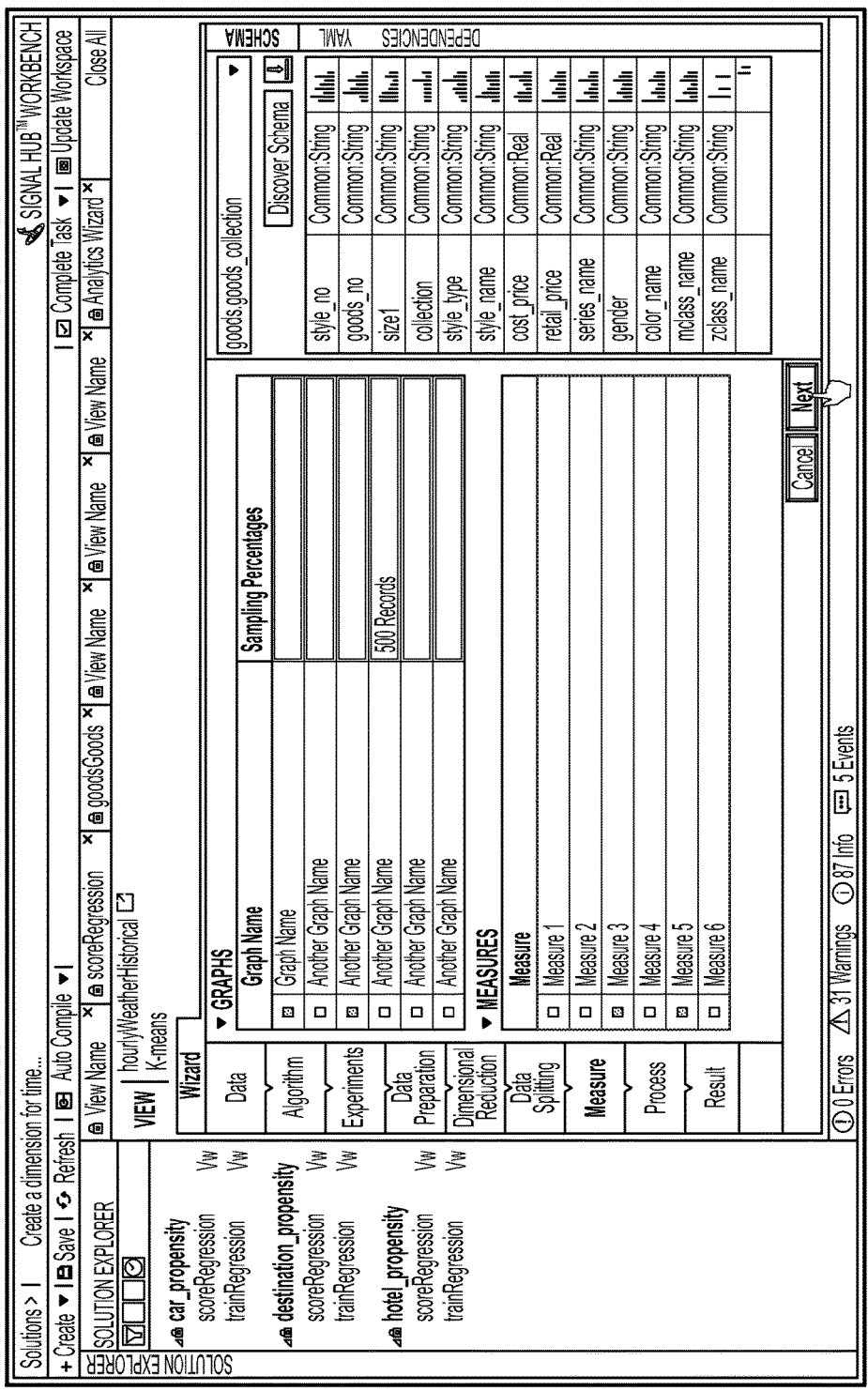
Figure 24I:
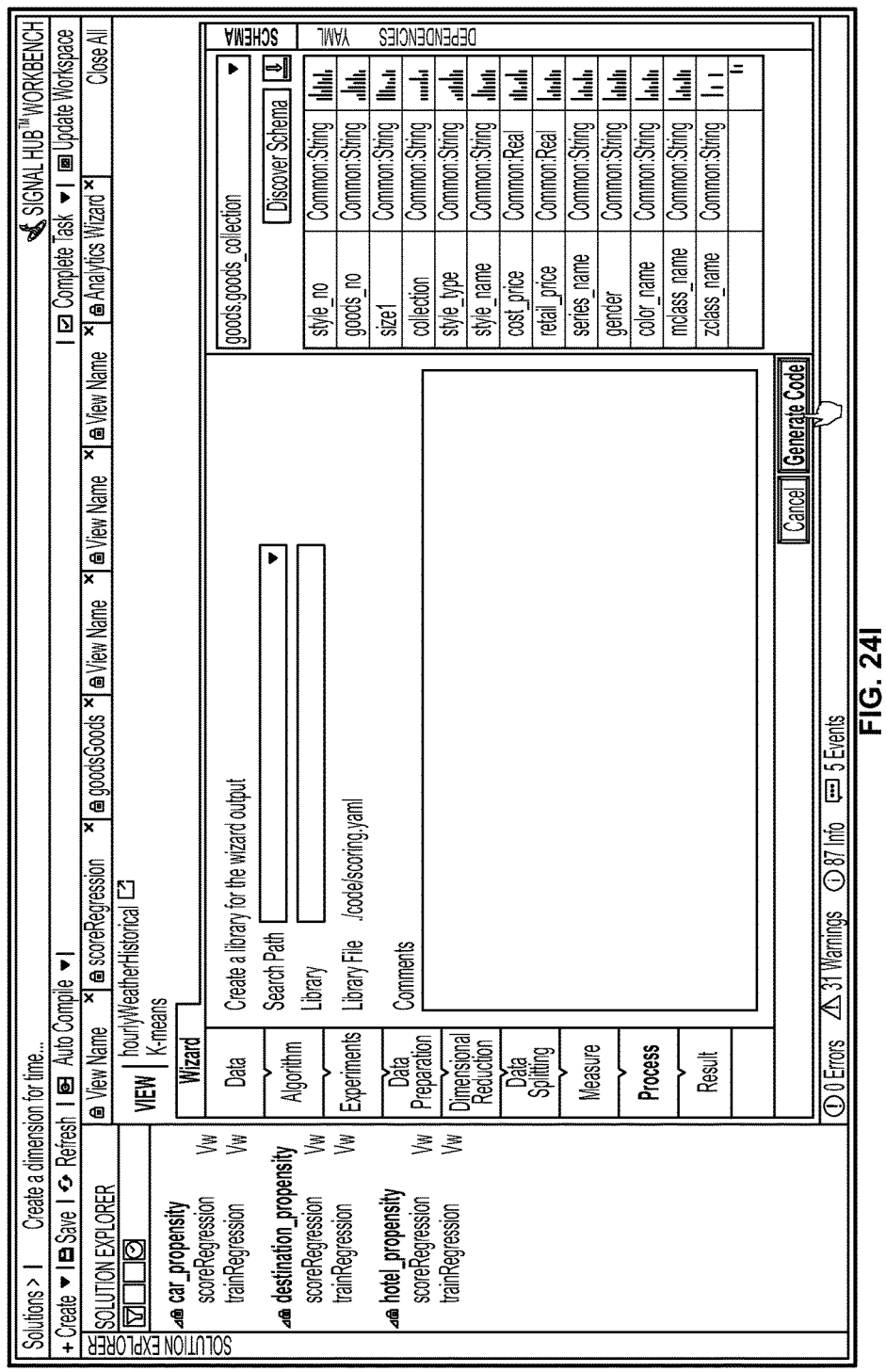
Figure 24J:
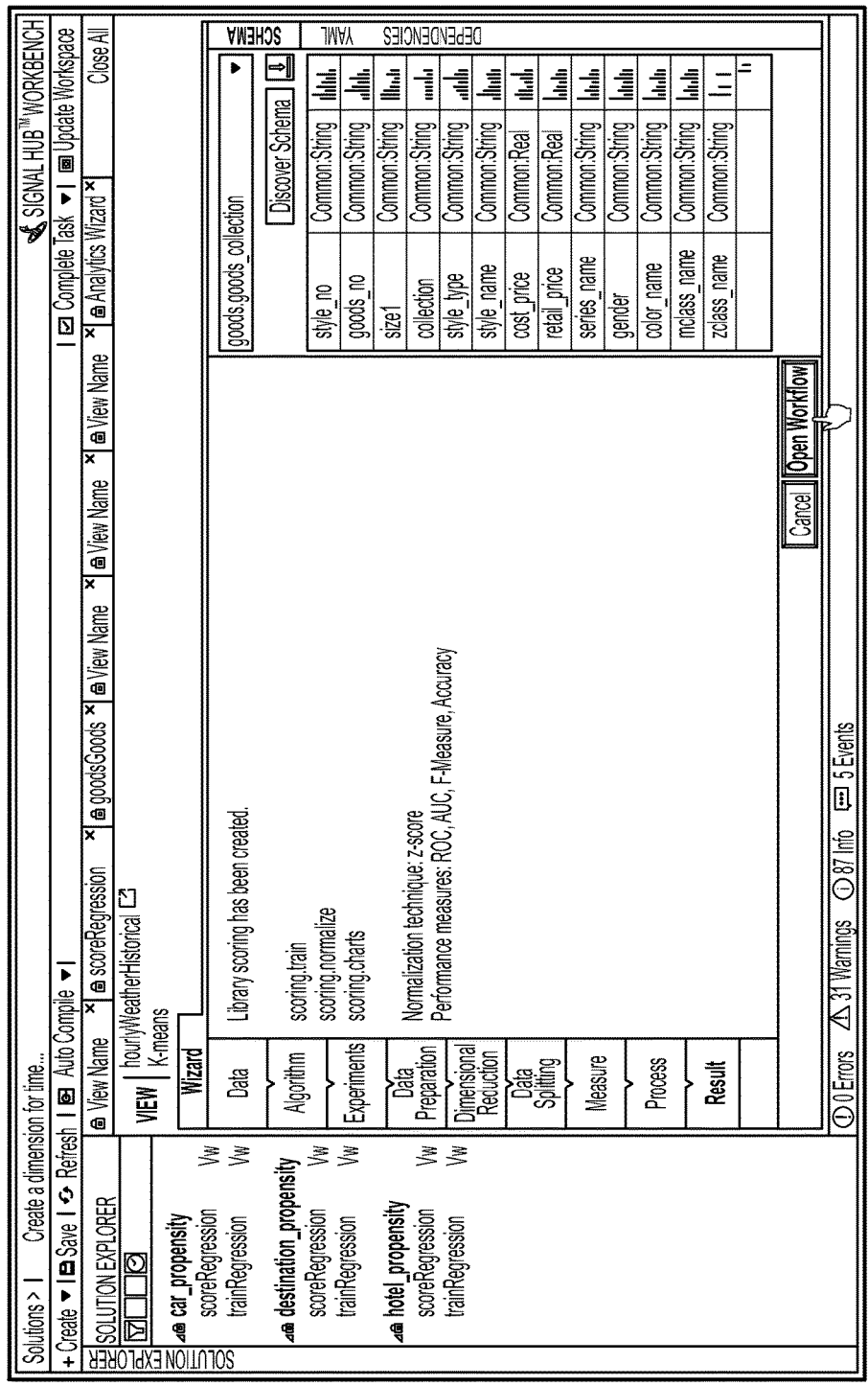

24A is a screenshot illustrating preparation of data to train a model using the Workbench 700 generated by the system. As shown, the Workbench 700 includes a tree view 702, and an analytic code development window 704 which includes a design tab 708, run tab 710, and results tab 712. The design tab 708 is activated, and within the design tab 708 are a plurality of other tabs. More specifically, the design tab 708 includes a transformations tab 714, a measures tab 716, a models tab 718, a persistence tab 720, a meta tab 722, and a graphs tab 724. Signal Hub offers several ways to split train and test data for model development purposes. The supplementary display portion 706 includes a YAML tab 726, a schema tab 728, and a dependencies tab 730. Signal Hub performs missing value imputation, normalization, and other necessary signal treatment before training the model, as shown in the supplementary display portion 706. Once a model has been selected, more information regarding the model is easily accessible, such as the description and model path. A user can also train an external model using any desired analytic tool. As long as the model output conforms to a standard pmml format, the Signal Hub platform can incorporate the model result and do the scoring later. FIG. 24B is a screenshot illustrating an alternative embodiment as to how users can select from a variety of model algorithms (e.g., logistic regression, deep autoencoder, etc.). As shown, the Workbench 700 can include a tab 703 for displaying a variety of signals. The Workbench 700 can include a selection means 732 for selecting a model algorithm. The selection means 732 can be a drop down menu or similar means known to those of ordinary skill in the art. FIG. 24C is a screenshot illustrating the different parameter experiments users can apply during the model training process. Signal Hub also allows user to configure execution of models with parameter pre-sets that optimize speed or optimize accuracy as execution steps. FIG. 24D is a screenshot illustrating how data preparation can be handled during the model training process. For example, missing values can be replaced with a median value. Furthermore, a normalization method can be applied to the data training. FIG. 24E is a screenshot illustrating how dummy variables can be introduced to facilitate the model training process. FIG. 24F is a screenshot illustrating the dimensional reduction that can be applied to the model training process. For example, a variance threshold can be introduced and the number of dimensions can be specified to further improve the model training accuracy. FIG. 24G is a screenshot illustrating the data splitting aspect of the model training process. For example, a splitting method can be chosen such as cross-fold validation or any other data splitting method known to those of ordinary skill in the art. Furthermore, the number of folds, seed, percent of validation, and the stratified field can be specified. FIG. 24H is a screenshot illustrating the measure tab which allows graph names to be specified along with sampling percentages. The measure tab further allows the corresponding measures to be selected. FIG. 24I is a screenshot illustrating the process tab which allows the user to create a library for the wizard output. In particular, a search path, library and comments can be inputted to the system. FIG. 24J is a screenshot of the result tab showing the output of the model training to the user. The foregoing steps of training a predictive model can be done over a Hadoop cluster using dataflow operations.

Figure 25A:
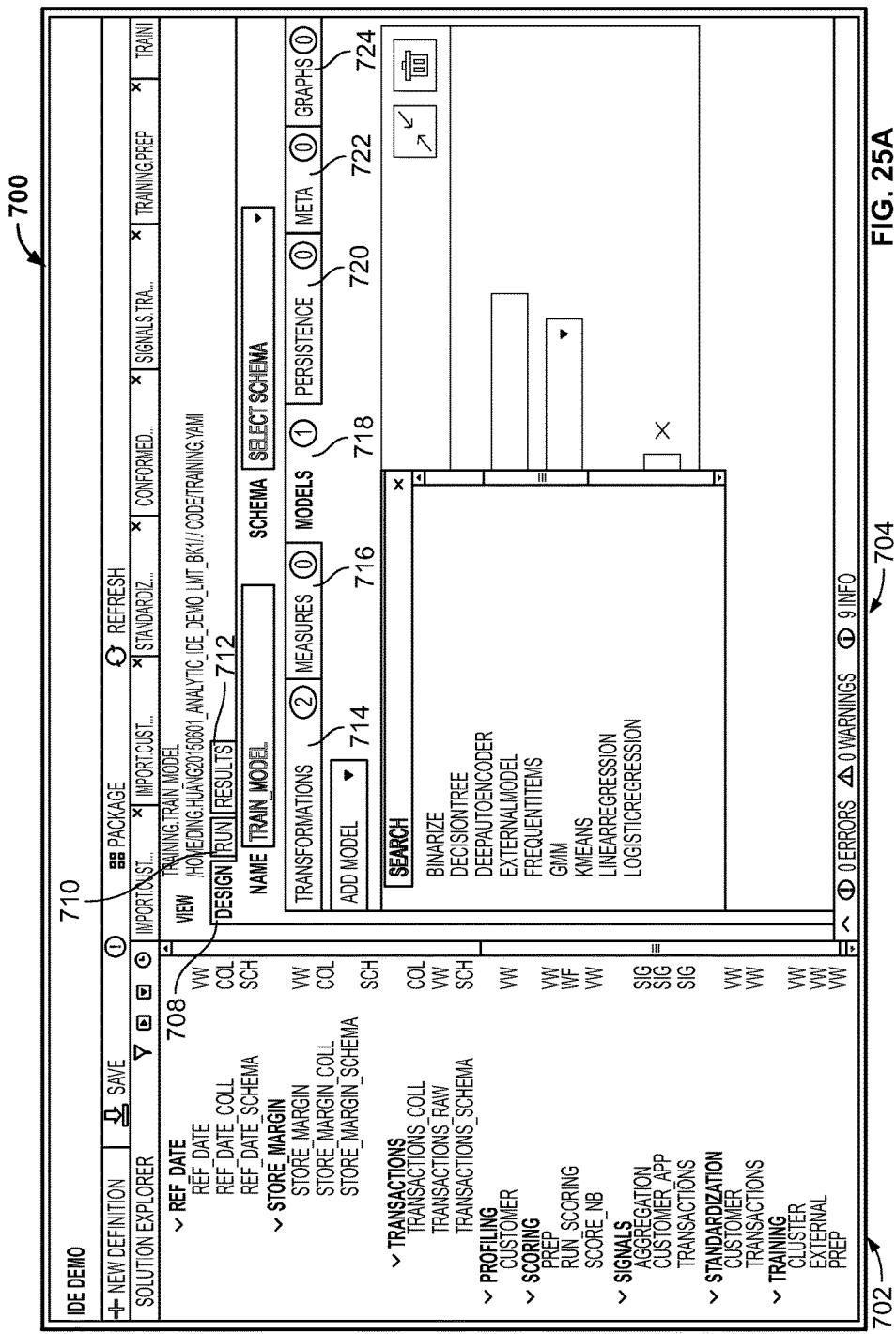
FIG. 25A is a screenshot illustrating training of a model using the Workbench subsystem of the present disclosure.
Figure 25B:
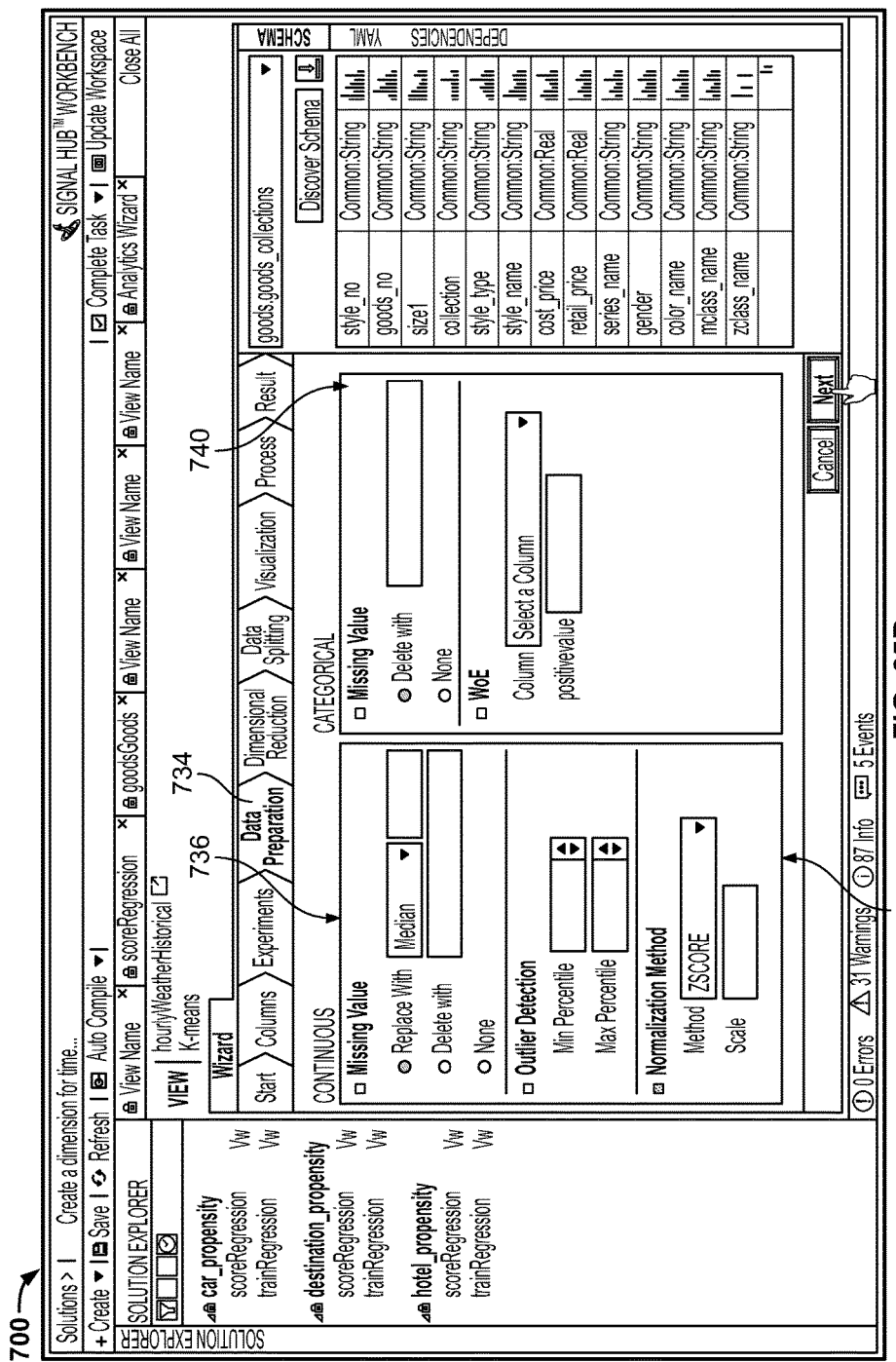
FIG. 25B is a screenshot illustrating preparation of data to train a model using the Workbench subsystem of the present disclosure.
Figure 25C:
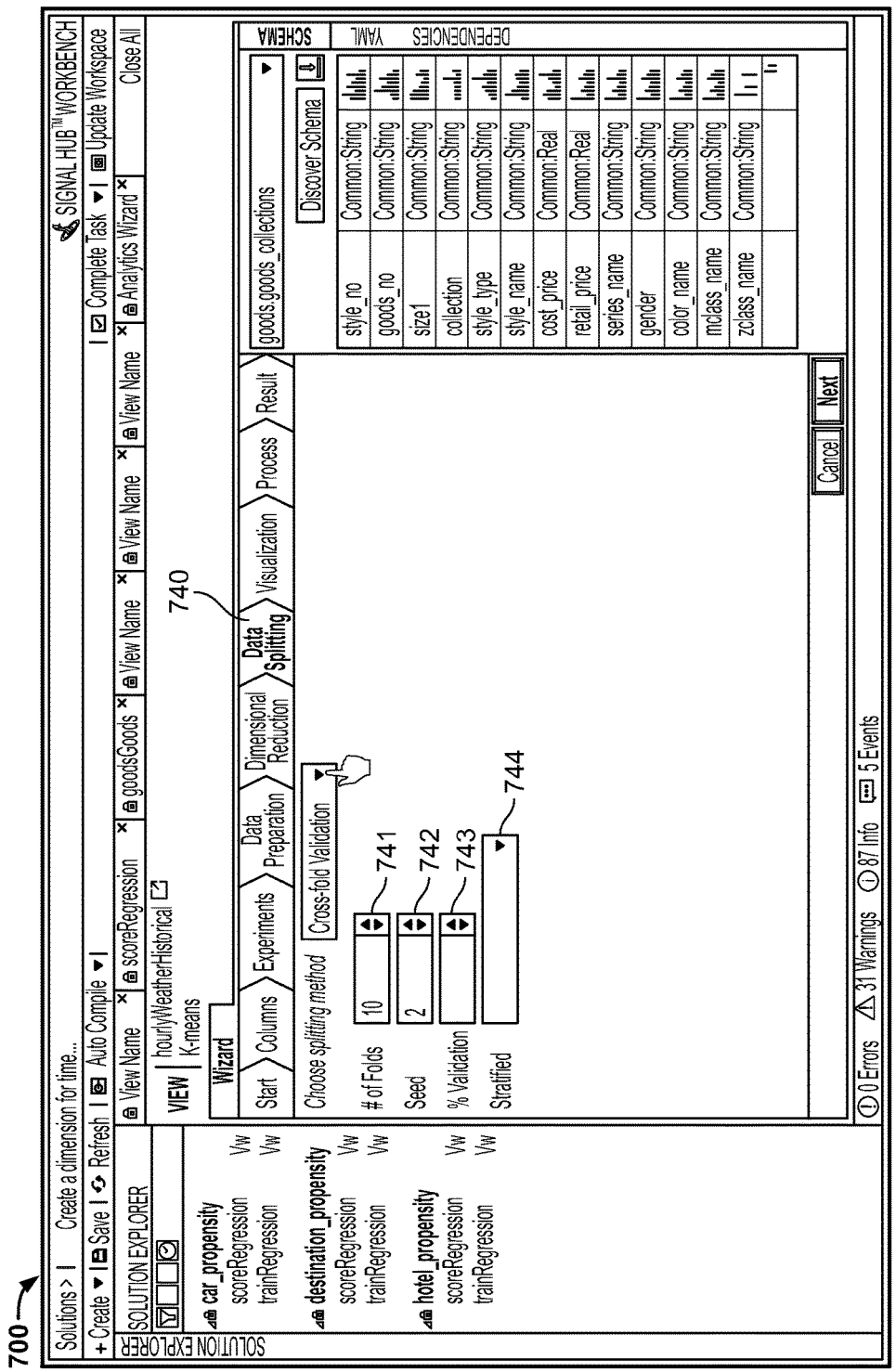
FIG. 25C is a screenshot illustrating different data splitting options provided by the Workbench subsystem of the present disclosure.
Figure 26:
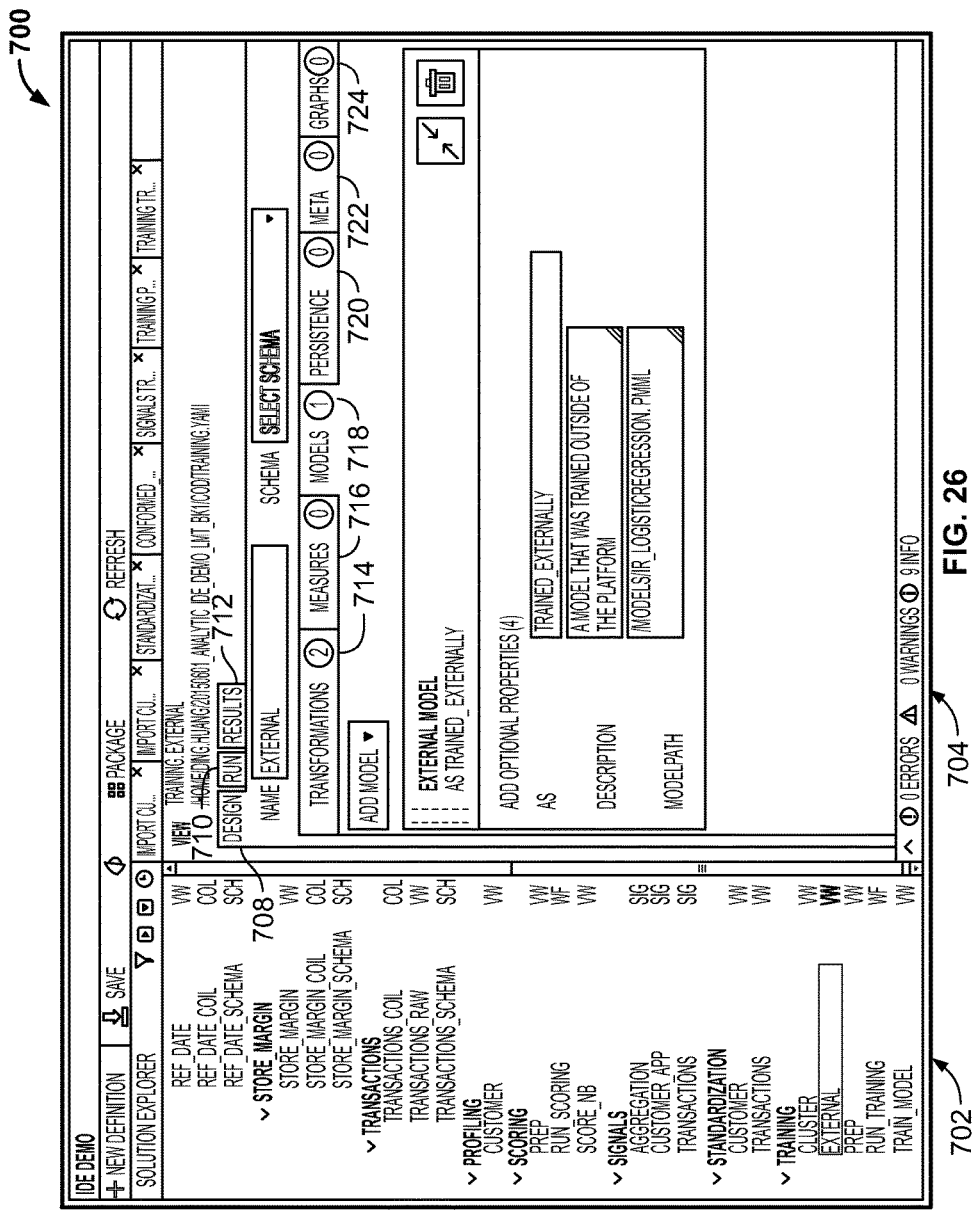
FIG. 26 is another screenshot illustrating loading an external model trained outside of the integrated development environment.

FIG. 25A is a screenshot illustrating training a model using the Workbench 700 generated by the system. Signal Hub could include prebuilt models that a user can train (e.g., logistic regression, deep autoencoder, etc.). As shown, the models tab 718 is selected, and a user can add one or more models, such as "binarize," "decision tree," "deepAutoencoder," "externalModel," "frequentItems," "gmm," "kmeans," "linearRegression," and "logisticRegression." A user can train an external model using any desired analytic tool. As long as the model output conforms to a standard pmml format, the Signal Hub platform can incorporate the model result and do the scoring. Under the models tab 718, once a model has been selected, more information regarding the model is easily accessible, such as the description and model path. FIG. 25B is a screenshot illustrating preparation of data to train a model using the Workbench generated by the system. The Workbench 700 can include a data preparation tab 734. Signal Hub can perform in the data preparation tab 734 missing value imputation 736, normalization 738, and other necessary signal treatment 740 before training the model. FIG. 25C is a screenshot illustrating different data splitting options provided by Workbench 700. The Workbench 700 can include a data splitting tab 740 for allowing input of the number of folds 741, number of seeds 742, percent of validation 743 and stratified input 744. FIG. 26 is a screenshot illustrating loading an external model trained outside of the integrated development environment.

Figure 27:
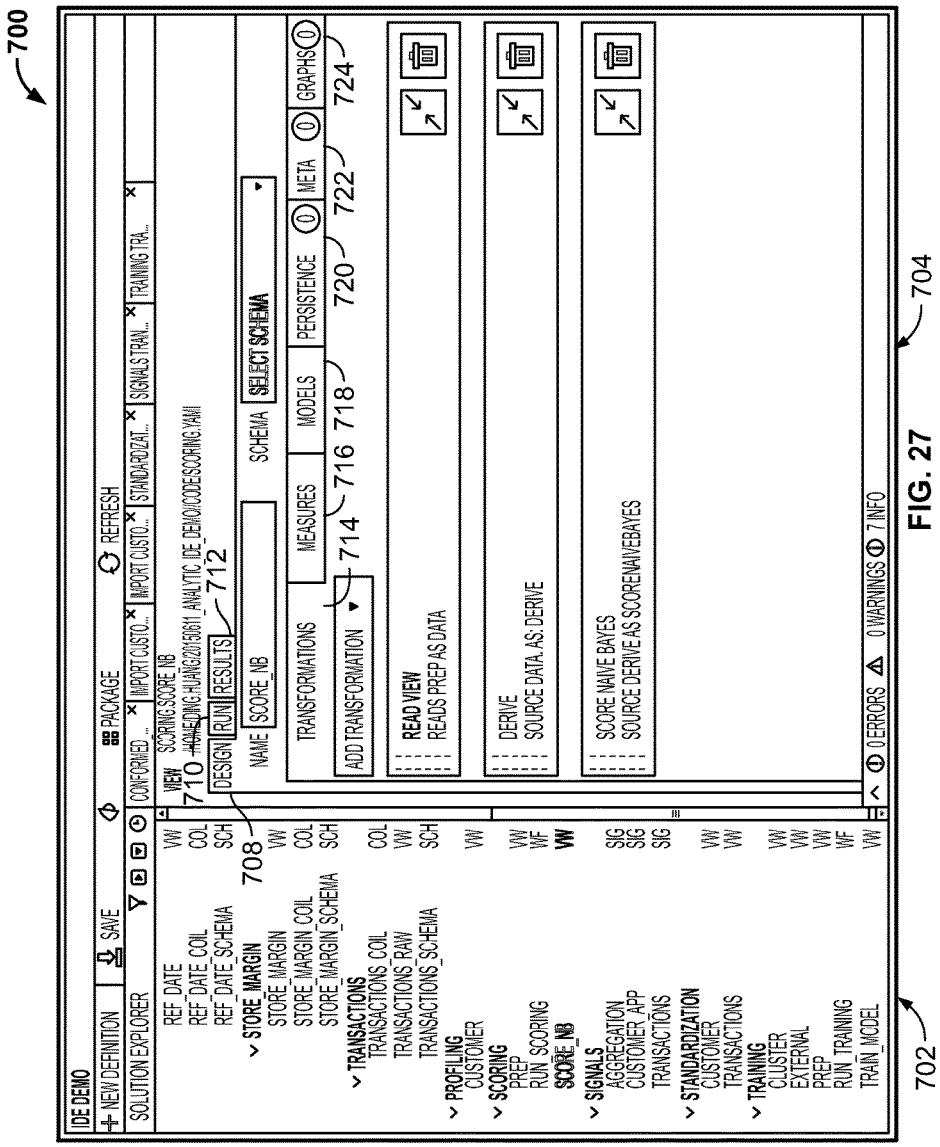
FIG. 27 is a screenshot illustrating scoring a model using the integrated development environment generated by the system.
Figure 28:
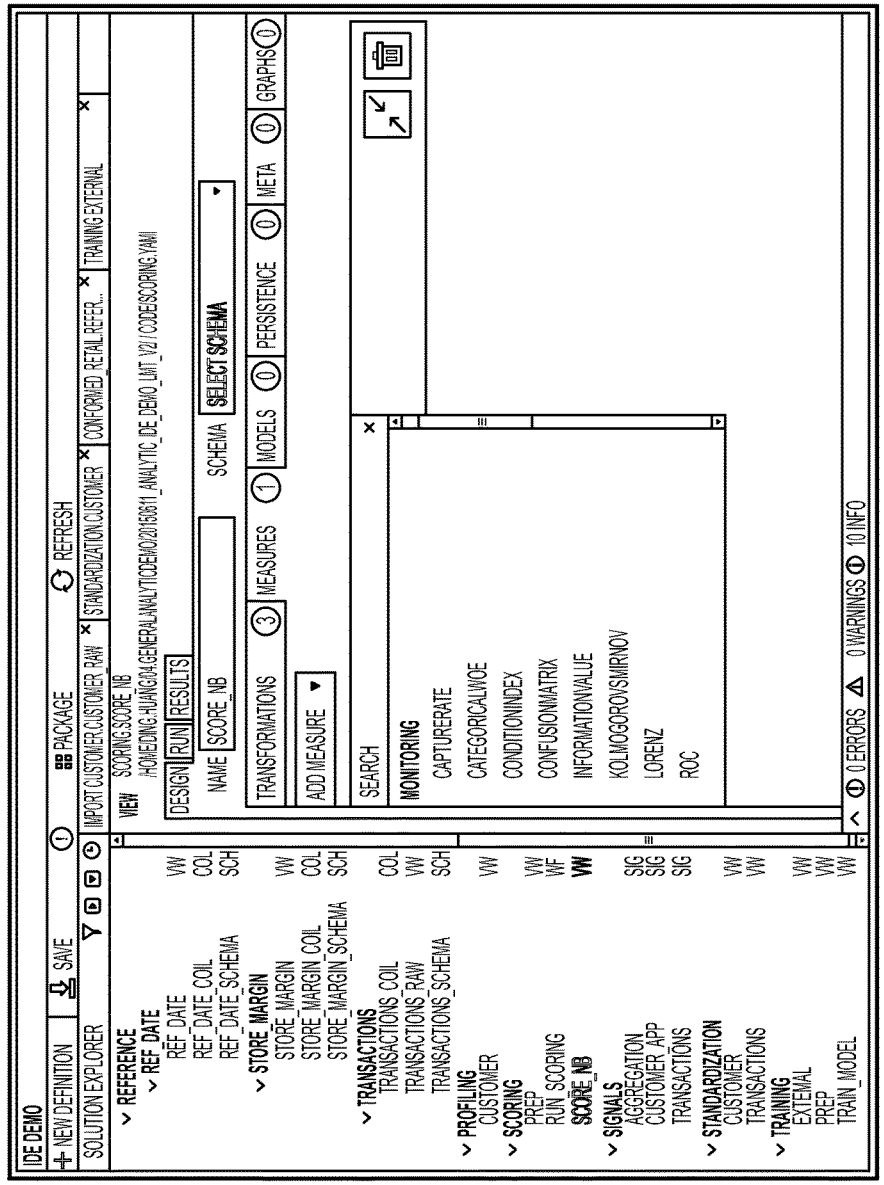
FIG. 28 is a screenshot illustrating monitoring model performance using the integrated development environment generated by the system.

FIG. 27 is a screenshot illustrating scoring a model using the Workbench 700 generated by the system. Signal Hub prebuilt a number of model scorers that can perform end to end analytic development activities. FIG. 28 is a screenshot illustrating monitoring model performance using the Workbench 700 generated by the system. Signal Hub offers various monitoring matrices to measure the model performance (e.g., ROC, KS, Lorenz, etc.). As shown, any of a variety of measures can be used to monitor and score the model. For example, monitoring measures could include "captureRate," "categorical Woe," "conditionIndex," "confusionMatrix," "informatonValue," "kolmogorovSmirnov," "Lorenz," "roc," etc.

Figure 29A:
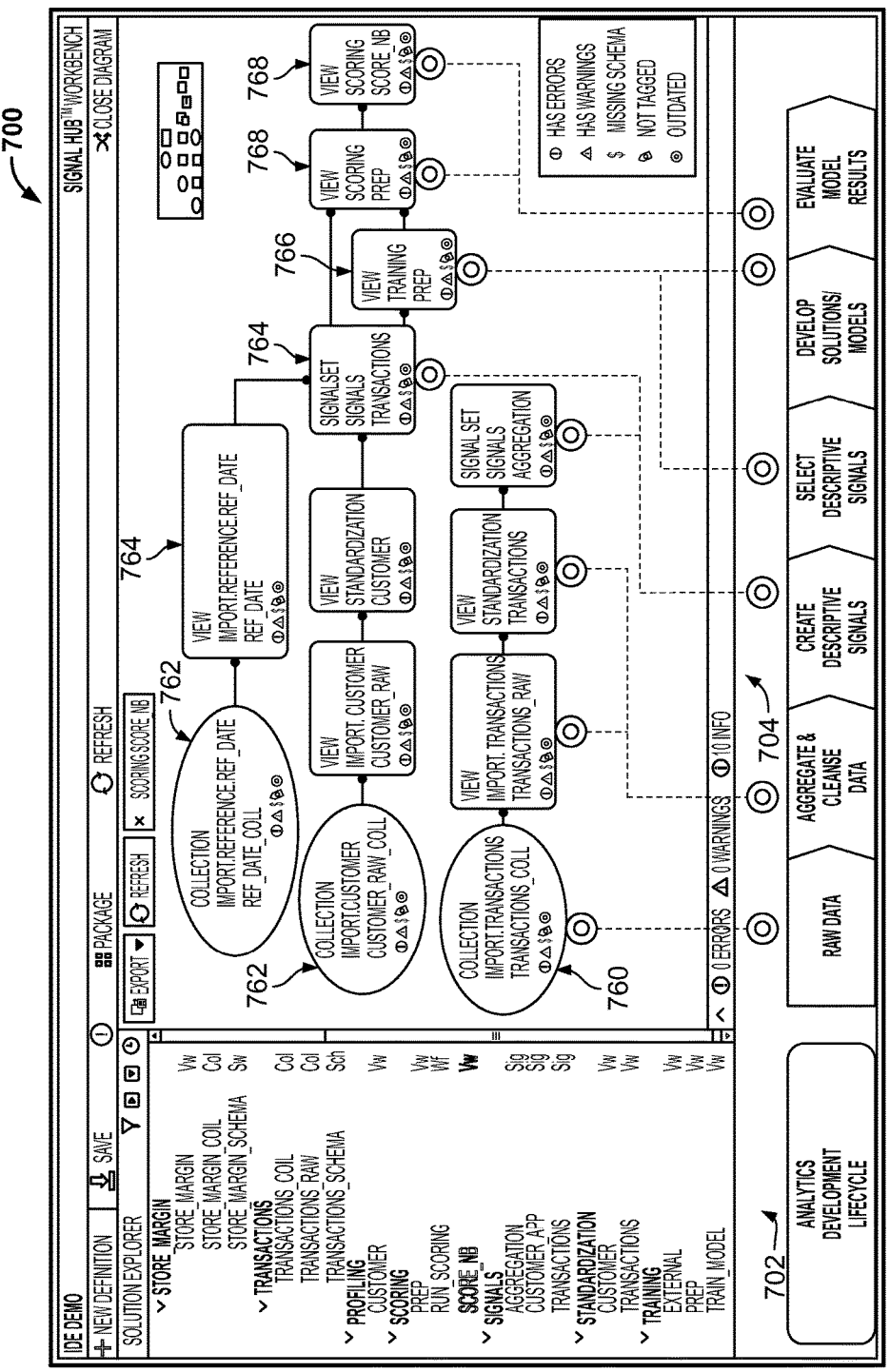
FIG. 29A is a screenshot illustrating a solution dependency diagram of the integrated development environment generated by the system.

FIG. 29A is a screenshot illustrating a solution dependency diagram 750 of the Workbench 700 generated by the system. The diagram 750 illustrates various modules for each portion of the analytics development lifecycle. For example, the diagram illustrates raw data modules 760, aggregate and cleanse data modules 762, create descriptive signals modules 764, select descriptive signal modules 766 (which is also the develop solutions/models module 766), and evaluate model results modules 768.

Figure 29B:
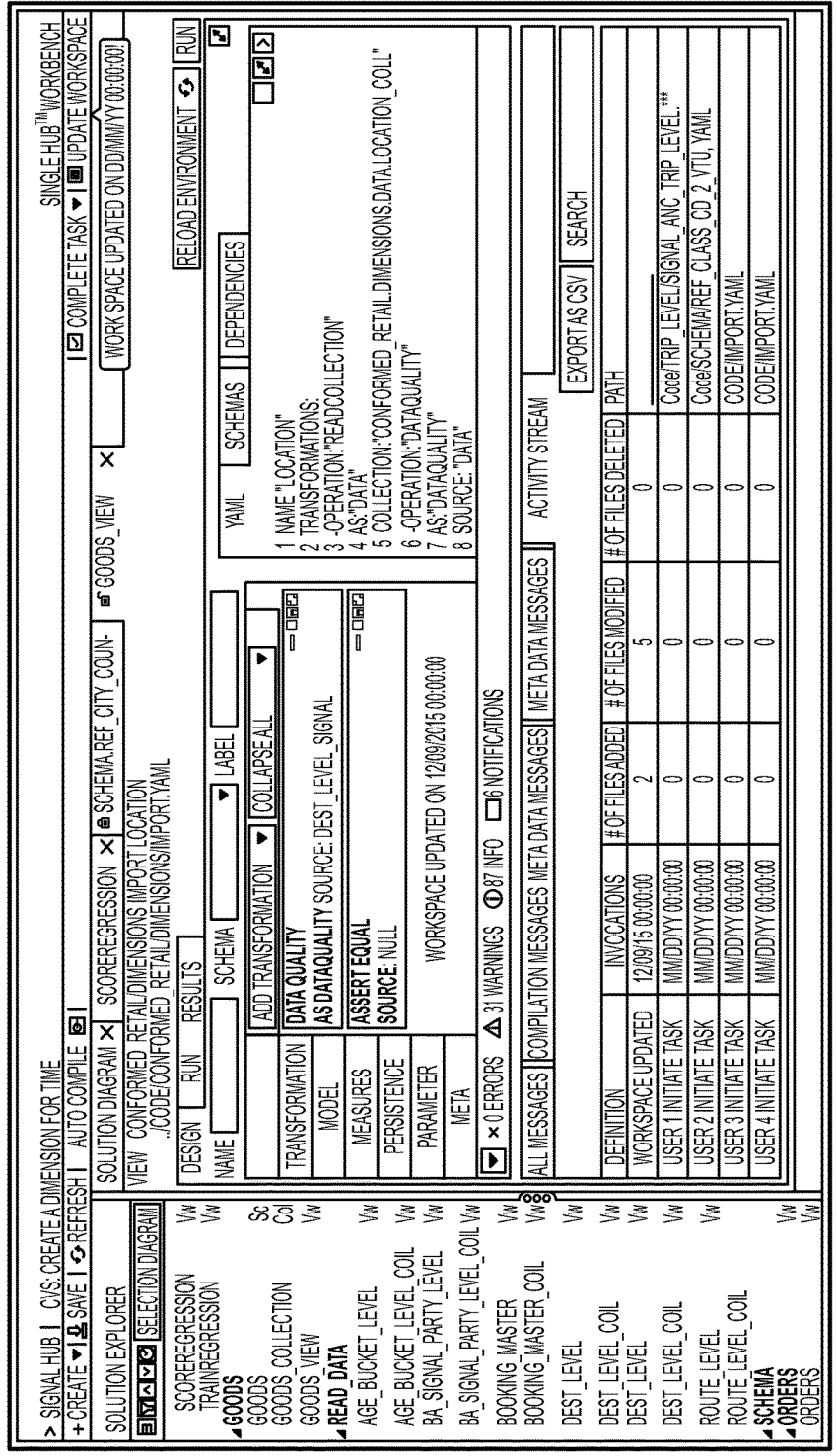
FIG. 29B is a screenshot illustrating a collaborative analytic solution development using the Workbench subsystem of the present disclosure.

FIG. 29B is a screenshot illustrating a collaborative analytic solution development using the Workbench generated by the system. The system of the present disclosure allows users to collaborate on large software projects for code development. In addition to code development, developers can also develop and collaborate on data assets. Besides stand-alone development mode, Signal Hub Workbench can also be connected with version control system (eg: SVN, etc.) in the backend to support collaborative development. Users can create individual workspaces and submit changes directly from Workbench user interface. Centralized Workbench also enables users to learn the different activity streams happening in the solution. Files that are being worked on by other developers would show up as locked by the system automatically to avoid conflicts. Locked files will become unlocked after the developer submits the changes or a solution manager forces to break the lock and all the developers would get a workspace update notification automatically. The system of the present disclosure can implement isolation requirements to further facilitate collaboration. For example, the system can isolate upstream code and data changes. If a developer is reading the results of a view or signal set, she expects them not to change without her knowledge. If a change has been made to the view, either because the underlying data has changed or because the code has changed, it should not automatically affect her work until she decides to integrate the updates into her work stream. Additionally, the system can protect a developer's code and data from the other developers' activities. Further, the system can also allow a user to decide when to make their work public. A user has the ability to develop new code without worrying about affecting the work of those downstream. When the work is completed, the user can then "release" her version of the code and data. Users will see this released version and chose whether they'd like to upgrade their view to read it.

The system can further facilitate collaboration by allowing a single library to be developed by a single developer at one point in time which will reduce code merging issues. Furthermore, the system can use source control to make code modifications. A user can update when she wants to receive changes from her team members, and commit when she wants them to be able to see other developers' changes. Each developer at a point in time can be responsible for specific views and their data assets. The owner of the view can be responsible for creating new versions of their data while other developers can only read the data that has been made public to them. Ownership can change between developers or even to a common shared user. A dedicated workspace can be created in the shared cluster which can be read-only for other developers and only the owner of the workspace can write and update data. When new code and data is developed, the developer can commit the changes to the source control and publish the new data in the cluster to the other developers. This allows the other developers to see the code changes and determine if they would like to integrate it with their current work.

FIG. 29C is a screenshot of a common environment file that contains code and library output paths to grant every developer access to the code and data of every developer, regardless of where the data resides. The definitions in the file can be referenced with a qualified name instead of a filepath. This allows an easy move from one workspace to another without changing the code by making a small change to the common environment file. FIG. 29D is a screenshot of a separate personal environment file for a user working on a subset of a project. The file begins by inheriting the common project environment file "env_project.yaml." Thus, all of the parameters set in the general environment file will also apply if you run with the personal file, such as "env_myusername.yaml." Any parameters that are also defined in the personal file, in this case "etlVersion," will be over-ridden. So if the workflows are run with "en_vproject.yaml," the "etlVersion" will be 1.4. If the workflows are run with "env_myusername.yaml," then "etlVersion" will be 1.5. With either environment file, "importVersion" will be 1.1. FIGS. 29E-29I are screenshots of environment files having multiple output paths. The system can also allow users to have multiple output paths for the data views using the "libraryOutputPaths" parameter in the environment file. These paths can be specified as a map between a library and a file path in which to place the data of that library. For a shared Hadoop cluster, the file path can point to a folder on HDFS. The default data location can still be decided using the "dataOutputPath" if the library is not mapped to any new location. Using this map, each library can be assigned to a unique data location. The project owner can therefore, map each library to a directory that is owned by a given developer. This can further allow data view abstraction modes for maintaining fast incremental data updates without underlying filesystem support for the data update FIG. 29J is a screenshot of code for data versioning. Data versioning is the ability to store different generations of data, and allow other collaborators to decide which version to use. To achieve this, users can version their data using the label properties of views. There are two ways of doing this: one in the view itself, the other in the common environment file. The code is shown in FIG. 29J. Every time the view is executed, the version of the view data can be determined by the label. If a new label is used, a new folder can be created with a new version of the view's data. The granularity of this versioning is up the user; she can choose to assign the version number to just one view or to some subset, depending on the needs of the project. Every time the user wants to publish to her team members a new version of "myView, the user can increment "myView_LatestVersion" in the common environment file. This change can indicate either a code update or a data update. Additionally, the user may add a comment to the environment file giving information about this latest version, including when it was updated, what the changes were, etc. The user can then commit the common environment file with the rest of her code changes. With this information, users of the view further downstream can choose whether they'd like to upgrade to the latest version or continue using an earlier version. If the downstream users would always get the latest version, they can use the same variable "myView_LatestVersion" in the label parameter of the "readView" for "myView." Since they share the same common environment file, the latest value will be used when a user updates her code from system. If the user wants to stay with an existing version, the user can override the version in their private environment file to a specific version. Once a version is "released," the permissions on that directory can be changed to make it non-writable even for the developer herself, so that it is not accidentally overwritten. This can allow users to set different version numbers and "libraryOutputPaths." For example, the project-level environment file (the one users are using by default) can have the latest release version for a given view. The user developing it can have a private environment file with a later version. The user can do this by including the same version parameter in her file and running the view with her private environment file. This can allow the user to develop new versions while others are reading the older stable version.

In most cases, users can "own" a piece of code, either independently or as a team. They can be responsible for updating and testing the code, upgrading the inputs to their code, and releasing versions to be consumed by other users downstream. Thus, if the team maintaining a given set of code needs an input upgraded, they can contact the team responsible for that code and request the relevant changes and new release. If the team upstream is not able to help, the user can change the "libraryOutputPaths" for the necessary code to a directory in which they have permissions. It involves no code changes past the small change in the environment file. If the upstream team is able to help, they can make the release. This allows collaboration with minimum disruption.

Figure 32:
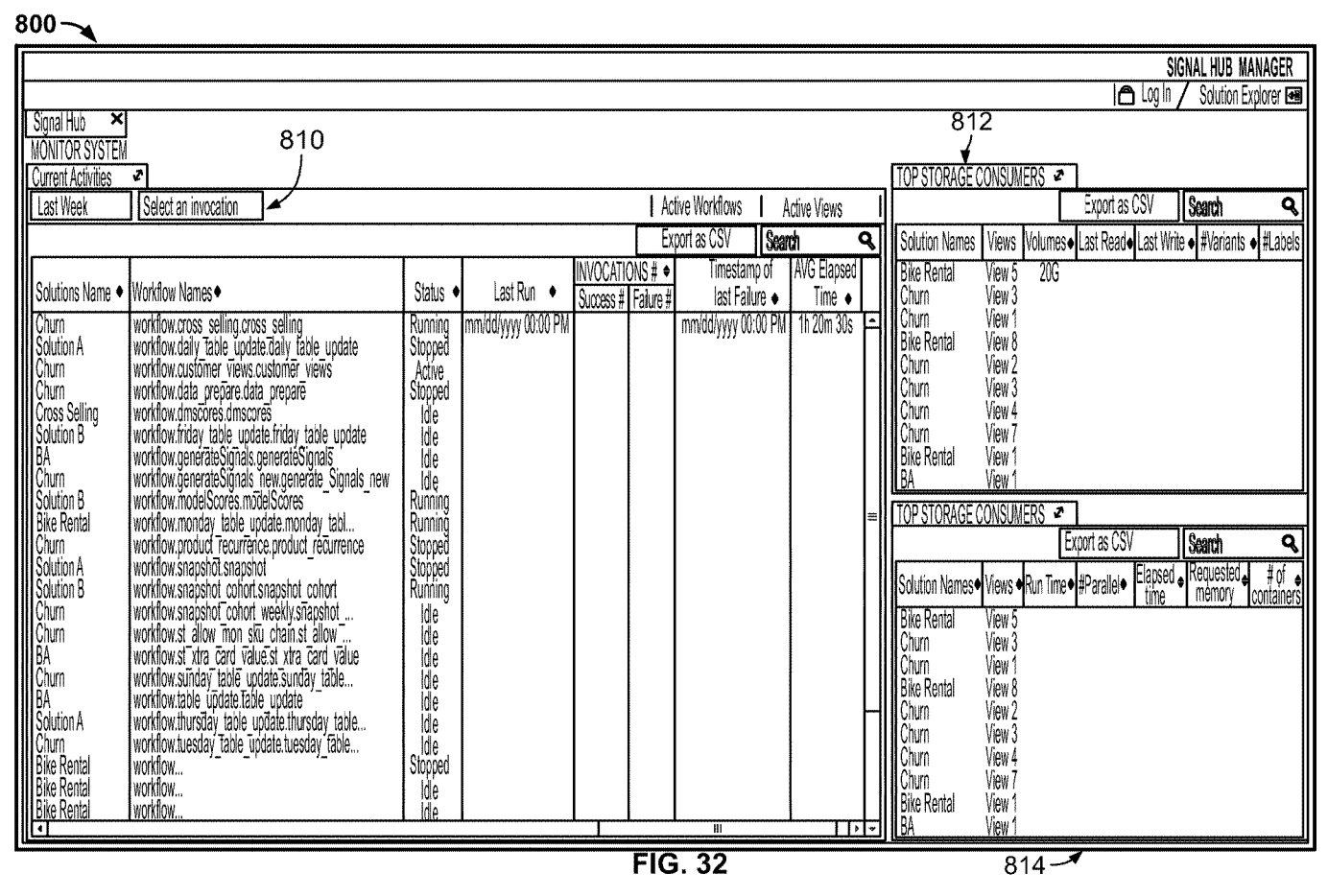

FIGS. 30-32 are screenshots illustrating the Signal Hub manager 800 generated by the system to manage user access to overall Signal Hub platform and analytic operation process. The Signal Hub manager 800 provides a management and monitoring console for analytic operational stewards (e.g., IT, business, science, etc.). The Signal Hub manager 800 facilitates understanding and managing the production quality and computing resources.

Figure 30A:
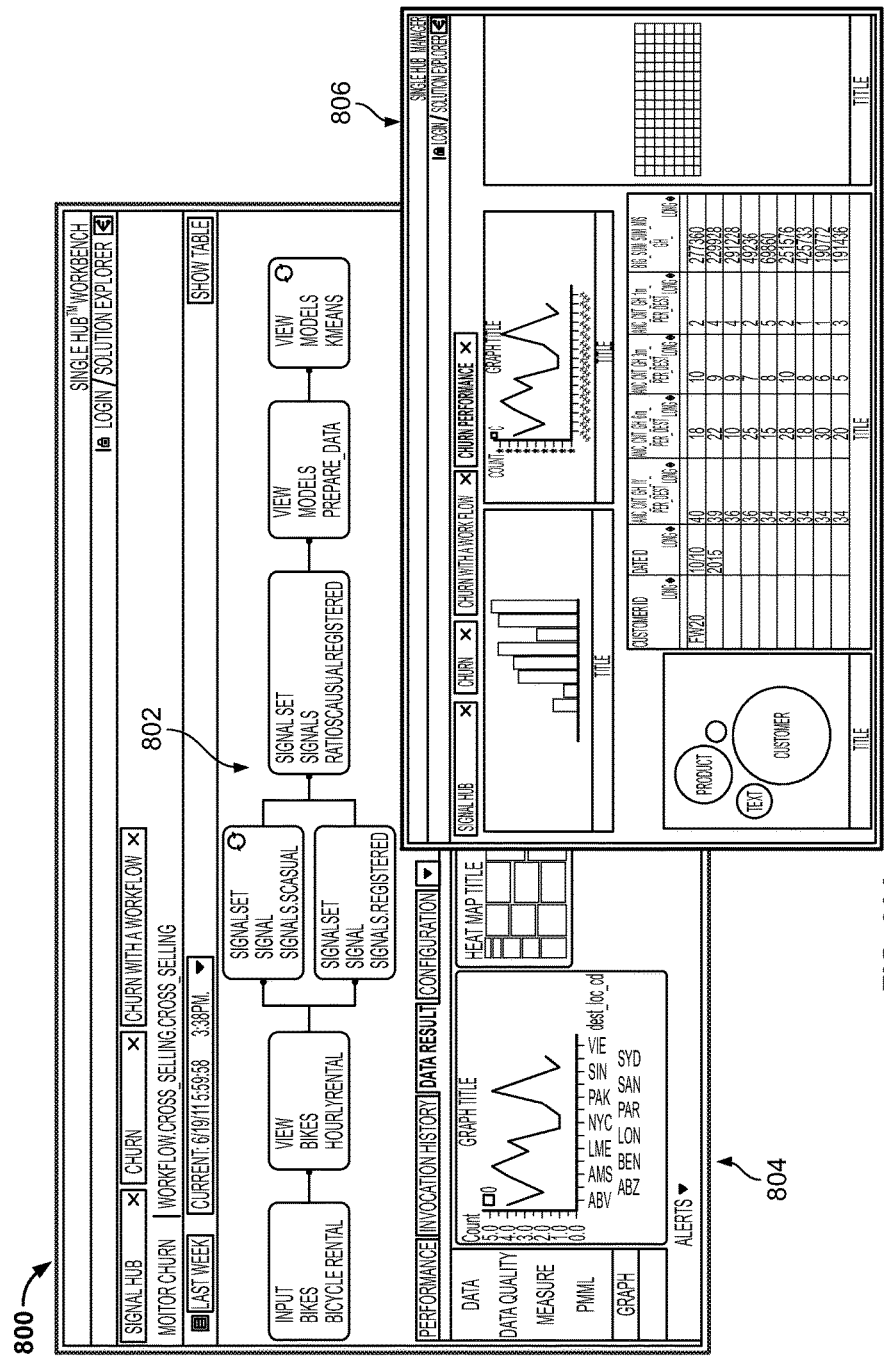

FIG. 30A is a screenshot of the Signal Hub manager 800 generated by the system. The Signal Hub manager 800 facilitates easy viewing and management of signals, signal sets, and models. The management console allows for the creation of custom dashboards and charting, and the ability to drill into real time data and real time charting for a continuous process. As shown, the Signal Hub manager 800 includes a diagram view. In this view, the Signal Hub manager 800 could include a data flow diagram 802 showing the general data flow of raw data to signals to models. Further, the Signal Hub manager 800 could include a chart area 804 providing a variety of information about the data, signals, signal sets, and models. For example, the chart area 804 could provide one or more tabs related to performance, invocation history, data result, and configuration. The data result tab could include information such as data, data quality, measure, PMML, and graphs. The Signal Hub manager 800 could also include additional information as illustrated in window 806, such as performance charts and heat maps. The chart area allows a user to drill down on every workflow to easily understand the processing of all views involved in the execution of a use case.

Figure 30B:
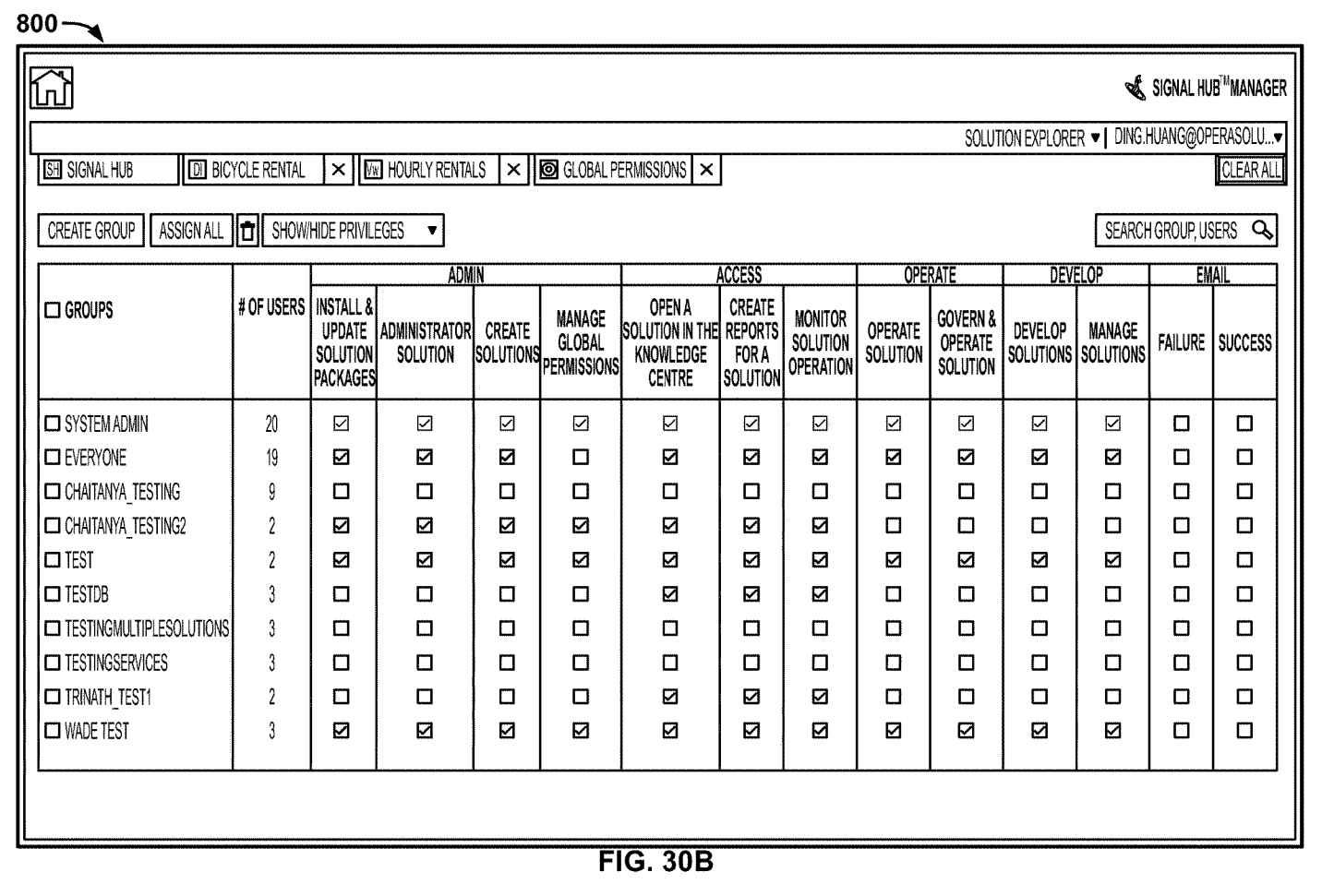

FIG. 30B is a screenshot for user access management of the Signal Hub manager 800 generated by the system. The Signal Hub manager 800 provides role-based access control for all Signal Hub platform components to increase network security in an efficient and reliable way. As shown, users are assigned to different groups and different groups are authorized with different permissions including admin, access, operate, develop and email. Besides global permission management, Signal Hub platform also allows admin user to manage authentication and authorization on solution basis.

Figure 30C:
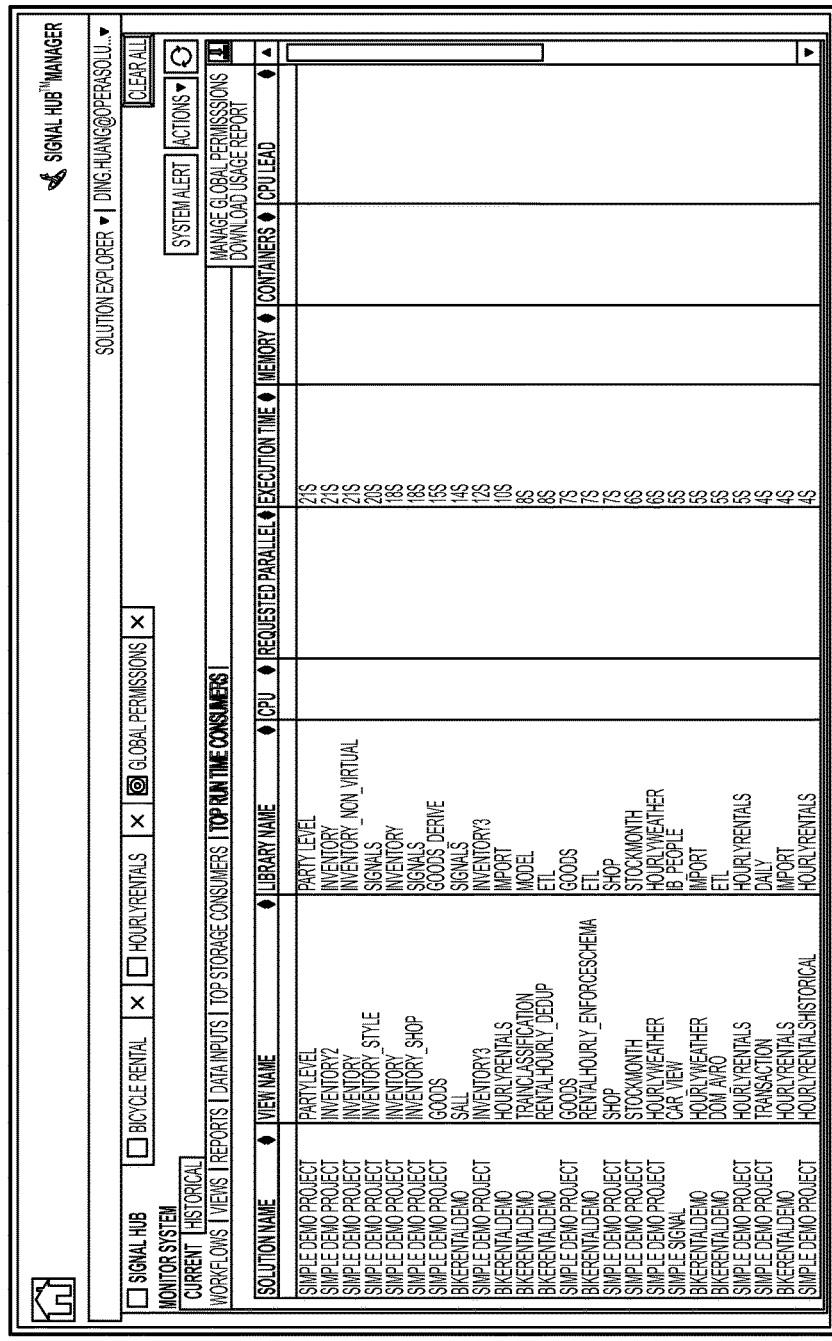

FIG. 30C is a screenshot for overall Signal Hub platform usage tracking of the Signal Hub manager 800 generated by the system. As shown, a user is able to download the usage report from Signal Hub manager user interface to track how other user are using different Signal Hub platform components by detailed event (e.g. login, entering Knowledge Center, create a report, create a dashboard, etc.) and conduct further analysis on top of it.

Figure 31A:
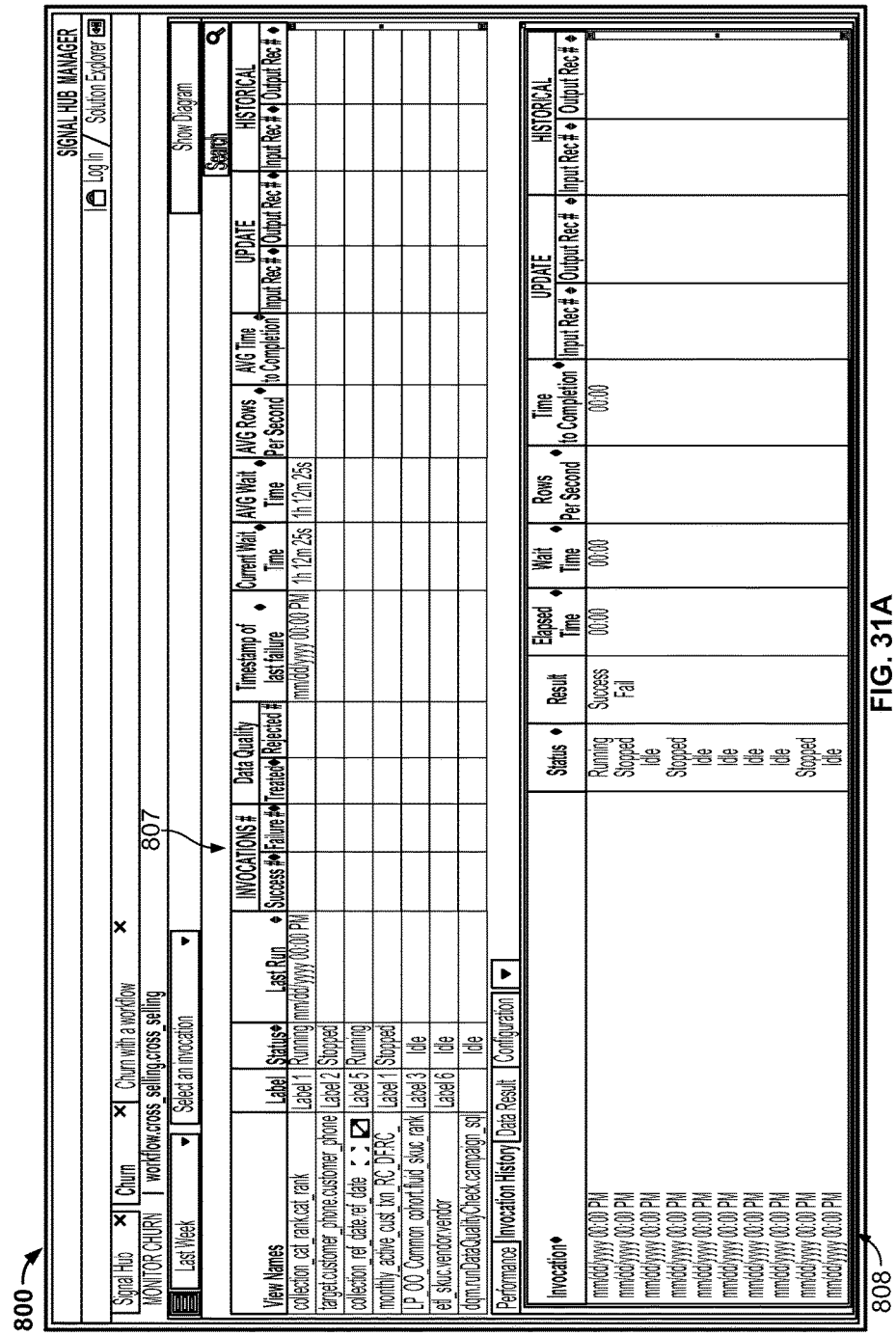
Figure 31B:
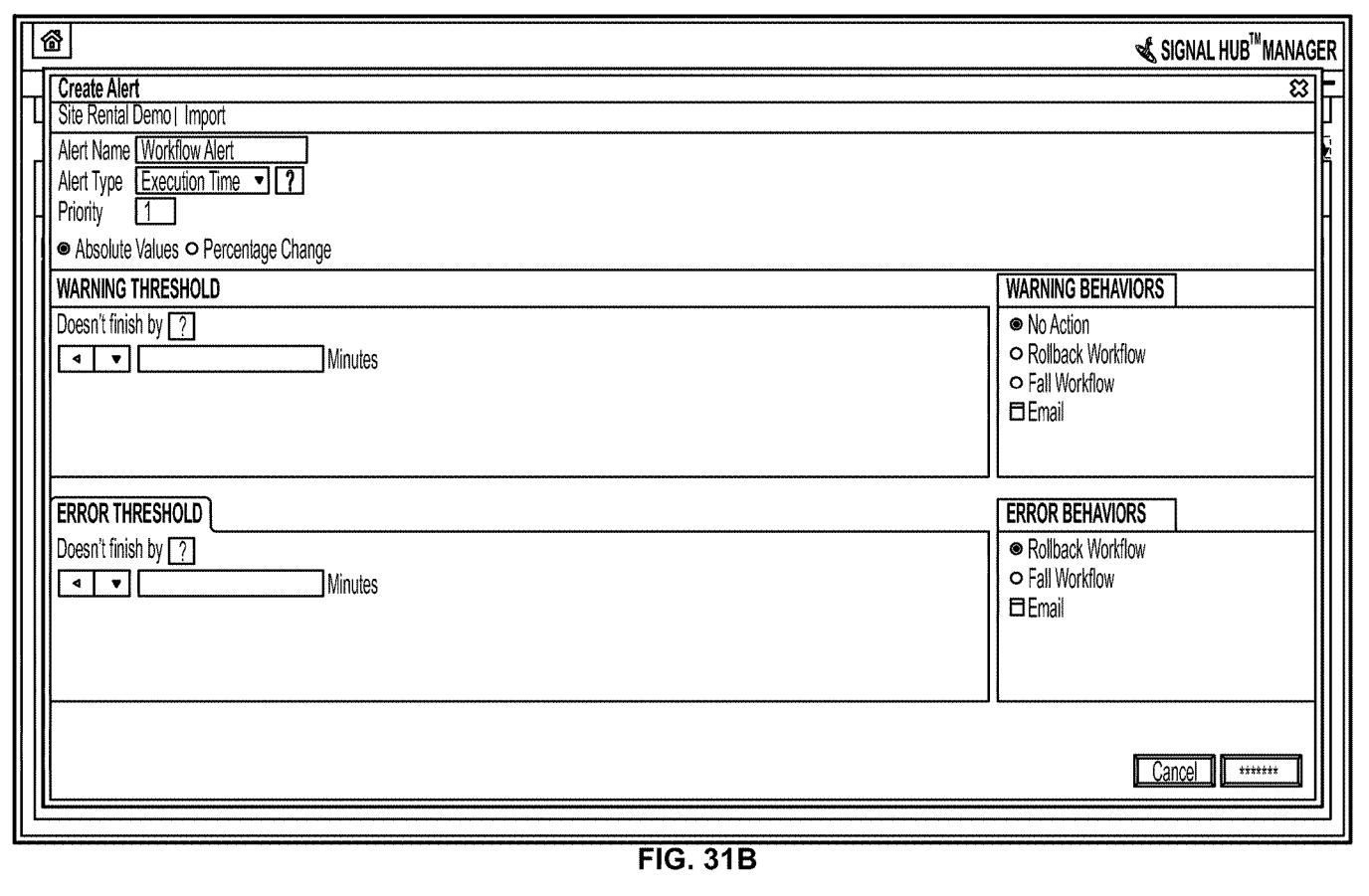

FIGS. 31A-B are screenshots for alerts system of the Signal Hub manager 800 generated by the system. Based on monitor system stats, a user can set up alerts at different level including system level alert, workflow level alert and view level alert. Signal Hub platform also allows user to set up different types of alert (eg: resource usage, execution time, signal value drift, etc), define threshold and trigger recovery behaviors (eg: email notification, fail job, roll back job) automatically. The alert feature enables users to better track solution status from both operational and analytic perspectives and greatly improves solution operation efficiency. FIG. 31A is another screenshot of the Signal Hub manager 800 generated by the system. The Signal Hub manager 800 includes a table view. In this view, the Signal Hub manager includes a data flow table of information regarding the general data flow of raw data to signals to models. The data flow table includes view name, label, status, last run, invocation number (e.g., success number, failure number), data quality (e.g., treated number, rejected number), timestamp of last failure, current wait time, average wait time, average rows per second, average time to completion, update (e.g., input record number, output record number), historical (input record number, output record number), etc. Similar to the diagram view discussed above, the table view could also include a chart area. For example, the chart area 804 could provide one or more tabs related to performance, invocation history, data result, and configuration. The invocation history tab could include invocation, status, result, elapsed time, wait time, rows per second, time to completion, update (e.g., input record number, output record number), and historical (e.g., input record number, output record number). FIG. 31B is a screenshot illustrating overall Signal Hub platform usage tracking of the Signal Hub manager 800 and alert functionality generated by the system. As shown, a user is able to download the usage report from Signal Hub manager user interface to track how other user are using different Signal Hub platform components by detailed event (e.g. login, entering Knowledge Center, create a report, create a dashboard, etc.) and conduct further analysis on top of it.

FIG. 32 is another screenshot of the Signal Hub manager 800 generated by the system. More specifically, shown is the monitor system of the Signal Hub manager 800. This facilitates easy monitoring of all analytic processes from a single dashboard. The current activities window 810 has a table which includes solution names, workflow names, status, last run, success number, failure number, timestamp of last failure, and average elapsed time. The top storage consumers window 812 has a table which includes solution names, views, volume, last read, last write, number of variants, number of labels. The top run time consumers window 814 has a table which includes solution names, views, run time, number parallel, elapsed time, requested memory, and number of containers. A user is also able to drill down to a specific solution, workflow, or view to learn about their operational status.

Figure 33:
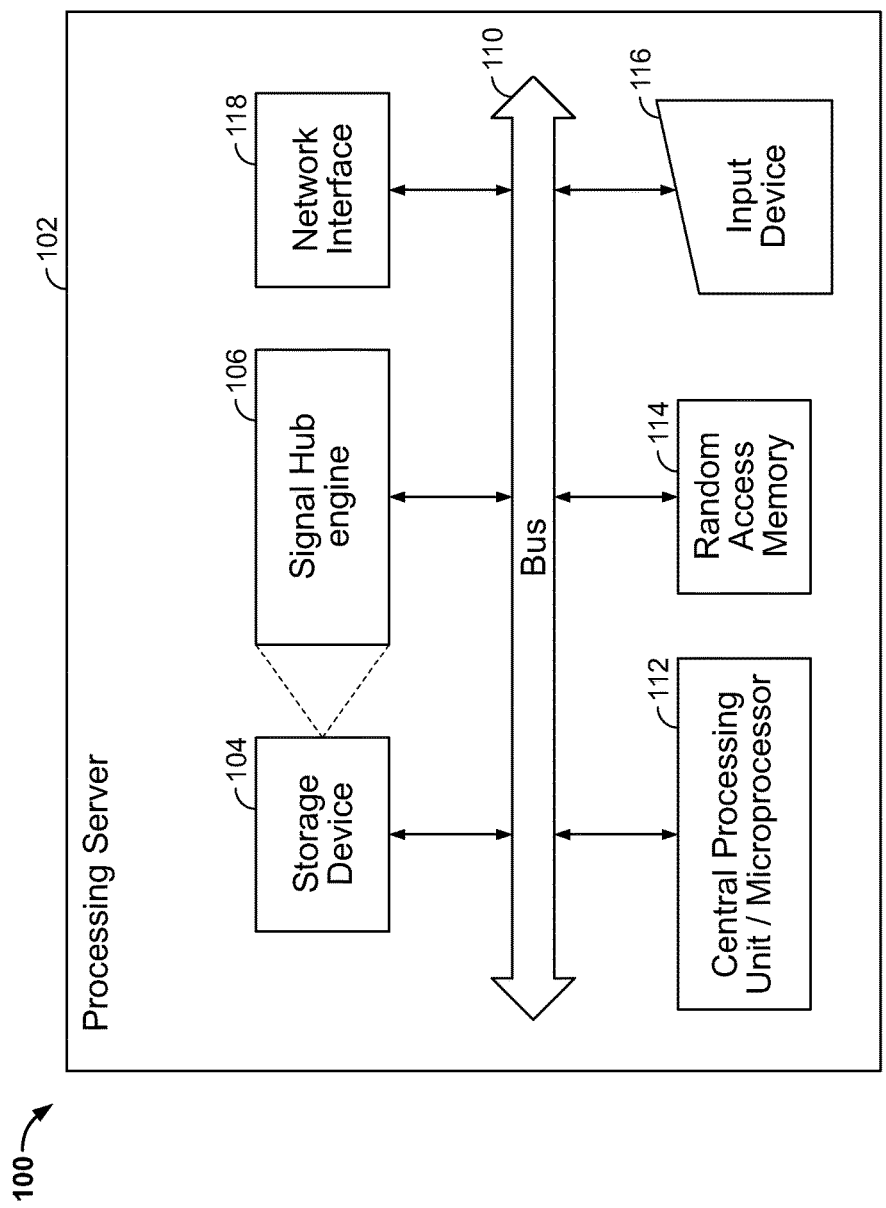
FIG. 33 is a diagram showing hardware and software components of the system.

FIG. 33 is a diagram showing hardware and software components of the system 100. The system 100 comprises a processing server 102 which could include a storage device 104, a network interface 108, a communications bus 110, a central processing unit (CPU) (microprocessor) 112, a random access memory (RAM) 114, and one or more input devices 116, such as a keyboard, mouse, etc. The server 102 could also include a display (e.g., liquid crystal display (LCD), cathode ray tube (CRT), etc.). The storage device 104 could comprise any suitable, computer-readable storage medium such as disk, non-volatile memory (e.g., read-only memory (ROM), eraseable programmable ROM (EPROM), electrically-eraseable programmable ROM (EEPROM), flash memory, field-programmable gate array (FPGA), etc.). The server 102 could be a networked computer system, a personal computer, a smart phone, tablet computer etc. It is noted that the server 102 need not be a networked server, and indeed, could be a stand-alone computer system.

The functionality provided by the present disclosure could be provided by a Signal Hub program/engine 106, which could be embodied as computer-readable program code stored on the storage device 104 and executed by the CPU 112 using any suitable, high or low level computing language, such as Python, Java, C, C++, C#, .NET, MATLAB, etc. The network interface 108 could include an Ethernet network interface device, a wireless network interface device, or any other suitable device which permits the server 102 to communicate via the network. The CPU 112 could include any suitable single- or multiple-core microprocessor of any suitable architecture that is capable of implementing and running the signal hub program 106 (e.g., Intel processor). The random access memory 114 could include any suitable, high-speed, random access memory typical of most modern computers, such as dynamic RAM (DRAM), etc.

In certain exemplary embodiments, an interactive reporting tool allows the user to define, modify, and selectively execute a sequence of queries (which also may be referred to as query steps of an overall query) in an interactive manner. Generally speaking, such an interactive reporting tool provides user interface screens including an interactive query code table into which the user can configure a sequence of queries and also including a data table in which the results of a particular query or sequence of queries is displayed. The interactive query code table may be configured to include a plurality of rows, with each row representing a query. In certain exemplary embodiments, the interactive query code table may be configured to include a plurality of cells organized into rows and columns, with each column representing a distinct query parameter (signal) from among a plurality of query parameters (signals), and with each row representing a query involving at least one of the distinct query parameters (signals) by way of a query operator in the column/cell corresponding to each distinct query parameter (signal) involved in the query. Thus, an interactive query code table generally includes n rows representing a sequence of n queries identifiable as queries 1 through n. When the user selects a given row i or a cell in a given row i (where i is between 1 and n, inclusive), then the data table is updated to show the results of the queries 1 through i, such that the user effectively can step through the queries in any order (i.e., sequential or non-sequential, forward or backward) to see the results of each step. Furthermore, if the user changes the query in a given row (e.g., by adding a new query parameter or changing an existing query parameter in a column/cell of the row), then the prior results from the queries associated with rows i through n may be invalidated, and at least the changed query (and typically all of the queries 1 through i) is executed in order to update the data table to include results from the changed query. Embodiments may cache the results of various queries so that unchanged queries need not be re-executed. Embodiments additionally or alternatively may place a temporary lock on a set of queries in the interactive query code table so as to limit the types of changes that can be made to the interactive query code table, e.g., allowing only the addition of new queries while the temporary lock is in place. The lock can be enforced, for example, by prompting the user upon receiving a user input that would change an existing query in the interactive query code table.

Figure 34:
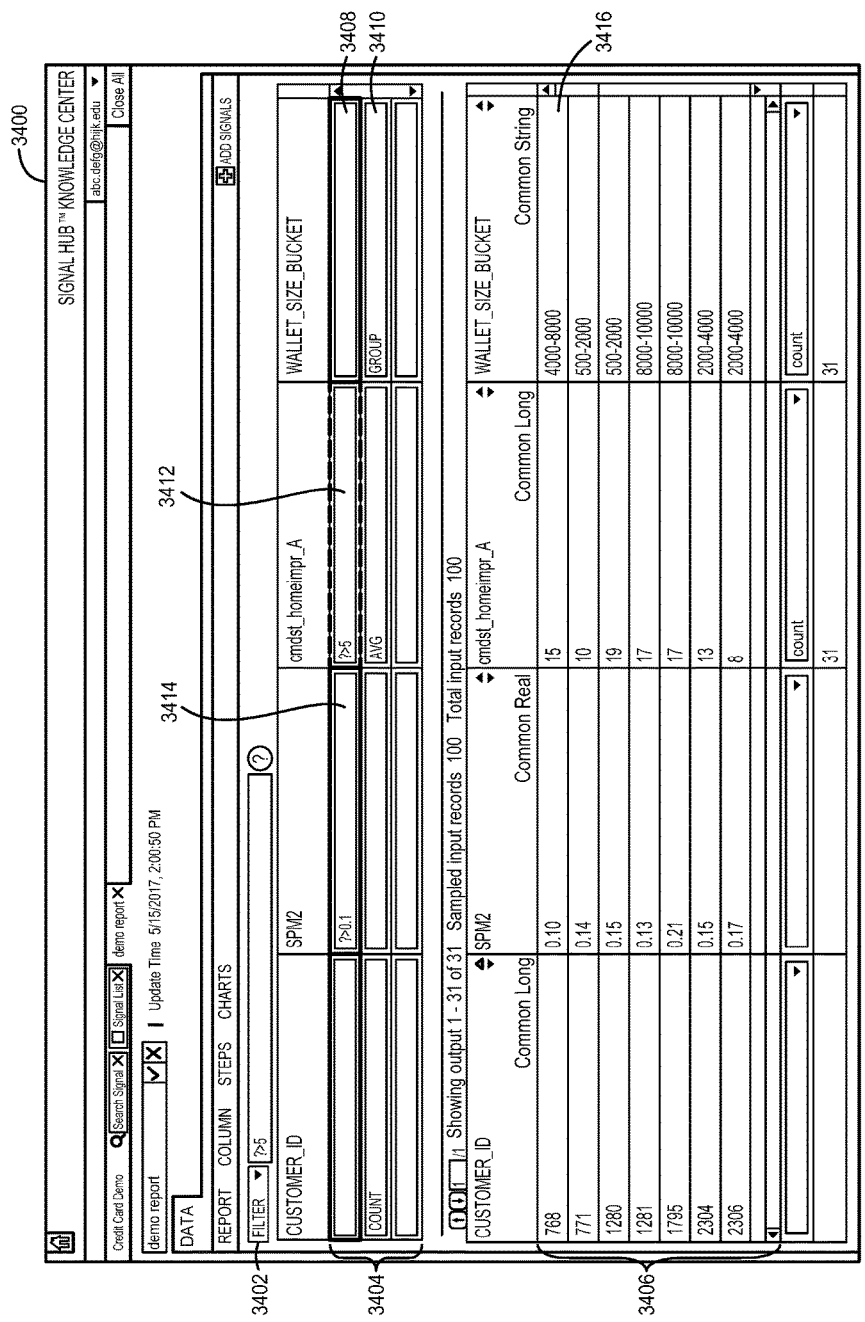
FIG. 34 is a screenshot illustrating a sample interactive reporting user interface screen generated by Signal Hub platform, in accordance with an exemplary embodiment.

FIG. 34 is a screenshot illustrating a sample interactive reporting user interface screen 3400 generated by Signal Hub platform 600, in accordance with an exemplary embodiment. In the screenshot, a user is also able to create step-by-step queries on signals in an interactive query code table 3404 and view the initial results on sample data at real time in a data table 3406. In this example, the interactive query code table 3404 and the resulting data table 3406 are included in the same user interface screen 3400, although it should be noted that the two table could be provided in separate user interface screens in various alternative embodiments.

In the example shown in FIG. 34, the interactive query code table 3404 includes two queries 3408 and 3410. Query 3408 effectively identifies all customers with signal value of "SPM2" greater than 0.1 and with signal value of "cmdist_homeipr_A" greater than 5. Query 3410 effectively aggregates those customers by their "WALLET_SIZE_BUCKET," gets the average for the "cmdist_homeipr_A" signal, and counts how many "CUSTOMER ID" are there in each bucket. The user has selected cell 3412 in query 3408, as indicated by the highlighting of the cell 3412 and the representation of the query parameter of the selected cell 3412 in command line 3402. The data table 3406 shows the results from query 3408 rather than the results of query 3410.

Figure 35:
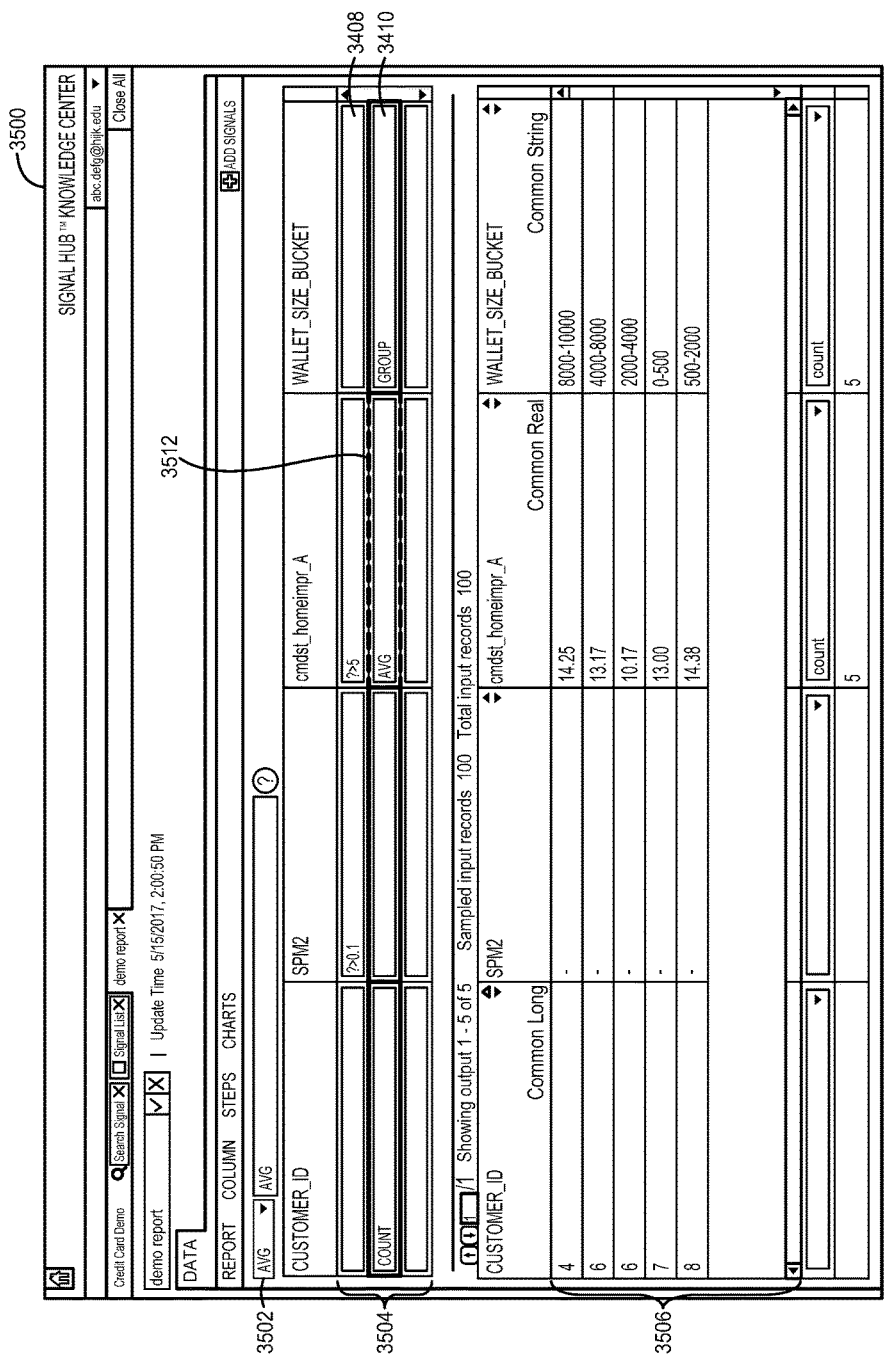
FIG. 35 is a screenshot illustrating a sample interactive reporting user interface screen generated by Signal Hub platform, in accordance with an exemplary embodiment.

FIG. 35 is a screenshot illustrating a sample interactive reporting user interface screen 3500 generated by Signal Hub platform 600, in accordance with an exemplary embodiment. Here, the user has selected cell 3512 in query 3410, as indicated by the highlighting of the cell 3512 and the representation of the query parameter of the selected cell 3512 in command line 3502. The data table 3506 shows the results from query 3410 rather than the results of query 3408.

Figure 36:
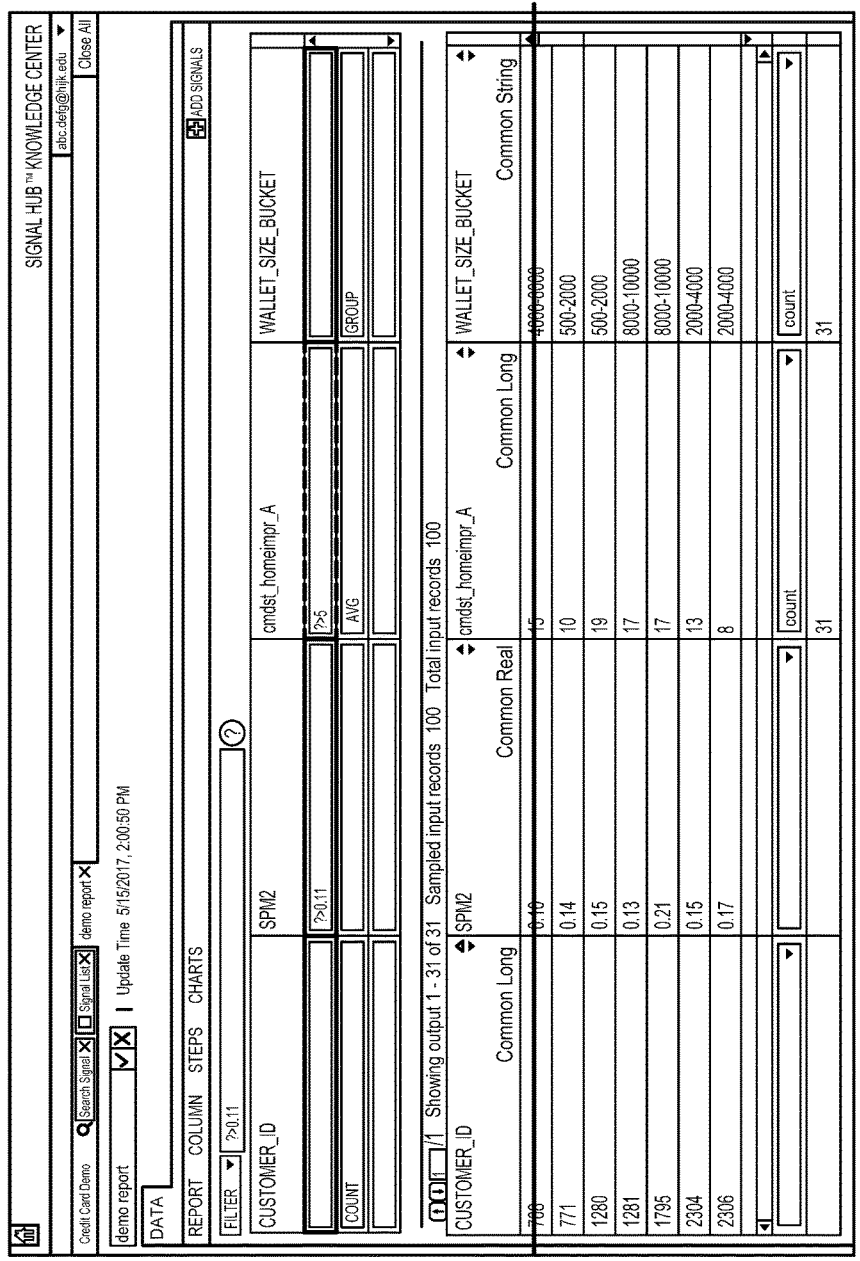
FIG. 36 shows a representation of the screenshot of FIG. 34 showing an example of the results of a changed signal value.

With reference again to FIG. 34, assume that the user has selected cell 3414 in query 3408 and changed the value from 0.1 to 0.11. In this case, row 3416 would be omitted from data table 3406 because the signal value of SPM2 would now be less than the filter value of 0.11, i.e., the customer with Customer ID 768 now would not meet the filtering criteria of modified query 3408. FIG. 36 shows a representation of the screenshot of FIG. 34 with the SPM2 signal value changed to 0.11 in query 3408 and row 3416 struck from data table 3406.

Figure 37:
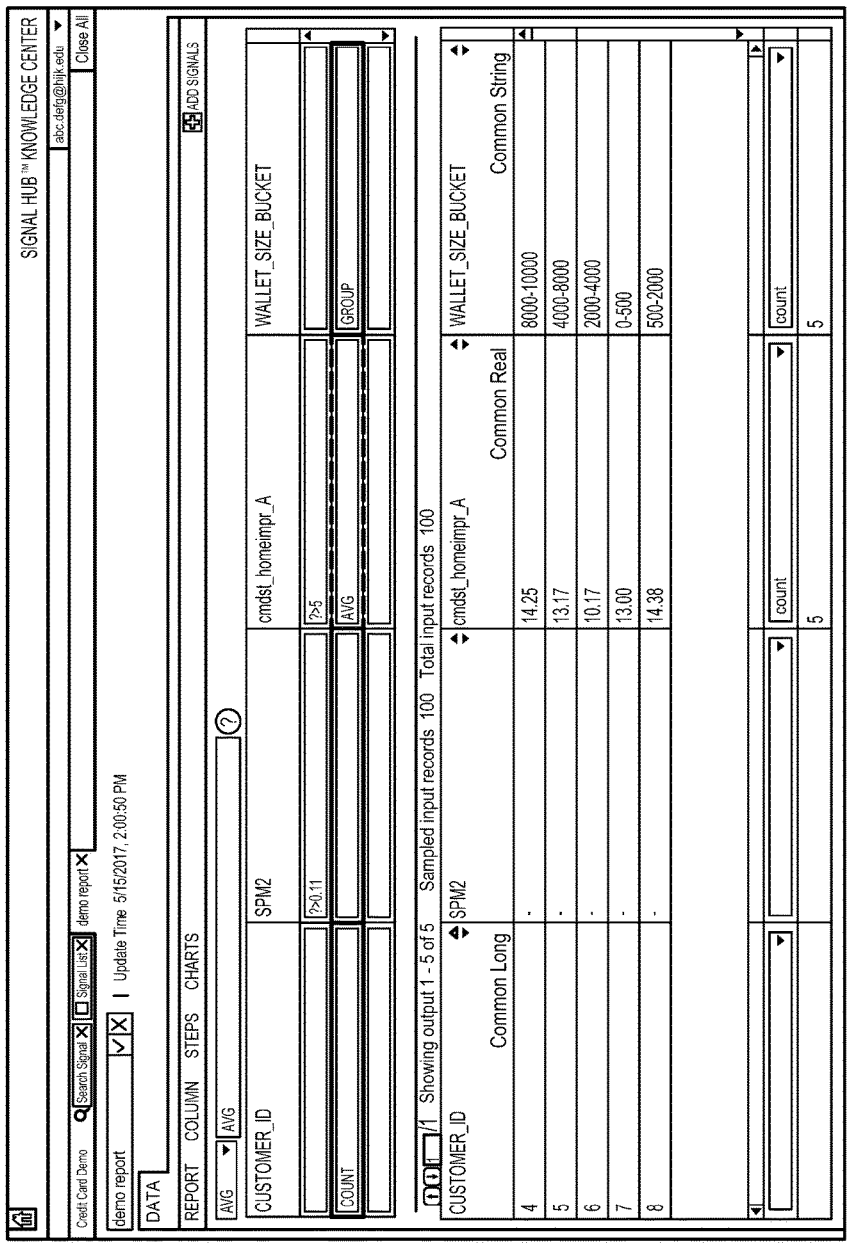
FIG. 37 shows a representation of the screenshot of FIG. 35 based on the changes reflected in FIG. 36.

If the user then selected cell 3512 in query 3410 as in FIG. 35, the query 3410 would be executed based on the results obtained from the modified query 3408 and hence would omit the data associated with data table row 3416. FIG. 37 shows a representation of the screenshot of FIG. 35 based on the changes reflected in FIG. 36, i.e., the count of customers having a WALLET_SIZE_BUCKET of 4000-8000 has decreased by one relative to the data table shown in FIG. 35 (the value of the average for the "cmdist_homeipr_A" signal likely would change, too, although for convenience the value shown in FIG. 37 is the same as the value shown in FIG. 35).

Thus, as discussed above, the user can switch between different query steps by moving the mouse cursor and view the result for corresponding step(s). For example, in FIG. 34 the user made a selection in query 3408 and was able to view the results of that query without the further processing of query 3410, which was already configured in the interactive query code table. The user then could make a selection in query 3410 to view the results of queries 3408 and 3410, discussed above with reference to FIG. 35. The user could then make a change in query 3408 and view the results of that modified query, as discussed above with reference to FIG. 36. The user could then make a selection in query 3410 to review the results of modified query 3408 and query 3410.

Figure 38:
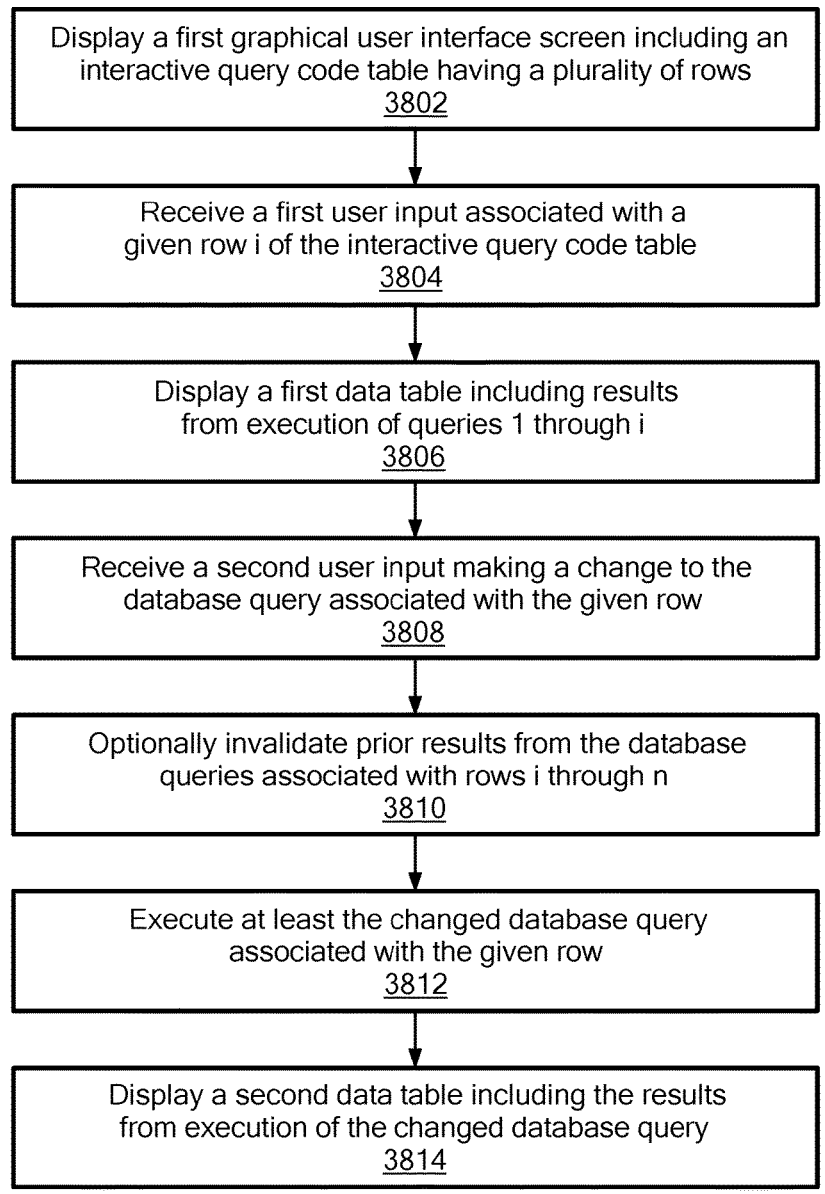
FIG. 38 is a flowchart of a computer-implemented method for interactive database reporting, in accordance with one exemplary embodiment.

FIG. 38 is a flowchart of a computer-implemented method for interactive database reporting, in accordance with one exemplary embodiment. In block 3802, a first graphical user interface screen is displayed on a display screen of a computer of a user. The first graphical user interface screen includes a plurality of rows, each row representing a database query, the interactive query code table including n rows identifiable as rows 1 through n and representing a sequence of n database queries identifiable as database queries 1 through n, wherein n is greater than one. In block 3804, a first user input associated with a given row i of the interactive query code table is received. In block 3806, a first data table including results from execution of queries 1 through i is displayed, such that the user is able to select any given database query in the interactive query code table to view results through the given database query. In block 3808, a second user input making a change to the database query associated with the given row is received. In block 3810, prior results from the database queries associated with rows i through n are optionally invalidated. In block 3812, at least the changed database query associated with the given row is executed, although any number of queries associated with rows 1 through i may be executed. In block 3814, a second data table including the results from execution of the changed database query is displayed.

In order to allow for such interactive database reporting in a dynamic system in which query parameters (signals) may change from time to time, the Signal Hub platform 600 may store temporary copies of query parameters (signals) that are used in the queries so that the results can be replicated and/or manipulated using a baseline of query parameters (signals). Also, results from one or more of the queries may be cached so that, for example, when the user steps from one row/query to another row/query, the resulting data table can be produced quickly from cached data. It should be noted that the interactive database reporting tool can be implemented using virtually any database or query processing engine and therefore is not limited to any particular database or query processing engine.

In any database query system, including embodiments described above, queries are often executed against big data sets, and each "pass" made over the data set to execute such queries can take many hours to complete depending on the data set size and the number of types of queries. It is helpful, then, to minimize the number of "passes" made over the data set when executing the queries in order to optimize query execution.

Therefore, in certain exemplary embodiments, a sequence of queries is divided into stages, where each stage involves one pass over the data, such that the sequence of queries can be executed using the minimum number of passes over the data. Specifically, in certain exemplary embodiments, the sequence of queries is processed into a functional dependency graph that represents the relationships between query parameters (signals) and query operations, and the functional dependency graph is then processed to divide the queries into a number of successive stages such that each stage includes queries that can be executed based on data that exists prior to execution of that stage. A sequence of queries may, and often does, require that one or more intermediate values or datasets be generated using an aggregate function (i.e., a function that needs to pass over the entire dataset in order to compute a value) for use or consumption by another query. A query that produces a given intermediate result must be executed at a stage that is prior to execution any query that consumes the intermediate data set. It is possible for multiple intermediate results to be created at a given stage.

By way of example, the following set of expressions involves generation and consumption of an intermediate value when converted into database queries:

```
sum_discount   = sum(discount);
avg_amt        = avg(amt);
ct_large_amt   = count( ) when amt > avg_amt;
```

In this example, the value "avg_amt" (average amount) needs to be computed before a count can be made of the number of records having an "amt" (amount) that is greater than the average amount "avg_amt". To express this in SQL, the developer would have to plan this in two stages.

As the number of expression increases, it becomes more difficult for the developer to form the necessary nested queries. For example, the following set of expressions involves generation and consumption of two intermediate values when converted into database queries:

```
sum_discount              = sum(discount);
avg_amt                   = avg(amt);
ct_large_amt              = count( ) when amt > avg_amt;
ct_prod_with_large_amt    = count_uniq(prod_id) when
ct_large_amt >= 10
```

In this example, ct_large_amt is an aggregate function that cannot be executed until avg_amt is determined, and ct_prod_with_large_amt is an aggregate function that cannot be executed until ct_large_amt is determined. To express this in SQL, the developer would have to plan this in three stages.

Figure 39:
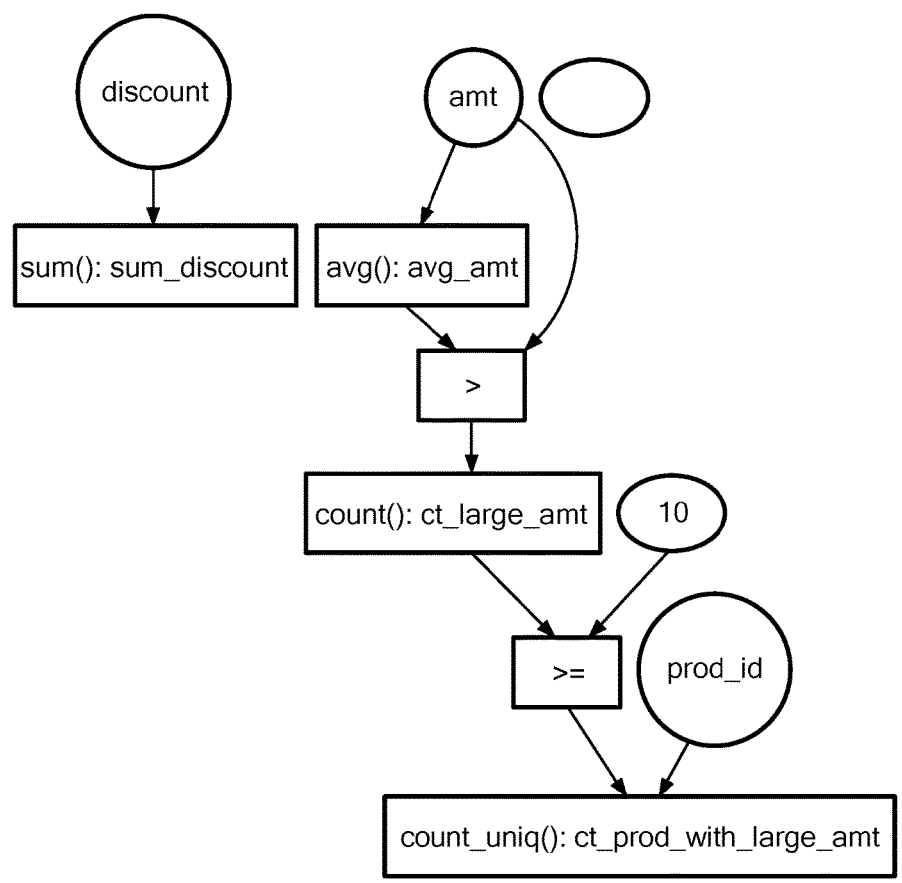
FIG. 39 is a schematic diagram showing a functional dependency graph for the above example, in accordance with one exemplary embodiment.

Therefore, in certain exemplary embodiments, a functional dependency graph is first produced from the set of expressions. FIG. 39 is a schematic diagram showing a functional dependency graph for the above example, in accordance with one exemplary embodiment.

The functional dependency graph is then traversed using a specially-modified breadth-first search traversal to assign each expression to an execution stage. Breadth-first search traversal of graphs/trees is well-known for tracking each node in the graph/tree that is reached and outputting a list of nodes in breadth-first order, i.e., outputting all nodes at a given level of the graph/tree before outputting any nodes at the next level down in the graph/tree. In exemplary embodiments, when evaluating nodes at a given level of the graph/tree associated with a given execution stage, the specially-modified breadth-first search traversal will not associate a particular lower-level node with the given execution stage if that node is associated with an aggregate function. Instead, the lower-level node associated with an aggregate function is placed in a later execution stage in accordance with the specially-modified breadth-first search traversal. The following is an algorithmic description for assigning each expression to an execution stage based on the functional dependency graph, in accordance with one exemplary embodiment:

1. Make each input column an input node in the graph
2. For each given expression, transform the expression into the functional dependency graph and connect it to the inputs or other expressions.
3. Set PhaseID to 0
4. Perform the specially-modified breadth-first search (BFS) graph traversal in accordance with Steps 5 through 21.
5. Breadth-First-Search—Aggregates Expressions (Graph, root):
6. 
7. create empty set S
8. create empty queue Q
9. 
10. add root to S
11. Q.enqueue(root)
12. 
13. while Q is not empty:
14. current=Q.dequeue( )
15. if current is the goal:
16. return current
17. for each node n that is adjacent to current:
18. if n is not in S AND n is not Aggregate function:
19. add n to S
20. n.parent=current
21. Q.enqueue(n)
22. Add emitted nodes to the current phase.

23. Remove nodes emitted in Step 22 from the graph, increase phaseID by 1, and repeat Step 4 until no more nodes remain in the graph.

Steps 5 through 21 listed above are based on a standard breadth-first search traversal methodology published in WIKIPEDIA but with the addition of the conditional "AND n is not Aggregate function" in order to omit lower-level aggregate functions from being included in a given execution stage. The goal of the standard BFS traversal methodology is to queue/output the nodes from the graph in breadth-first order, i.e., the root, followed by all nodes one layer down from the root, followed by all nodes two layers down from the root, and so on. Literally applying this specially-modified BFS traversal methodology to the graph shown in FIG. 39 could result in more than three stages with some stages requiring no execution (e.g., the root node and certain operator nodes require no execution in and of themselves). In essence, then, the specially-modified BFS traversal methodology would be applied to the nodes associated with executable expressions, in which case three execution stages would be generated, as follows:

| Stage | |
|---|---|
| 1 | sum_discount = sum(discount);<br>avg_amt = avg(amt); |
| 2 | ct_large_amt = count( ) when amt > avg_amt; |
| 3 | ct_prod_with_large_amt = count_uniq(prod_id)<br>when ct_large_amt >= 10 |

Thus, this particular specially-modified BFS traversal methodology is presented for example only, and implementations may use a variation of this methodology or other, suitably-modified, BFS traversal methodology.

Once the expressions are assigned to different stages, database queries are automatically generated in accordance with known methods so that the expressions can be executed in accordance with the stages. The following is example SQL code for executing the staged expressions from the example above:

Select count(prod_id) as ct_prod_with_large_amt
From T1,
(Select Count(amt > avg_amt) as ct_large_amt , sum_discount
    From T1 Join (Select Day, avg(amt) as avg_amt, sum(discount)
    as sum_discount,
    From Input
        Group by Day) T_AVG on T_AVG.Day = T1.Day
Group by Day) T_CNT on T_CNT.Day = T1.Day
Where ct_large_amt > 10
Group By Day Here, each phase is a single flat query with the same grouping key as the original grouping. The result of each phase is joined with the inputs using the grouping key, and made available for the next phase. Any relational engine can now execute these queries in a pipeline using the relational schema illustrated by the SQL syntax above. It should be noted that this algorithm is not only applicable to Database that support SQL, but for any relational engine or data flow engine such as Apache Spark and Apache Tez.

While the example above uses simple aggregate functions such as sum, count, count_unique, and simple scalar functions such as ">=" and ">", this schema can be easily expanded to any aggregate and scalar functions, where aggregate functions are functions that need to pass over the entire data in order to compute a value and scalar functions can be computed on each record. Using this designation, functions can be categorized appropriately and the schema can work on any set of expressions. Thus, starting with a simple non-nested set of expressions that have inter-dependency, a relational nested representation of the computation is produced.

Figure 40:
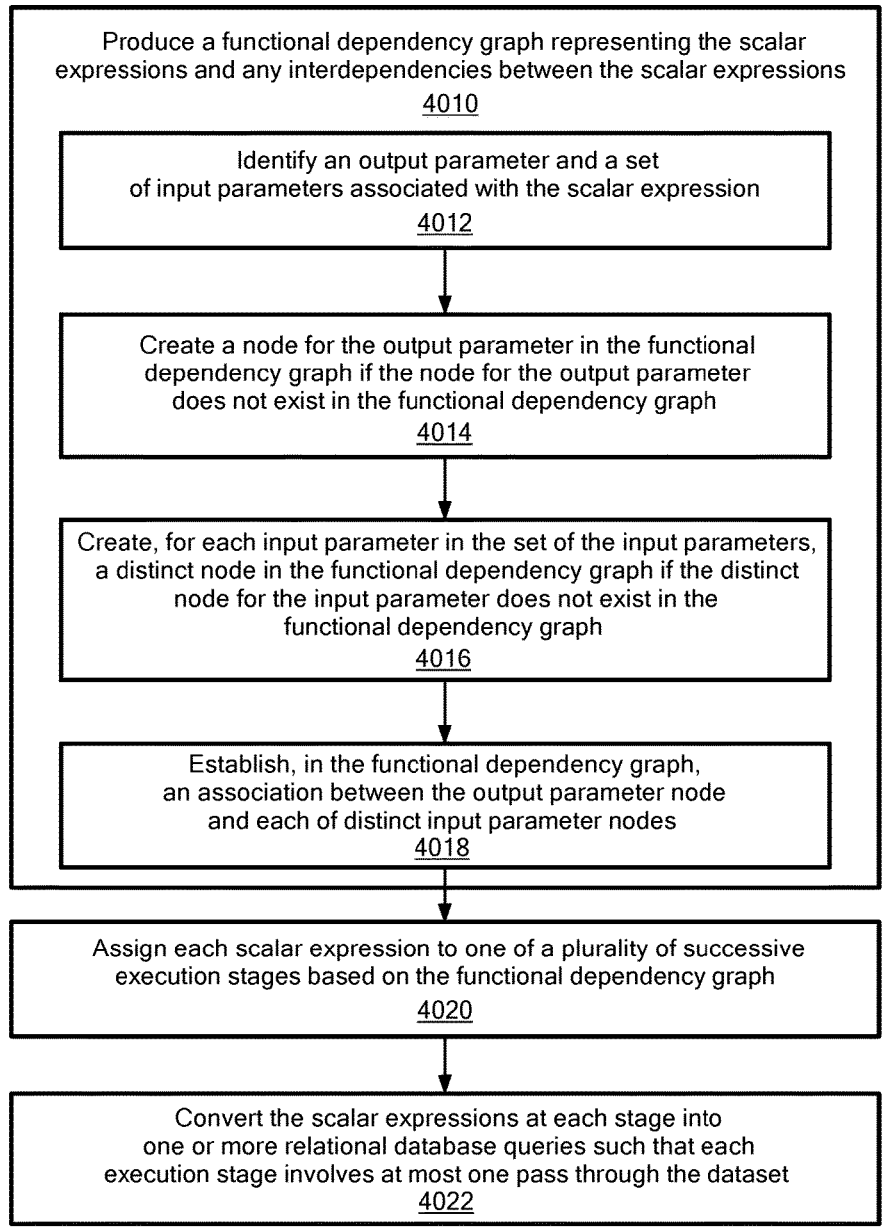
FIG. 40 is a flowchart for query execution optimization in accordance with one exemplary embodiment.

FIG. 40 is a flowchart for query execution optimization in accordance with one exemplary embodiment. In block 4010, a functional dependency graph representing the scalar expressions and any interdependencies between the scalar expressions is produced. In block 4020, each scalar expression is assigned to one of a plurality of successive execution stages based on the functional dependency graph. In block 4030, the scalar expressions at each stage are converted into one or more relational database queries such that each execution stage involves at most one pass through the dataset.

In certain exemplary embodiments, the functional dependency graph is produced by processing each expression as follows. An output parameter and a set of input parameters associated with the scalar expression are identified, as in block 4012. A node for the output parameter is created in the functional dependency graph if the node for the output parameter does not exist in the functional dependency graph, as in block 4014. For for each input parameter in the set of input parameters, a distinct node is created in the functional dependency graph if the distinct node for the input parameter does not exist in the functional dependency graph, as in block 4016. An association is established in the functional dependency graph between the output parameter node and each of the distinct input parameter nodes, as in block 4018.

In certain specific exemplary embodiments, the Signal Hub server 600 may be configured to divide a sequence of queries into stages such that the sequence of queries can be executed using the minimum number of passes over the data set. For example, the Workbench discussed herein may provide user interface screens through which the user can enter a sequence of expressions that are then divided into stages and converted into database queries (e.g., SQL queries), as discussed above. Additionally or alternatively, the Signal Hub server 600 may apply query execution optimization as discussed herein to any set of queries, such as, for example, queries executed as part of the interactive reporting tool discussed above.

As discussed above, e.g., with reference to FIGS. 29B-29J, in a collaborative data processing environment such as the Signal Hub system 600, datasets are updated by two main activities, namely production and development. Production activity is handled by workflows that automate the processing of the data, ingest the new incoming data, and update the datasets. Development activity includes developers making code changes, creating new datasets, and update existing datasets. In these environments, datasets are often derived from other datasets, which can be described by a dependency graph like the example shown in FIG. 41, where datasets V3 and V4 are derived from dataset V2, which in turn is derived from dataset V1. Furthermore, development and production generally share datasets. Consequently, a code and data versioning may be used to allow developers to work on code and data without interfering with one another or with production code and data, which should not be affected by development activities.

For example, with reference again to FIG. 41, Developer A might want to see only the V2 production dataset that has been through quality assurance (QA) and deployed to the system, while Developer B might want to change the V2 production dataset to test some code changes and continue developing the V4 dataset on changes applied to the V2 dataset data (although without changing the V2 production dataset itself).

In typical coding environments, a source control system is used to allow developers to make code changes without affecting each other's work and without affecting the production code, until changes are ready to be committed for production. Source control systems allow each developer to work on a separate version of the code, but when development is done and the changes can be shared with others, the code can be committed into the shared version. However, in data processing environments, while source control systems can be used to allow for source control, versioning, and collaboration on the code, large datasets cannot be versioned efficiently via the source control system. In addition, because of the dependency graph shown in FIG. 41, it is challenging to maintain which version of code is associated with each dataset.

To resolve these challenges, certain exemplary embodiments provide code and data versioning based on the concept of "views" and "workflows," where a view is a defined by a relational processing logic (e.g., a query) that consumes data from other views or data sources and persists the processed data into files (e.g., on the append-only file system), and a workflow is a directed graph of views where the nodes are views and the edges between views represent that one view reads from another view (e.g., an edge between a view v1 to a later view v2 describes that v2 reads from v1). A workflow engine can traverse a workflow graph and execute each view in topographical order.

The code and data versioning method can be summarized as follows:

1. The source code of the views is managed by a source control system.
2. Each developer has a separate workspace that contains a snapshot of the code from the source control system.
3. Production workflows will share the same workspace.
4. When a developer makes a code change, the code change will have to be committed before other workspaces can be updated (via a separate action) to reflect the code change.
5. Before a developer can make a code change, a lock is placed on the view, allowing only a single developer to work on a single dataset.
6. From the moment a developer makes a code change until the time the code changes are committed, the developer is associated with a Task that describes the activity for which the code changes are made.

These steps involve standard source control operations that are supported in one way or another by various source control system (e.g., SVN, Git), such as Start Task, Finish Task, and Update Workspace. When a user starts a new task, any change to the code will invoke a lock on the code file with the changes and prevent other users from changing this code file. Once a user finishes a task, all code is committed into the shared version and all locks are released. The Update Workspace operation updates the developer workspace files from the shared version.

In order to support code and data versioning using shared datasets, the following additional steps are involved:

7. Each View has a write operation and read operation. These operations must support adding a version while producing the output data. If a new version name is given to the write operation, the entire data will be output to a new sub-directory with this version name. If the same version name is given, then the data in that version will be overwritten by the write operation.
8. Production workflows will all use a "no version" value for all read\write operations.
9. When a developer runs a definition from a workspace, if the definition includes changes, the version will receive the Task name that is currently associated with the changes. If the definition is unchanged and represents the latest version of the code in the source control system, then the data version will be referred to as "latest".
10. The system will maintain, for each developer workspace, a version map that stores which views have been executed for the developer and what was the version value for that view. Any read operation on the view while executing subsequent views from the developer workspace will be instrumented by the version value. In addition, views that are not executed from the workspace will be read without a version and therefore will be read from the production data. When finishing a task and committing the code, the map can be cleared.

In order to accomplish such code and data versioning, the Start Task, Finish Task, and Update Workspace operations are updated as follows. Once a user starts a new task, any change to the code will invoke a lock on the file with the changes and prevent other users from changing this code file, and locked changed code will also change the version as described in Step 7 while a task is active. Once a user finishes a task, all code is committed into the shared version and all locks are released, and then the version for changed definitions will switch back to "latest." The Update Workspace operation will update the developer workspace files from the shared version.

By way of example, imagine that there is a view V1 containing the production code and data. A production process in view V2 includes code that contains an instruction to read from view V1. When the production process in view V2 is executed with no version specified, the system automatically reads from the "no version" production data in view V1, as shown schematically in FIG. 42.

Imagine instead that view V2 is associated with a developer who has made code changes in view V2 but no changes to code or data associated with view V1. The code in view V2 again contains an instruction to read from view V1. A temporary data set is created in view V1 for use by the developer in view V2 (i.e., so that any production changes that occur do not affect the developer's work, and any changes made by the developer do not affect the production data). When the development process in view V2 is executed with no version specified, the system automatically reads from the temporary dataset rather than from the production dataset, even though the code was not modified to read from the temporary dataset (i.e., the system automatically correlates the temporary dataset with the development view). When the developer checks in the code changes from view V2, the temporary dataset in view V1 is renamed to be the "latest," as shown schematically in FIG. 43. This "latest" dataset is kept separate from the production data because, at the time of check-in, the latest dataset has not yet replaced the production data. At some point, the latest version may be re-designated as the production version, for example, by a project manager.

Imagine instead that view V2 is associated with a developer assigned to "Task 1" who has made code changes in view V2 and also in view V1 (e.g., to add a new column to, or change a column definition in, a table in view V1). In this case, a lock is placed on the code file associated with view V1 in to prevent other developers from making conflicting changes, and a temporary dataset is created in view V1 for use by Task 1. The temporary dataset is named Task 1 so that it is correlated with the Task 1 development view, i.e., view V2. When the development process in view V2 is executed with no version specified, the system automatically reads from the Task 1 temporary dataset rather than from the production dataset, as shown schematically in FIG. 44.

One major advantage of this code and data versioning methodology is that developers do not have to modify code to read from a specific dataset. Rather, the system automatically determines the dataset to use for a given development task from among a production dataset, a latest dataset, or a temporary dataset associated with the development task.

In certain exemplary embodiments, code and data versioning, as well as other data storage operations, utilize an append-only file system such as the Hadoop distributed file system (HDFS). In order to support a relational database, insert, update and delete record operations must be supported over a table of records. Typically, this requires the database to update a file stored within the underlying file system on which the database is persisted. However, append-only file systems, such as HDFS, generally do not provide update operations, i.e., one cannot update an existing file in the file system. For append-only file systems, the only change operations allowed are create file, append to file, delete file, create directory, and delete directory. For this reason, databases (e.g., Apache Hive) that are implemented over the append-only file system generally do not support update operations.

Another problem that typically occurs is the need to perform a recovery or a rollback when an error is found after a change to a table. Database systems typically support transactions to abort changes performed to tables (e.g., akin to an "undo" function). However, such transactions generally have a short lifespan (e.g., must be performed soon after the unwanted change is made) and are not adequate for large changes on multiple tables. Such transactions are generally also built on file system update support that allows the database system to update "dirty" records and clear them when the records are committed, which is generally not possible with append-only file systems.

Therefore, certain exemplary embodiments provide support for update and delete operations in an append-only file system. Specifically, a folder is created for each view, and a new subfolder is created for each update to the view. Each subfolder is associated with a timestamp indicating the time the update was made to the view. The following is an example of a folder structure for a view named "View 1":

```
Directory "View1"
    Directory "timestamp1"
        File "datafile1"
        File "datafile2"
    Directory "timestamp2"
        File "datafile4"
        File "datafile7"
    Directory "timestamp3"
        File "datafile6"
        File "datafile9"
```

For every execution of the view, a new timestamp is generated, and new data is inserted into files in the new directory. This structure on its own supports appending new records as they go to new files but still does not support update or delete operations.

Therefore, in certain exemplary embodiments, update and delete operations always work on a primary unique key that can identify the unique logical record being changed. For example, a table of customers may have a unique customer identifier (customerID) representing the customer entity. When an update operation needs to change a certain field in a record, it provides the key for the operation, the field to change, and the new value for the field. The following is an example of such an update operation:

Update Customer where customerID=1, Set Active=False

This operation changes the value of the field named 'Active' to "False" for the record that belongs to the Customer with ID 1.

Due to the lack of update operations in the append-only file system, exemplary embodiments use the append operation for saving the update and add a new record representing the new record. For example, assume that the value of the field named 'Active' is initially set to "True" at Time 1 and is later changed to "False" at Time 3 for the record that belongs to the Customer with ID 1. A data file containing the record with Active=True would be added to a subfolder associated with the timestamp for Time 1 and a separate data file containing the record with Active=False would be added to a subfolder associated with the timestamp for Time 3. The following is an example of the folder structure containing the updated record:

```
Directory "View1"
    Directory "timestamp1"
        File "datafile1"
        File "datafile2" (Customer ID=1, active=True : first appearance
            of this record)
    Directory "timestamp2"
        File "datafile4"
        File "datafile7"
    Directory "timestamp3"
        File "datafile6"
        File "datafile9" (Customer ID=1, active=False : second
            appearance of this record)
```

A read operation that reads only the last timestamp will only have the updated records of the last update, which represents only partial data. On the other hand, reading all of the files from all timestamps will contain duplicate records with inconsistent data for the same logical key. In order to solve this, exemplary embodiments read all data from all timestamps and then de-duplicate the records by taking the "latest" record associated with each logical key. This operation can be done efficiently if the data is partitioned by logical key, and the de-duplication can be done in memory with only slight overhead over normal read operations.

In order to support a delete operation, a 'delete record' is appended into the data in a manner similar to the update operation, and the read operation method is modified. A delete record is a record with the same key as the record to be deleted but with a special field called 'delete' that is set to true. The read operation now reads all data from all timestamps, de-duplicates the records by taking the "latest" record associated with each logical key, and then filters the resulting records based on the 'delete' field to keep or utilize only records with 'delete'=false. The following is an example of the folder structure containing the deleted record:

```
Directory "View1"
    Directory "timestamp1"
        File "datafile1"
        File "datafile2" (Customer ID=1, active=True : first appearance
            of this record)
    Directory "timestamp2"
```

-continued

```
    File "datafile4"
    File "datafile7"
Directory "timestamp3"
    File "datafile6"
    File "datafile9" (Customer ID=1, active=False : second
      appearance of this record)
Directory "timestamp4"
    File "datafile10"
    File "datafile11" (Customer ID=1, delete=True : third
      appearance of this record)
```

It should be noted that a periodic "compression" can be run over the folder in order to eliminate old updates and deleted records by a new snapshot that contains all logical keys in the same single timestamp directory. One method to achieve this is to read and process the entire table as discussed above, write the resulting records back into a new timestamp directory, and delete all previous directories. The following is an example of the folder structure following compression:

```
Directory "View1"
    Directory "timestamp5"
        File "datafile12"
        File "datafile13" (excludes record with Customer ID=1)
```

Figure 41:
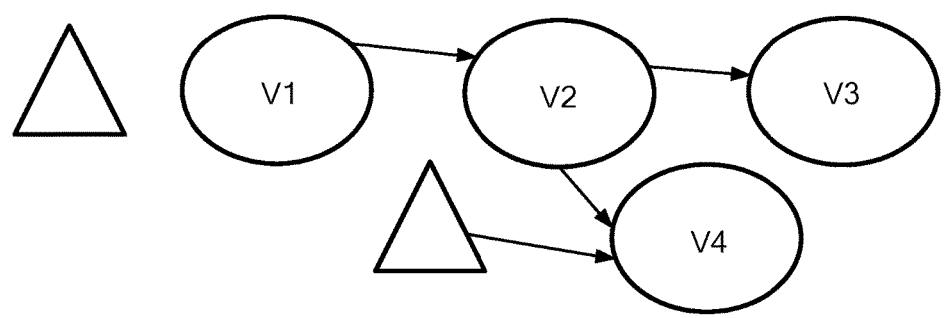
FIG. 41 is a schematic diagram showing a dependency graph representing how datasets can be derived from other datasets.
Figure 42:
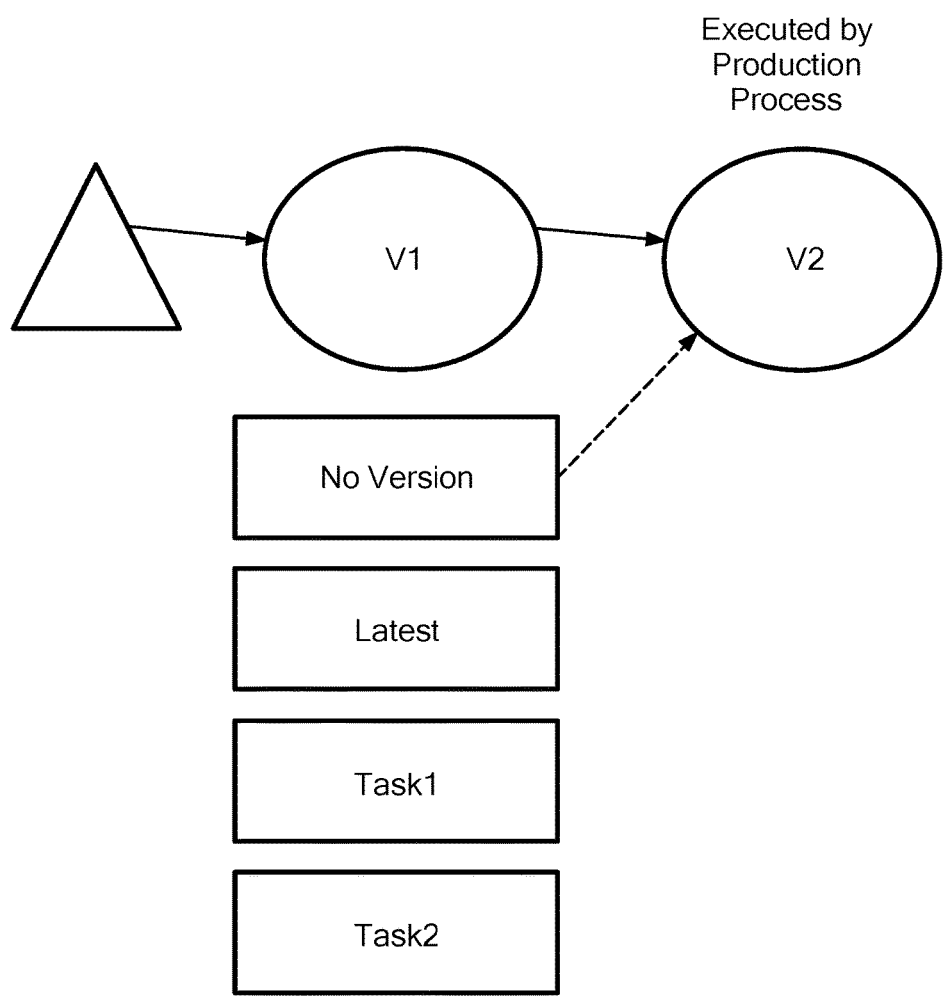
FIG. 42 is a schematic diagram showing how a production process in one view is automatically read from "no version" production dataset, in accordance with one exemplary embodiment.
Figure 43:
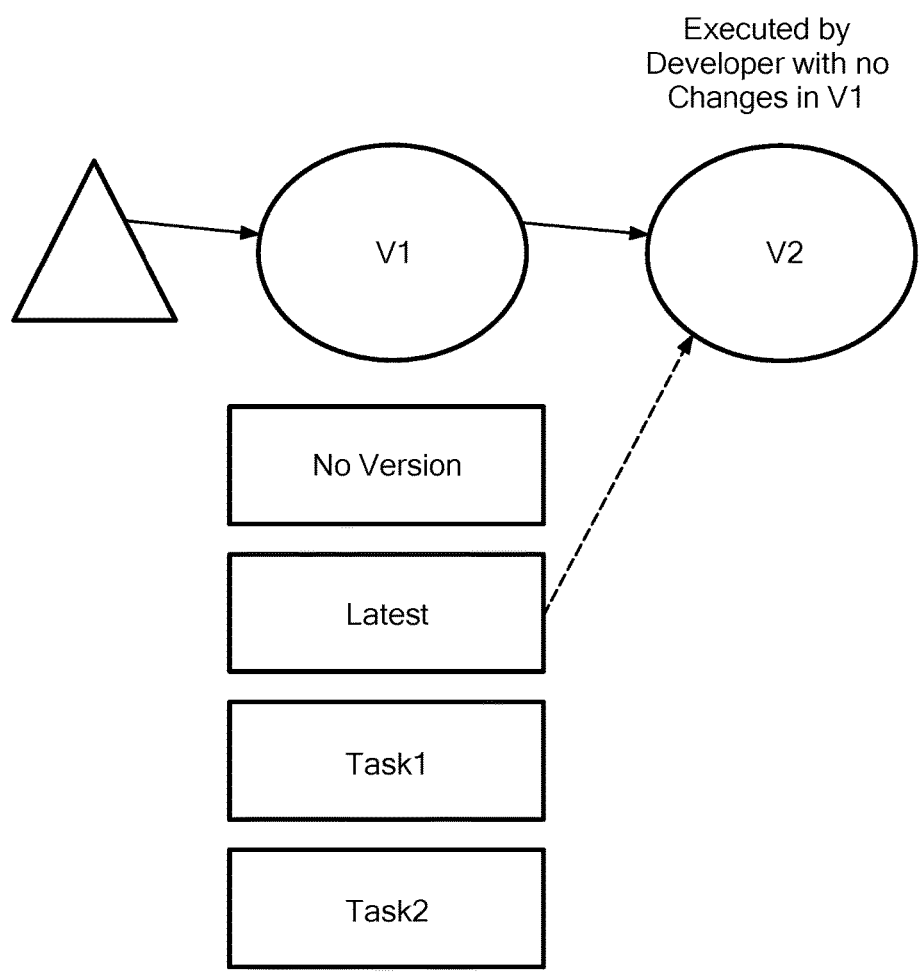
FIG. 43 is a schematic diagram showing how a development process in one view is automatically read from a "latest" dataset, in accordance with one exemplary embodiment.
Figure 44:
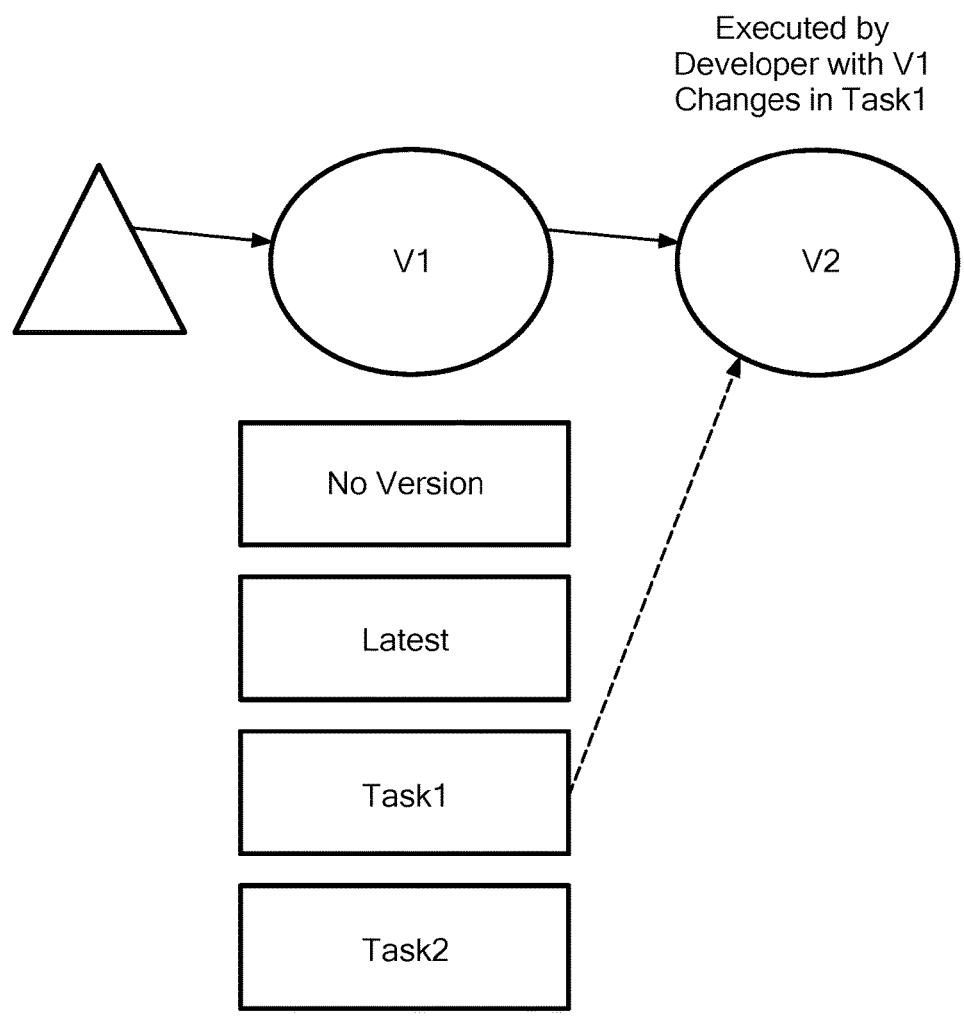
FIG. 44 is a schematic diagram showing how a development process in a task view is automatically read from a corresponding temporary dataset associated with the task, in accordance with one exemplary embodiment.
Figure 45:
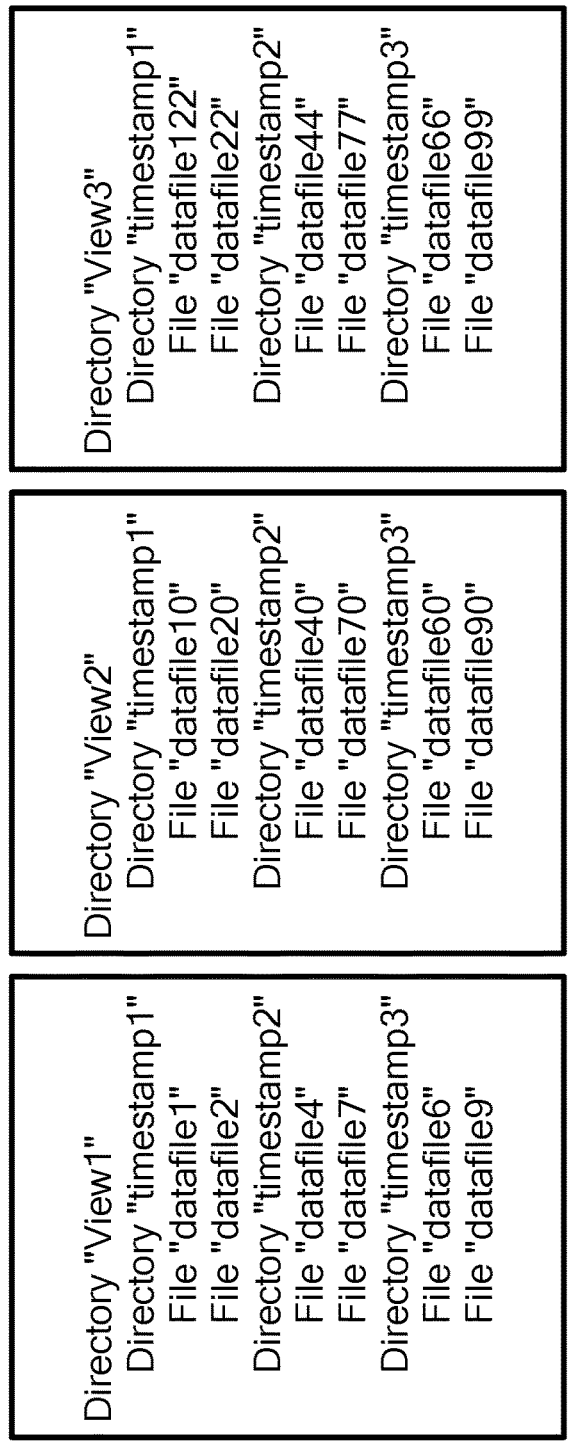
FIG. 45 is a schematic diagram showing an example of file updates using an append-only file system, in accordance with one exemplary embodiment.

From time to time, it might be necessary or desirable to roll back a workflow to an earlier view. Consider a workflow graph in which view V2 reads from view V1 and view V3 reads from view V2, for example, as depicted in FIG. 41. When a new input is processed through the workflow, each of the views V1, V2, V3 might have updates that it persists. In order to roll back the changes, any changes that each of these views persisted in a consistent way must be undone. In order to accomplish this, the workflow engine determines the 'timestamp' that each of these views will use to persist the changes. Since each delta is associated with a specific unique timestamp that is common to all the views that are in the workflow, for example, as shown in FIG. 45, a rollback operation is now a simple method of deleting the folders of all the views created after the designated timestamp. Since each delta is only appending data and does not update any of the other data, the only changes are reverted by the deletion of these folders, and any subsequent read will read the previous version. It should be noted that rollback information may be lost when a compression operation is performed.

It should be noted that these described methods for updating and deleting versions in an append-only file system can be implemented in any data flow engine or database query processor that implements read\write relational data and is using an append-only file system.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A computer-implemented method for interactive database query reporting, the method comprising:

causing display, by a server, on a display screen of a computer of a user, of a first graphical user interface screen including an interactive query code table having a plurality of rows, teach row representing a database query, the interactive query code table including n rows identifiable as rows 1 through n and representing a sequence of n database queries identifiable as database queries 1 through n, wherein n is greater than one;

receiving, by the server, a first user input associated with a given row i of the interactive query code table; and displaying, by the server, a first data table including results from execution of queries 1 through i, such that the server enables the user to select any given database query in the interactive query code table to view results through the given database query.

P2. The method of claim P1, further comprising:

receiving, by the server, a second user input making a change to the database query associated with the given row i;

executing, by the server, at least the changed database query associated with the given row i; and displaying, by the server, a second data table including the results from execution of the changed database query i.

P3. The method of claim P2, further comprising:

invalidating, by the server, prior results from the database queries associated with rows i through n prior to executing at least the changed database query associated with the given row and displaying the second data table.

P4. The method of claim P2, wherein executing at least the changed database query associated with the given row comprises:

executing, by the server, the queries associated with rows 1 through i including the changed database query associated with the given row i.

P5. The method of claim P2, further comprising:

placing a temporary lock on the n rows of the interactive query code table to prevent the user from making inadvertent changes; and allowing the user to override the temporary lock to provide the second user input.

P6. The method of claim P5, further comprising:

allowing the user to enter additional queries into additional rows of the interactive query code table but not change existing queries when the temporary lock is in place.

P7. The method of claim P1, wherein:

the interactive query code table includes a plurality of cells organized into rows and columns, each column representing a distinct query parameter (signal) from among a plurality of query parameters (signals), each row representing a database query involving at least one of the distinct query parameters (signals) by way of a query operator in the column/cell corresponding to each distinct query parameter (signal) involved in the database query; and the first user input includes a selection of a given cell in the given row.

P8. The method of claim P2, wherein:

the interactive query code table includes a plurality of cells organized into rows and columns, each column representing a distinct query parameter (signal) from among a plurality of query parameters (signals), each row representing a database query involving at least one of the distinct query parameters (signals) by way of a query operator in the column/cell corresponding to each distinct query parameter (signal) involved in the database query;

the first user input includes a selection of a given cell in the given row; and the second user input includes a change to the contents of the given cell to add a new query operator to the given cell or change a prior query operator in the given cell associated with query i.

P9. A system for interactive database query reporting, the system comprising:

a computer system having stored thereon and executing interactive database query reporting computer processes comprising:

causing display, on a display screen of a computer of a user, of a first graphical user interface screen including an interactive query code table having a plurality of rows, each row representing a database query, the interactive query code table including n rows identifiable as rows 1 through n and representing a sequence of n database queries identifiable as database queries 1 through n, wherein n is greater than one;

receiving a first user input associated with a given row i of the interactive query code table; and displaying a first data table including results from execution of queries 1 through i, such that the server enables the user to select any given database query in the interactive query code table to view results through the given database query.

P10. The system of claim P9, wherein the interactive database query reporting computer processes further comprise:

receiving a second user input making a change to the database query associated with the given row i;

executing at least the changed database query associated with the given row i; and displaying a second data table including the results from execution of the changed database query i.

P11. The system of claim P10, wherein the interactive database query reporting computer processes further comprise:

invalidating prior results from the database queries associated with rows i through n prior to executing at least the changed database query associated with the given row and displaying the second data table.

P12. The system of claim P10, wherein executing at least the changed database query associated with the given row comprises:

executing the queries associated with rows 1 through i including the changed database query associated with the given row i.

P13. The system of claim P10, wherein the interactive database query reporting computer processes further comprise:

placing a temporary lock on the n rows of the interactive query code table to prevent the user from making inadvertent changes; and allowing the user to override the temporary lock to provide the second user input.

P14. The system of claim P13, wherein the interactive database query reporting computer processes further comprise:

allowing the user to enter additional queries into additional rows of the interactive query code table but not change existing queries when the temporary lock is in place.

P15. The system of claim P9, wherein:

the interactive query code table includes a plurality of cells organized into rows and columns, each column representing a distinct query parameter (signal) from among a plurality of query parameters (signals), each row representing a database query involving at least one of the distinct query parameters (signals) by way of a query operator in the column/cell corresponding to each distinct query parameter (signal) involved in the database query; and the first user input includes a selection of a given cell in the given row.

P16. The system of claim P10, wherein:

the interactive query code table includes a plurality of cells organized into rows and columns, each column representing a distinct query parameter (signal) from among a plurality of query parameters (signals), each row representing a database query involving at least one of the distinct query parameters (signals) by way of a query operator in the column/cell corresponding to each distinct query parameter (signal) involved in the database query;

the first user input includes a selection of a given cell in the given row; and the second user input includes a change to the contents of the given cell to add a new query operator to the given cell or change a prior query operator in the given cell associated with query i.

P17. A computer program product comprising a tangible, non-transitory computer readable medium having stored thereon a computer program for interactive database query reporting, which, when run on a computer system, causes the computer system to execute interactive database query reporting computer processes comprising:

causing display, on a display screen of a computer of a user, of a first graphical user interface screen including an interactive query code table having a plurality of rows, each row representing a database query, the interactive query code table including n rows identifiable as rows 1 through n and representing a sequence of n database queries identifiable as database queries 1 through n, wherein n is greater than one;

receiving a first user input associated with a given row i of the interactive query code table; and displaying a first data table including results from execution of queries 1 through i, such that the server enables the user to select any given database query in the interactive query code table to view results through the given database query.

P18. The computer program product of claim P17, wherein the interactive database query reporting computer processes further comprise:

receiving a second user input making a change to the database query associated with the given row i;

executing at least the changed database query associated with the given row i; and displaying a second data table including the results from execution of the changed database query i.

P19. The computer program product of claim P18, wherein the interactive database query reporting computer processes further comprise:

invalidating prior results from the database queries associated with rows i through n prior to executing at least the changed database query associated with the given row and displaying the second data table.

P20. The computer program product of claim P18, wherein executing at least the changed database query associated with the given row comprises:

executing the queries associated with rows 1 through i including the changed database query associated with the given row i.

P21. The computer program product of claim P18, wherein the interactive database query reporting computer processes further comprise:

placing a temporary lock on the n rows of the interactive query code table to prevent the user from making inadvertent changes; and allowing the user to override the temporary lock to provide the second user input.

P22. The computer program product of claim P21, wherein the interactive database query reporting computer processes further comprise:

allowing the user to enter additional queries into additional rows of the interactive query code table but not change existing queries when the temporary lock is in place.

P23. The computer program product of claim P17, wherein:

the interactive query code table includes a plurality of cells organized into rows and columns, each column representing a distinct query parameter (signal) from among a plurality of query parameters (signals), each row representing a database query involving at least one of the distinct query parameters (signals) by way of a query operator in the column/cell corresponding to each distinct query parameter (signal) involved in the database query; and the first user input includes a selection of a given cell in the given row.

P24. The computer program product of claim P18, wherein:

the interactive query code table includes a plurality of cells organized into rows and columns, each column representing a distinct query parameter (signal) from among a plurality of query parameters (signals), each row representing a database query involving at least one of the distinct query parameters (signals) by way of a query operator in the column/cell corresponding to each distinct query parameter (signal) involved in the database query;

the first user input includes a selection of a given cell in the given row; and the second user input includes a change to the contents of the given cell to add a new query operator to the given cell or change a prior query operator in the given cell associated with query i.

P25. A computer-implemented method for code and data versioning for managing shared datasets in a collaborative data processing system including data files and code files, the data files including production data files, the code files including production code files, the method comprising:

maintaining, by a server, a storage system for storing the data files and code files;

receiving, by the server, a request by a given user to modify a given production code file;

establishing, by the server, a task for the user;

placing, by the server, a lock on the given production code file;

storing, by the server, a modified version of the given production code file in a logical partition of the storage system associated with the task;

applying, by the server, the modified version of the given production code file to a specified data file to create a modified version of the specified data file;

assigning, by the server, a first unique version identifier for the modified version of the specified data file; and storing, by the server, the modified version of the specified data file in the logical partition of the storage system associated with the task in a manner accessible using the first unique version identifier, such that the modified code file is isolated from the production code files and code files of other users, and the modified data filed is isolated from the production data files and data files of other users.

P26. The method of claim P25, wherein the specified data file is a production data file or a modified version of a production data file.

P27. The method of claim P25, wherein the logical partition is a folder.

P28. The method of claim P25, wherein the storage associated with the task includes an append-only file system and wherein the modified version of the specified data file includes append-only files representing changes relative to the specified data file.

P29. The method of claim P25, further comprising:

committing, by the server, the modified version of the given production code file such that the modified version of the given production code file is designated as the latest version of the given production code file; and committing, by the server, the modified version of the specified data file such that the modified version of the specified data file is designated as the latest version of the specified data file among the set of production data files.

P30. The method of claim P25, further comprising:

using data label features and a plurality of configuration files to allow the user to publish and use the latest version of analytic code.

P31. The method of claim P25, further comprising:

isolating the user's workspace from previous versions of analytic code so that the user does not encounter interruptions from new versions of the analytic code.

P32. A system for code and data versioning for managing shared datasets in a collaborative data processing system including data files and code files, the data files including production data files, the code files including production code files, the system comprising:

a computer system having stored thereon and executing computer processes comprising:

maintaining, by a server, a storage system for storing the data files and code files;

receiving, by the server, a request by a given user to modify a given production code file;

establishing, by the server, a task for the user;

placing, by the server, a lock on the given production code file;

storing, by the server, a modified version of the given production code file in a logical partition of the storage system associated with the task;

applying, by the server, the modified version of the given production code file to a specified data file to create a modified version of the specified data file;

assigning, by the server, a first unique version identifier for the modified version of the specified data file; and storing, by the server, the modified version of the specified data file in the logical partition of the storage system associated with the task in a manner accessible using the first unique version identifier, such that the modified code file is isolated from the production code files and code files of other users, and the modified data filed is isolated from the production data files and data files of other users.

P33. The system of claim P32, wherein the specified data file is a production data file or a modified version of a production data file.

P34. The system of claim P32, wherein the logical partition is a folder.

P35. The system of claim P32, wherein the storage associated with the task includes an append-only file system and wherein the modified version of the specified data file includes append-only files representing changes relative to the specified data file.

P36. The system of claim P32, wherein the computer processes further comprise:
committing, by the server, the modified version of the given production code file such that the modified version of the given production code file is designated as the latest version of the given production code file; and
committing, by the server, the modified version of the specified data file such that the modified version of the specified data file is designated as the latest version of the specified data file among the set of production data files.

P37. The system of claim P32, wherein the computer processes further comprise:
using data label features and a plurality of configuration files to allow the user to publish and use the latest version of analytic code.

P38. The system of claim P32, wherein the computer processes further comprise:
isolating the user's workspace from previous versions of analytic code so that the user does not encounter interruptions from new versions of the analytic code.

P39. A computer program product comprising a tangible, non-transitory computer readable medium having stored thereon a computer program for code and data versioning for managing shared datasets in a collaborative data processing system including data files and code files, the data files including production data files, the code files including production code files, which, when run on a computer system, causes the computer system to execute interactive database query reporting computer processes comprising:
a computer system having stored thereon and executing computer processes comprising:
maintaining, by a server, a storage system for storing the data files and code files;
receiving, by the server, a request by a given user to modify a given production code file;
establishing, by the server, a task for the user;
placing, by the server, a lock on the given production code file;
storing, by the server, a modified version of the given production code file in a logical partition of the storage system associated with the task;
applying, by the server, the modified version of the given production code file to a specified data file to create a modified version of the specified data file;
assigning, by the server, a first unique version identifier for the modified version of the specified data file; and
storing, by the server, the modified version of the specified data file in the logical partition of the storage system associated with the task in a manner accessible using the first unique version identifier,
such that the modified code file is isolated from the production code files and code files of other users, and the modified data filed is isolated from the production data files and data files of other users.

P40. The computer program product of claim P39, wherein the specified data file is a production data file or a modified version of a production data file.

P41. The computer program product of claim P39, wherein the logical partition is a folder.

P42. The computer program product of claim P39, wherein the storage associated with the task includes an append-only file system and wherein the modified version of the specified data file includes append-only files representing changes relative to the specified data file.

P43. The computer program product of claim P39, wherein the computer processes further comprise:
committing, by the server, the modified version of the given production code file such that the modified version of the given production code file is designated as the latest version of the given production code file; and
committing, by the server, the modified version of the specified data file such that the modified version of the specified data file is designated as the latest version of the specified data file among the set of production data files.

P44. The computer program product of claim P39, wherein the computer processes further comprise:
using data label features and a plurality of configuration files to allow the user to publish and use the latest version of analytic code.

P45. The computer program product of claim P39, wherein the computer processes further comprise:
isolating the user's workspace from previous versions of analytic code so that the user does not encounter interruptions from new versions of the analytic code.

P46. A computer-implemented method for code and data versioning for managing shared datasets in a collaborative data processing system including data files and code files, the data files including production data files, the code files including production code files, the method comprising:
maintaining a first view having a production version of a dataset;
creating a task for a developer, the task being associated with a second view;
associating a first code file with the task for the first view, the first code file including code that modifies the dataset;
creating a temporary version of the dataset in the first view;
associating the temporary version of the dataset with the task;
associating a second code file with the task for the second view, the second code file including an instruction to read the dataset from the first view without identifying a specific version of the dataset from the first view; and
upon execution of the code file in the second view, automatically reading from the temporary dataset associated with the task based on the association of the temporary dataset with the task.

P47. The method of claim P46, further comprising:
placing a lock on the first code file in the first view and the second code file in the second view.

P48. The method of claim P47, wherein placing the lock on the first and second code files comprises checking out the first and second code files from a source control system.

P49. The method of claim P46, further comprising:
receiving, from the developer, a request to commit changes made to the first and second code files;
checking the first and second code files into a source control system;
changing the temporary dataset to be a latest dataset; and
terminating the task.

P50. A system for rapid development and deployment of reusable analytic code for use in computerized data modeling and analysis comprising:
a computer system having stored thereon and executing computer processes for implementing a signal hub, the computer processes comprising:
a signal hub engine configured to generate and monitor a set of named signals from a plurality of data sources to provide a reusable signal layer of maintained and refreshed named signals on top of the source data for consumption by analytic code applications; and a graphical user interface configured to allow users to define signal categories and relationships used by the signal hub engine to generate the set of named signals, explore lineage and dependencies of the named signals in the signal layer, monitor and manage the signal layer including recovery from issues identified by monitoring of the named signals by the signal hub engine, and create and execute analytic code applications that utilize the named signals.

P51. The system of claim P50, wherein the set of named signals includes descriptive signals and predictive signals.

P52. The system of claim P50, wherein the signal hub engine is configured to generate the set of named signals based on combinations of signal categories including entity, transformation, attribute, and time frame.

P53. The system of claim P52, wherein the signal hub engine is configured to associate each named signal with a name that is automatically generated for the signal based on the source data used to generate the named signal.

P54. The system of claim P50, wherein the signal hub engine is further configured to store, for each named signal, metadata providing lineage information for the named signal, and to provide the metadata for consumption by analytic code applications.

P55. The system of claim P50, the graphical user interface is configured to categorize a plurality of named signals based on taxonomies and allow users to search for named signals based on the taxonomies.

P56. The system of claim P50, wherein the signal hub engine is configured to automatically detect changes from the data sources update the set of named signals based on relevant data changes without transactional system support.

P57. The system of claim P50, wherein the signal hub engine is configured to enable a named signal to be created from at least one other previously created named signal.

It should be understood by persons of ordinary skill in the art that the term "computer process" as used herein is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. A "computer process" does not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A computer-implemented method for converting scalar expressions to relational database queries applied to a dataset, the method comprising:
   producing a functional dependency graph representing the scalar expressions and any interdependencies between the scalar expressions;
   assigning each scalar expression to one of a plurality of successive execution stages based on the functional dependency graph such that each execution stage includes at least one of the scalar expressions,
   wherein the at least one scalar expression associated with any given stage does not require results from a subsequent stage of the plurality of successive stages; and
   converting the scalar expressions at each stage into one or more relational database queries to create a sequence of relational database queries such that execution of the one or more relational database queries at each execution stage involves at most one pass through the dataset.

2. The method of claim 1, wherein at least one stage involves generation of a temporary data set used in at least one subsequent stage.

3. The method of claim 1, wherein each stage includes the maximum number of possible expressions that can be executed at that stage.

4. The method of claim 1, wherein producing the functional dependency graph comprises, for each scalar expression:
   identifying an output parameter and a set of input parameters associated with the scalar expression;
   creating a node for the output parameter in the functional dependency graph if the node for the output parameter does not exist in the functional dependency graph;
   creating, for each input parameter in the set of input parameters, a distinct node in the functional dependency graph if the distinct node for the input parameter does not exist in the functional dependency graph; and
   establishing, in the functional dependency graph, an association between the output parameter node and each of distinct input parameter nodes.

5. The method of claim 4, wherein the association includes an operator node when the output parameter node is dependent on a combination of two or more distinct input parameter nodes, the operator node representing an operator to be performed on the two or more distinct input parameters.

6. The method of claim 1, where assigning each scalar expression to one of the plurality of successive stages based on the functional dependency graph comprises:
   traversing the functional dependency graph using a breadth first traversal configured to exclude, from each given execution stage, any aggregate expression at a lower-level of the functional dependency graph; and
   assigning each expression to a given stage based on the breadth first traversal.

7. The method of claim 1, wherein converting the nodes at each stage into one or more relational database queries to create a sequence of relational database queries comprises:
   generating a sequence of structured query language commands.

8. The method of claim 1, wherein assigning each scalar expression to one of the plurality of successive execution stages based on the functional dependency graph ensures the minimum number of passes through the dataset for execution of the scalar expressions.

9. A system for converting scalar expressions to relational database queries for application to a dataset, the system comprising:
    a computer system having stored thereon and executing computer processes comprising:
    producing a functional dependency graph representing the scalar expressions and any interdependencies between the scalar expressions;
    assigning each scalar expression to one of a plurality of successive execution stages based on the functional dependency graph such that each execution stage includes at least one of the scalar expressions,
    wherein the at least one scalar expression associated with any given stage does not require results from a subsequent stage of the plurality of successive stages; and
    converting the scalar expressions at each stage into one or more relational database queries to create a sequence of relational database queries such that execution of the one or more relational database queries at each execution stage involves at most one pass through the dataset.

10. The system of claim 9, wherein at least one stage involves generation of a temporary data set used in at least one subsequent stage.

11. The system of claim 9, wherein each stage includes the maximum number of possible expressions that can be executed at that stage.

12. The system of claim 9, wherein producing the functional dependency graph comprises, for each scalar expression:
    identifying an output parameter and a set of input parameters associated with the scalar expression;
    creating a node for the output parameter in the functional dependency graph if the node for the output parameter does not exist in the functional dependency graph;
    creating, for each input parameter in the set of input parameters, a distinct node in the functional dependency graph if the distinct node for the input parameter does not exist in the functional dependency graph; and
    establishing, in the functional dependency graph, an association between the output parameter node and each of distinct input parameter nodes.

13. The system of claim 12, wherein the association includes an operator node when the output parameter node is dependent on a combination of two or more distinct input parameter nodes, the operator node representing an operator to be performed on the two or more distinct input parameters.

14. The system of claim 9, where assigning each scalar expression to one of the plurality of successive stages based on the functional dependency graph comprises:
    traversing the functional dependency graph using a breadth first traversal configured to exclude, from each given execution stage, any aggregate expression at a lower-level of the functional dependency graph; and
    assigning each expression to a given stage based on the breadth first traversal.

15. The system of claim 9, wherein converting the nodes at each stage into one or more relational database queries to create a sequence of relational database queries comprises:
    generating a sequence of structured query language commands.

16. The system of claim 9, wherein assigning each scalar expression to one of the plurality of successive execution stages based on the functional dependency graph ensures the minimum number of passes through the dataset for execution of the scalar expressions.

17. A computer program product comprising a tangible, non-transitory computer readable medium having stored thereon a computer program for converting scalar expressions to relational database queries for application to a dataset, which, when run on a computer system, causes the computer system to execute interactive database query reporting computer processes comprising:
    producing a functional dependency graph representing the scalar expressions and any interdependencies between the scalar expressions;
    assigning each scalar expression to one of a plurality of successive execution stages based on the functional dependency graph such that each execution stage includes at least one of the scalar expressions,
    wherein the at least one scalar expression associated with any given stage does not require results from a subsequent stage of the plurality of successive stages; and
    converting the scalar expressions at each stage into one or more relational database queries to create a sequence of relational database queries such that execution of the one or more relational database queries at each execution stage involves at most one pass through the dataset.

18. The computer program product of claim 17, wherein at least one stage involves generation of a temporary data set used in at least one subsequent stage.

19. The computer program product of claim 17, wherein each stage includes the maximum number of possible expressions that can be executed at that stage.

20. The computer program product of claim 17, wherein producing the functional dependency graph comprises, for each scalar expression:
    identifying an output parameter and a set of input parameters associated with the scalar expression;
    creating a node for the output parameter in the functional dependency graph if the node for the output parameter does not exist in the functional dependency graph;
    creating, for each input parameter in the set of input parameters, a distinct node in the functional dependency graph if the distinct node for the input parameter does not exist in the functional dependency graph; and
    establishing, in the functional dependency graph, an association between the output parameter node and each of distinct input parameter nodes.

21. The computer program product of claim 20, wherein the association includes an operator node when the output parameter node is dependent on a combination of two or more distinct input parameter nodes, the operator node representing an operator to be performed on the two or more distinct input parameters.

22. The computer program product of claim 17, where assigning each scalar expression to one of the plurality of successive stages based on the functional dependency graph comprises:
    traversing the functional dependency graph using a breadth first traversal configured to exclude, from each given execution stage, any aggregate expression at a lower-level of the functional dependency graph; and
    assigning each expression to a given stage based on the breadth first traversal.

23. The computer program product of claim 17, wherein converting the nodes at each stage into one or more relational database queries to create a sequence of relational database queries comprises:
    generating a sequence of structured query language commands.

24. The computer program product of claim 17, wherein assigning each scalar expression to one of the plurality of successive execution stages based on the functional dependency graph ensures the minimum number of passes through the dataset for execution of the scalar expressions.

* * * * *